(12) United States Patent
Willis

(10) Patent No.: US 7,305,436 B2
(45) Date of Patent: Dec. 4, 2007

(54) USER COLLABORATION THROUGH DISCUSSION FORUMS

(75) Inventor: Brian Willis, Menlo Park, CA (US)

(73) Assignee: SAP Aktiengesellschaft, Walldorf (DE)

( * ) Notice: Subject to any disclaimer, the term of this patent is extended or adjusted under 35 U.S.C. 154(b) by 716 days.

(21) Appl. No.: 10/645,851

(22) Filed: Aug. 22, 2003

(65) Prior Publication Data

US 2004/0111467 A1 Jun. 10, 2004

Related U.S. Application Data

(63) Continuation-in-part of application No. 10/354,144, filed on Jan. 30, 2003, which is a continuation-in-part of application No. 10/231,440, filed on Aug. 30, 2002, and a continuation-in-part of application No. 10/231,459, filed on Aug. 30, 2002, now Pat. No. 7,200,801.

(60) Provisional application No. 60/380,834, filed on May 17, 2002, provisional application No. 60/380,864, filed on May 17, 2002.

(51) Int. Cl.
*G06F 15/16* (2006.01)
*G06F 17/30* (2006.01)
*G06F 7/00* (2006.01)
*G06F 3/00* (2006.01)

(52) U.S. Cl. ............ 709/204; 709/206; 709/219; 709/229; 707/7; 707/10; 707/104.1; 715/513; 715/742; 715/747; 715/758; 726/4

(58) Field of Classification Search ........ 709/203–207, 709/217–219, 229; 705/14, 26, 27; 707/7, 707/10, 104.1; 726/4; 715/513, 742, 747, 715/758

See application file for complete search history.

(56) References Cited

U.S. PATENT DOCUMENTS 5,442,740 A 8/1995 Parikh (Continued)

FOREIGN PATENT DOCUMENTS

EP 1 143 679 A2 10/2001

(Continued)

OTHER PUBLICATIONS

Kalt, C. "Internet Relay Chat: Channel Management," RFC 2811, Apr. 2000, pp. 1-19.*

(Continued)

*Primary Examiner*—Melvin H. Pollack
(74) *Attorney, Agent, or Firm*—Fish & Richardson P.C.

(57) ABSTRACT

Systems for providing content to multiple users are described, where the systems identify individual content elements within the content, and provide a discussion forum linked to each of the content elements. As one of the users views the content and associated content elements, the user has the option of selecting a particular content element, so as to interact with its associated discussion forum. Thus, multiple users may become viewers or members of a particular discussion forum. The content element associated with a given discussion forum may be included in various pieces of content within the system, such as in multiple articles or email messages. However, users viewing the content elements in any particular setting are all directed to the common discussion forum. In this way, users interested in a particular topic are brought together in a convenient way, without much action required by the users.

19 Claims, 45 Drawing Sheets

U.S. PATENT DOCUMENTS

| | | | |
|---|---|---|---|
| 5,828,839 A * | 10/1998 | Moncreiff | 709/204 |
| 5,848,424 A | 12/1998 | Scheinkman et al. | |
| 5,920,070 A * | 7/1999 | Petrick et al. | 250/370.09 |
| 5,995,943 A | 11/1999 | Bull et al. | |
| 6,041,331 A | 3/2000 | Weiner et al. | |
| 6,058,277 A | 5/2000 | Streefkerk et al. | |
| 6,064,980 A | 5/2000 | Jacobi et al. | |
| 6,076,166 A | 6/2000 | Moshfeghi et al. | |
| 6,085,229 A | 7/2000 | Newman et al. | |
| 6,094,648 A | 7/2000 | Aalbersberg | |
| 6,154,764 A | 11/2000 | Nitta et al. | |
| 6,181,342 B1 | 1/2001 | Niblack | |
| 6,209,100 B1 | 3/2001 | Robertson et al. | |
| 6,236,395 B1 | 5/2001 | Sezan et al. | |
| 6,266,649 B1 | 7/2001 | Linden et al. | |
| 6,271,840 B1 | 8/2001 | Finseth et al. | |
| 6,300,947 B1 | 10/2001 | Kanevsky | |
| 6,317,722 B1 | 11/2001 | Jacobi et al. | |
| 6,327,628 B1 | 12/2001 | Anuff et al. | |
| 6,338,059 B1 | 1/2002 | Fields et al. | |
| 6,347,332 B1 * | 2/2002 | Malet et al. | 709/205 |
| 6,356,908 B1 | 3/2002 | Brown et al. | |
| 6,356,922 B1 | 3/2002 | Schilit et al. | |
| 6,400,381 B1 * | 6/2002 | Barrett et al. | 715/758 |
| 6,421,706 B1 * | 7/2002 | McNeill et al. | 709/204 |
| 6,438,580 B1 * | 8/2002 | Mears et al. | 709/204 |
| 6,438,632 B1 * | 8/2002 | Kikugawa | 710/100 |
| 6,457,026 B1 | 9/2002 | Graham et al. | |
| 6,460,036 B1 * | 10/2002 | Herz | 707/10 |
| 6,470,338 B1 * | 10/2002 | Rizzo et al. | 707/6 |
| 6,480,885 B1 * | 11/2002 | Olivier | 709/207 |
| 6,549,935 B1 * | 4/2003 | Lapstun et al. | 709/204 |
| 6,557,027 B1 * | 4/2003 | Cragun | 709/204 |
| 6,631,496 B1 * | 10/2003 | Li et al. | 715/501.1 |
| 6,646,549 B2 | 11/2003 | Dawson | |
| 6,697,824 B1 * | 2/2004 | Bowman-Amuah | 709/229 |
| 6,725,227 B1 | 4/2004 | Li | |
| 6,741,853 B1 | 5/2004 | Jiang et al. | |
| 6,856,967 B1 * | 2/2005 | Woolston et al. | 705/26 |
| 6,918,090 B2 | 7/2005 | Hesmer et al. | |
| 6,947,959 B1 | 9/2005 | Gill | |
| 6,959,319 B1 | 10/2005 | Huang et al. | |
| 6,973,665 B2 | 12/2005 | Dudkiewicz et al. | |
| 6,993,529 B1 | 1/2006 | Basko et al. | |
| 6,993,534 B2 * | 1/2006 | Denesuk et al. | 707/102 |
| 7,013,323 B1 * | 3/2006 | Thomas et al. | 709/203 |
| 7,017,183 B1 | 3/2006 | Frey et al. | |
| 7,062,535 B1 * | 6/2006 | Stark et al. | 709/206 |
| 7,082,407 B1 * | 7/2006 | Bezos et al. | 705/26 |
| 7,089,194 B1 * | 8/2006 | Berstis et al. | 705/14 |
| 7,089,278 B1 * | 8/2006 | Churchill et al. | 709/203 |
| 7,096,220 B1 * | 8/2006 | Seibel et al. | 707/10 |
| 2002/0018078 A1 | 2/2002 | Khan et al. | |
| 2002/0029296 A1 * | 3/2002 | Anuff et al. | 709/311 |
| 2002/0049833 A1 | 4/2002 | Kikinis | |
| 2002/0053078 A1 | 5/2002 | Holtz et al. | |
| 2002/0059584 A1 | 5/2002 | Ferman et al. | |
| 2002/0122063 A1 | 9/2002 | Weinberg et al. | |
| 2002/0138844 A1 | 9/2002 | Otenasek et al. | |
| 2002/0143659 A1 | 10/2002 | Keezer et al. | |
| 2002/0174230 A1 | 11/2002 | Gudorf et al. | |
| 2002/0174319 A1 | 11/2002 | Rivers et al. | |
| 2002/0178007 A1 | 11/2002 | Slotznick et al. | |
| 2002/0184319 A1 * | 12/2002 | Willner et al. | 709/206 |
| 2002/0194267 A1 * | 12/2002 | Flesner et al. | 709/203 |
| 2002/0198859 A1 | 12/2002 | Singer et al. | |
| 2002/0198973 A1 | 12/2002 | Besaw | |
| 2003/0009536 A1 * | 1/2003 | Henderson et al. | 709/219 |
| 2003/0028896 A1 | 2/2003 | Swart et al. | |
| 2003/0033161 A1 | 2/2003 | Walker et al. | |
| 2003/0093790 A1 | 5/2003 | Logan et al. | |
| 2003/0101412 A1 | 5/2003 | Eid | |
| 2003/0126136 A1 | 7/2003 | Omoigui | |
| 2003/0140090 A1 * | 7/2003 | Rezvani et al. | 709/203 |
| 2003/0217061 A1 | 11/2003 | Agassi et al. | |
| 2003/0229900 A1 | 12/2003 | Reisman | |
| 2004/0059705 A1 | 3/2004 | Wittke et al. | |
| 2004/0088355 A1 | 5/2004 | Hagan et al. | |
| 2004/0205473 A1 | 10/2004 | Fisher et al. | |
| 2004/0220926 A1 | 11/2004 | Lamkin et al. | |
| 2004/0230572 A1 | 11/2004 | Omoigui | |
| 2005/0193335 A1 | 9/2005 | Dorai et al. | |
| 2005/0204276 A1 | 9/2005 | Hosea et al. | |

FOREIGN PATENT DOCUMENTS

| | | |
|---|---|---|
| EP | 1 176 520 A2 | 1/2002 |
| EP | 1 367 513 A2 | 12/2003 |
| WO | WO99/62011 | 12/1999 |
| WO | WO 00/65773 | 11/2000 |
| WO | WO 00/77689 | 12/2000 |
| WO | WO 01/09737 A1 | 2/2001 |
| WO | WO 01/13287 A | 2/2001 |
| WO | WO 01/18688 A2 | 3/2001 |
| WO | WO 01/77903 A1 | 10/2001 |
| WO | WO 01/81829 A1 | 11/2001 |

OTHER PUBLICATIONS

Neufeld, G. "The Use of URLs as Meta-Syntax for Core Mail List Commands and their Transport through Message Header Fields," RFC 2369, Jul. 1998, pp. 1-15.*

Weibel, S. et al. "Dublin Core Metadata for Resource Discovery," RFC 2413, Sep. 1998, pp. 1-8.*

Kunze, J. "Encoding Dublin Core Metadata in HTML," RFC 2731, Dec. 1999, pp. 1-23.*

Buck, Anne M. et al. "Scholar'Forum: A New Model for Scholarly Communication," California Institute of Technology, Mar. 23, 1999, pp. 1-10.*

Voss, Angi and Schafer, Andreas. "Beyond Workflow: Discourse Flows for Knowledge Conversion," Proceedings of I-KNOW, Jul. 2-4, 2003, pp. 337-343.*

Ranganathan, Anand et al. "ConChat: A Context-Aware Chat Program," IEEE Pervasive Computing, vol. 1, Issue 3, 2002, pp. 51-57. (No Month Given).*

Fox, Geoffrey. "Peer-to-Peer Networks," Computing in Science and Engineering, vol. 3, Issue 3, May/Jun. 2001, pp. 75-77.*

Bulterman, D. C. A., et al., "GriNS: A Graphical Interface for Creating and Playing SMIL Documents," Computer Networks and ISDN Systems, North Holland Publishing, Amsterdam, NL, vol. 30, Nos. 1-7, pp. 519-529, XP004121396.

Google News (BETA), "Top Stories," http://news.google.com, printed from the Internet Oct. 1, 2002, 5 pgs.

Google News (BETA), "A Novel Approach to News," http://news.google.com/help/about_news_search.html, printed from the Internet Oct. 1, 2002, 3 pgs.

IBM, "IBM Websphere Portal Server Product Architecture V2.1," Nov. 19, 2001, pp. 1-31, XP002268018.

Li, Chung-Sheng, et al., "Multimedia Content Description in the Infopyramid," Acoustics, Speech and Signal Processing, Proceedings of the 1998 IEEE International Conference, May 12, 1998, pp. 3789-3792, XP010279595.

Bhatia, S. K., "Selection of Search Terms Based on User Profile," Proceedings of the 1992 ACM/SIGAPP Symposium on Applied Computing: Technological Challenges of the 1990's, Kansas City, MO, 1992, pp. 224-233.

Kamba, T. et al., "The Krakatoa Chronicle—An Interactive, Personalized, Newspaper on the Web," Proceedings of the International Conference on World Wide Web, Dec. 11, 1995, pp. 1-12.

Salembier, P. et al., "Description Schemes for Video Programs, Users and Devices," Signal Processing: Image Communication, Sep. 2000, vol. 16, pp. 211-234.

Seo, Y. W. et al., "Learning User's Preferences by Analyzing Web-Browsing Behaviors," Proceedings of the Fourth International Conference on Autonomous Agents, Barcelona, Spain, Jun. 3-7, 2000, pp. 381-387.

Sugiura, A. et al., "Internet Scrapbook: Automating Web Browsing Tasks by Demonstration," UIST '98, ACM Symposium on User Interface Software and Technology, San Francisco, CA, Nov. 1-4, 1998, pp. 9-18.

Amazon.com, "Recommendations," http://www.amazon.com/exec/obidos/tg/browse/-/508506/ref=br_bx_c_2_1/002-7851280-4410446, (undated and Applicants believe it was publicly available prior to Aug. 22, 2003), printed from the Internet Feb. 27, 2004, 2 pgs.

Amazon.com, "Why Was I Recommended This?" http://www.amazon.com/exec/obidos/tg/browse/-/764534/ref%3Dbr%5Fbx%5Fc%5F2%5F2/002-/002-7851280-4410446, (undated and Applicants believe it was publicly available prior to Aug. 22, 2003), printed from the Internet Feb. 27, 2004, 2 pgs.

Amazon.com, "Your Favorites," http://www.amazon.com/exec/obidos/tg/browse/-/560726/ref=br_bx_c_2_0/002-7851280-4410446, (undated and Applicants believe it was publicly available prior to Aug. 22, 2003), printed from the Internet Feb. 27, 2004, 2 pgs.

Netflix, "About Netflix," http://www.netflix.com/PressRoom?id=1005, (undated and Applicants believe it was publicly available prior to Aug. 22, 2003), printed from the Internet Jan. 5, 2004, 1 pg.

Netflix, "Fact Sheet," http://www.netflix.com/PressRoom?id=5206, (undated and Applicants believe it was publicly available prior to Aug. 22, 2003), printed from the Internet Jan. 5, 2004, 3 pgs.

SAP Aktiengesellschaft, "mySAP Technology: Portal Infrastructure: People-Centric Collaboration," undated materials, copyright 2001, 28 pgs.

"What is My Yahoo!?," http://wizards.yahoo.com/members/tools/publishing/wizards/server/bottom-right/1, (undated and Applicants believe it was publicly available prior to Aug. 22, 2003), printed from the Internet Feb. 27, 2004, 7 pgs.

Boguraev, Branimir et al., "Dynamic Presentation of Document Content for Rapid On-Line Skimming" AAAI Symposium on Intelligent Text Summarization, Mar. 23, 1998, 10 pages.

Graham, Jamey, "The Reader's Helper: A Personalized Document Reading Environment," CHI '99 Conference Proceedings Human Factors in Computing Systems, Pittsburgh, PA, May 15, 1999, 9 pages.

* cited by examiner

```
<Article>
    <Time>2002 -04- 24 15:02</Time>                    /705
    <Importance>Normal</Importance>
    <Author>agent@food4all.com</Author>                /710
    <Content Type=" text/narrative ">
<Headline>
Four of our top customers in the Eastern Region have pending complaints.   /715
</Headline>
    <Details>
                    /720
Wacky Foods, with an annual sales volume of $10M have 8 pending complaints;
My Muffin Ltd with $4M of annual sales have 1; Breads R Us with $1M of annual sales
have 3; and Have Your Cake, Inc with $850K of annual sales have 2. The complaints
KPI is at 88.7M </Details>
</Content>
    <Content Type=" text/html ">   /725
<Headline>
Pending Support Complaints for Top Customers in Eastern Region   /730
</Headline>
<Html>
```

| Top Customers of Eastern Region - Pending Complaints ||  |
|---|---|---|
| Customer | Sales Vol | Complaints |
| Wacky Foods | $10M | 8 |
| My Muffins Ltd | $4M | 1 |
| Breads R Us | $1M | 3 |
| Have Your Cake Inc | $850K | 2 |
| Complaints KPI || 88.7M |

```
</Html>
</Content>
< DiscussionObjects >
    <Object Class=" BizPartner" Key=" Wacky Foods" />
    <Object Class=" BizPartner" Key=" My Muffins Ltd" />   /740
    <Object Class=" BizPartner" Key=" Breads R Us" />
    <Object Class=" BizPartner" Key=" Have Your Cake Inc" />
    <Object Class=" Region" Key=" Eastern" />
<Object Class="SecurityRealm" Key=" Sales Numbers" />
    </DiscussionObjects>
    </Article>
```

FIG. 7

```
<Article>
<Time>2002-04-24 15:02</Time>                    /-1405        /-1400
    <Importance>Normal</Importance>
    <Author>agent@food4all.com</Author>
<Content Type=" text/narrative ">
                                       \-1410              /-1415
<Headline>
    Four of our top customers in the Eastern Region have pending complaints.
</Headline>
<Details>                                                    /-1420
    Wacky Foods, with an annual sales volume of $10M have 8 pending complaints;
    My Muffin Ltd with $4M of annual sales have 1; Breads R Us with $1M of
    annual sales have 3; and Have Your Cake, Inc with $850K of annual sales
    have 2. The complaints KPI is at 88.7M
</Details>
</Content>
<Content Type=" text/html  ">/-1425
<Headline>
    Pending Support Complaints for Top Customers in Eastern Region /-1430
</Headline>
<Html>                                                          /-1435
```

| Top Customers of Eastern Region - Pending Support Complaints | | |
|---|---|---|
| Customer | Sales Vol | Complaints |
| Wacky Foods | $10M | 8 |
| My Muffins Ltd | $4M | 1 |
| Breads R Us | $1M | 3 |
| Have Your Cake Inc | $850K | 2 |
| Complaints KPI | | 88.7M |

```
</Html>
</Content>
<Content Type=" image/gif  ">
                              \-1440
<Headline>
    Pending Support Complaints for Top Customers in Eastern Region
</Headline>                                                      \-1445
<Image>                                                          /-1450
```

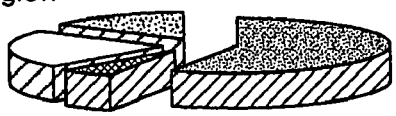

```
</Image>
</Content>
<Content Type=" music/midi ">/-1455
<Midi>
```

```
        /-1460
</Midi>
</Content>
</Article>
```

Never Tell me about SAP
Tell me Everything about SAP

SAP is Important to me
SAP is not Important to me

2604

Postpone Articles about SAP

Tomorrow
Tue
Wed
Thu
Fri

Advanced...

1 Week
2 Weeks
1 Month
1 Quarter

FIG. 26

USER COLLABORATION THROUGH DISCUSSION FORUMS

CROSS-REFERENCE TO RELATED APPLICATIONS

This application is a continuation-in-part of U.S. application Ser. No. 10/354,144, filed Jan. 30, 2003, and titled Interface for Collecting User Preferences, which claims priority and is a continuation-in-part of U.S. application Ser. No. 10/231,440, filed Aug. 30, 2002, and titled Dynamic Presentation of Personalized Content, and U.S. application Ser. No. 10/231,459, filed Aug. 30, 2002 now U.S. Pat. No. 7,200,801, and titled Rich Media Information Portals, both of which claim priority from U.S. Provisional Application No. 60/380,834, filed May 17, 2002, and titled Personalizing Portal Content Dynamically, and from U.S. Provisional Application No. 60/380,864, filed May 17, 2002, and titled Rich Media Information Portals.

TECHNICAL FIELD

This description relates to techniques for encouraging collaboration of system users.

BACKGROUND

Technologies exist which allow users to designate categories of information in which desired content may be presented. For example, web sites may allow users to select categories from a variety of different sources and content providers. Such sites are generally known as "portals," and provide a central gateway through which users can be presented with options and links to various information sources. In this way, users can check, for example, their stocks, mail, local weather, sports scores, and movie listings.

Other techniques exist that attempt to provide users with content that will be of particular interest to each user. For example, web sites may track items such as books and Digital Video Disks ("DVDs") based on attributes of such items, such as title, author, performer, and genre. By tracking previously-purchased books and DVDs, registered users may be presented with a web page offering items with similar attributes.

Video recording systems may allow users to voice opinions about specific television shows. Coupled with a programming guide, these video recording systems can later record concurrent episodes of the show or shows starring the same actor or shows of similar interest. Such systems may include personal video recorders ("PVRs"), which typically require a set-top box located at the viewer's location, along with a subscription service, to implement PVR services.

In another example, portals are capable of providing categorized content in disparate pieces (sometimes referred to as "iViews"), where each iView and its associated content can be aggregated into a single delivery package (for example, a web page). Users may select a category of content to be included within each iView, and may generally choose which iView(s) to see and exercise some control over how it is positioned inside the aggregated result.

In practical implementations of portals utilizing iViews, however, most users set up their portal once, if at all, and will thereafter simply keep these initial preferences. As a result, such users may miss out on viewing new content and categories of content that may be more interesting than the iViews originally selected. Similarly, content which is most interesting to the user at a particular time will not be properly emphasized within the aggregated result, such that the user does not give it the attention it is due.

Even if users update their iView configuration very frequently, each configuration is still static. That is, the set of iViews shown, and the order in which they are shown, is constant. Moreover, although the content of each iView may change over time (for example actual news headlines), its overall subject is static (for example, company news).

Conventional portals often concentrate on the computer screen as the main output device thru which the user will receive the delivered content. The scope may be further limited if the portal is rendered in Hypertext Mark-up Language ("HTML") and runs in a web browser. Even when mobile devices like personal digital assistants ("PDAs") and smart cellular phones are used to access conventional portals, the portals are often still rendered in a type of browser.

Such a browser-limited approach may have emerged from an impression that browsers are ubiquitous on many client machines and that portals leave no-footprint on those clients by rendering to them. However, by heading in that direction the portal vendors have limited the capabilities of the portal and the distribution of the content. Moreover, to the extent that delivered content is typically text or image-based in a browser, users may have come to expect only those formats.

The browser-centric approach is usually used for the average business user who comes in to the office in the morning, and logs-in to his computer. However, there are many scenarios that prohibit access to computers. For example, many blue-collar employees do not have computers at their place of work. Also, many people are simply not computer savvy, and/or find computers intimidating. Even the savvy computer user has situations where using a laptop is difficult or impossible (the drive to the office, for example).

Other systems for providing information to users also offer the feature of personalizing information for a particular user or group of users. Examples of such systems include Internet search engines, which allow users to input terms about which the users would like more information, and return documents (or links to documents) containing these terms. Such personalizable information systems have various techniques for allowing users to input their preference information.

Whatever the type of system used to deliver information to users, the various users may each be unaware, to at least some extent, of other system users who may share similar interests. As a result, users' ability to act on the information received may be less than optimal.

SUMMARY

In contrast with the above, one implementation of a content presentation system described below enables dynamic selection of the shown set of iViews, based on an individual relevance of each iView to the user at any given time. That is, this implementation allows the user to personalize content based not only on its expected result (that is, the type of iView), but also on its actual result (that is, actual content of the iView).

In another implementation, a system incrementally learns the user's preferences regarding previously-shown items and categories, and uses that information to decide what content should be shown to the user in the future. Time also may be of significance, for example, by playing a part in deciding a level of relevance for each iView with respect to a specific user.

In another implementation, a system combines the concepts of the portal and personalized content with other delivery channels, such as, for example, telephone, radio, and television. The synergy opens up many new opportunities, such as "Enterprise TV," wherein a television is placed in a lobby of a company, the company cafeteria, or other high-traffic areas, or "Enterprise radio," wherein news (particularly company news) is broadcast to all employees over the airwaves. Yet another example is voice mail, wherein messages are left on the employee's voice mail. In this last example, participants of a meeting can easily be notified when a meeting is postponed.

In another implementation, user preferences for the various functionalities just listed, and for other functionalities, may be input by a user by way of a pop-up window with which the user may express a level of interest, or disinterest, with respect to a particular term. More specifically, the pop-up window may be provided to the user proximate to the term about which the user is to express preference information, upon selection of that term by the user.

By inputting preference information in this way, a user may take a more convenient and streamlined approach to various applications. For example, a user can implement an Internet search in a streamlined, progressive manner, or can modify a personal portal page, or can express an opinion about a particular element of an audio and/or video presentation. By expressing his or her opinion about an element of content, while accessing the content, a number of screens/processes that the user must access is minimized.

In another implementation, a term identified within pieces of content may contain a link to a discussion forum or other information-sharing location dedicated to information about a particular term. Users may be registered as members of the discussion forum using a variety of techniques. Moreover, if the users are receiving personalized content, different ones of the users may receive different pieces of content according to their individual preferences, where each of the different pieces of content contain the term and associated link. In this way, users interested in a particular term or concept may be brought together within the context of the system, so as to collaborate with one another in a convenient and effective manner.

According to one general aspect, a media asset is determined, the media asset including content and content metadata, the content metadata having been associated with a term within the content. A discussion forum associated with the term is established, based on the term and the content metadata. The term and the discussion forum are linked, and the media asset is delivered, including the term linked to the discussion forum, to a first user.

Implementations may have one or more of the following features. For example, in delivering the media asset to the first user, the term may be distinguished within a first user display associated with the first user, and a first selection of the term by the first user may be accepted.

A membership option may be provided to the first user, based on the first selection. Also, the media asset may be delivered, such that the term is distinguished within a second user display associated with the second user, and a second selection of the term is accepted by the second user.

In this case, determining the media asset may include determining a first media asset and a second media asset, each containing the term. Further, in delivering the media asset to the first user, the first media asset may be delivered to the first user, and the second media asset may be delivered to the second user.

Further, the first user may be registered as a member of the discussion forum, posting information may be accepted from users, and the posting information may be published on the discussion forum. A user page may be established that is uniquely associated with the first user, wherein establishing the user page may include including the posting information within the user page.

The posting information may include only postings published by the first user on the discussion forum. The posting information may be rendered with an ordering that is determined based on preference information about content of the posting information that is associated with the first user. The posting information may include a posting published by the second user and located on the user page based on user-specific preference information that the first user has entered with respect to the second user. The posting information may include a posting published by the second user, and may be located on the user page based on user-specific preference information that users have entered with respect to the second user.

In determining the media asset, the media asset may be selected based on preference information associated with the first user. The content metadata may include preference indication information, and establishing the discussion forum associated with the term may include registering the first user as a member of the discussion forum based on preference information received from the first user with respect to the preference indication information.

The content metadata may include membership indication information. Then, in establishing the discussion forum associated with the term, the first user may be registered as a member of the discussion forum, based on preference information received from the first user with respect to the membership indication information.

According to another general aspect, an apparatus including a storage medium has instructions stored thereon. The instructions include a first code segment for presenting a media asset, a second code segment for identifying a content element of the media asset on a user display, the content element having been selected from content of the media asset and augmented with content metadata, a third code segment for connecting the content element to a discussion forum, the discussion forum having been established with respect to the content element, and a fourth code segment for facilitating information exchange within the discussion forum.

Implementations may include one or more of the following features. For example, the first code segment may include a fifth code segment for selecting the media asset based on preference information associated with a user of the user display. In this case, the fourth code segment may include a sixth code segment for rendering the posting information with an ordering that is determined based on the preference information.

The fourth code segment may include a fifth code segment for establishing membership of a recipient of the media asset in the discussion forum, based on user preference information associated with the recipient, or for publishing posting information input by a plurality of users. The fourth code segment may include a fifth code segment for selecting supplemental media assets having content related to the content element, and displaying the supplemental media assets in conjunction with the discussion forum.

The fourth code segment may include a fifth code segment for maintaining opinion information about a first user, based on input of a second user. In this case, the fourth code segment may include a sixth code segment for displaying postings of the first user in the discussion forum to the second user, based on the opinion information, or a sixth code segment for displaying postings of the first user in the discussion forum to a third user, based on the opinion information.

According to another general aspect, a system includes a media asset database operable to store media asset information, the media asset information including media assets and discussion objects within content of the media assets, the discussion objects resulting from a selection from the content for assignment of content metadata. The system further includes a server operable to deliver selected media assets to a plurality of users, the selected media assets including at least a common discussion object, a metadata presentation system operable to distinguish the common discussion object on user interfaces, each of the user interfaces being associated with one of the plurality of users, and a discussion forum engine operable to associate the common discussion object with a discussion forum, the discussion forum having been established based on the selection of the common discussion object.

Implementations may include one or more of the following features. For example, the discussion forum engine may be operable to provide a direct link from the common discussion object to the discussion forum, or to publish and maintain posting information received from the plurality of users A preference database may be used that is operable to store preference information associated with each of the users, wherein the server may select and present the selected media assets based on the discussion objects and the preference information. In this case, the discussion forum engine may be further operable to render the posting information with an ordering that is determined based on the preference information, or to register a first user of the plurality of users as a member of the discussion forum. Further, the preference information may be associated with the first user and include user-specific preference information of the first user with respect to a second user, and the user-specific preference information may determine a presentation of the posting information to the first user.

The posting information may be stored as a media asset within the media asset database. The discussion forum engine may be operable to establish the discussion forum prior to delivery of the media assets by the server to the users.

The details of one or more implementations are set forth in the accompanying drawings and the description below. Other features will be apparent from the description and drawings, and from the claims.

DESCRIPTION OF DRAWINGS

FIG. 7 is an example of an article.

FIG. 14 is an example of an article used in one implementation of the system of FIG. 13.

FIG. 25 is a seventh screenshot illustrating an operation of the search engine of FIG. 17.

FIG. 26 is a screen shot illustrating a technique for entering preference information.

DETAILED DESCRIPTION

Figure 1:
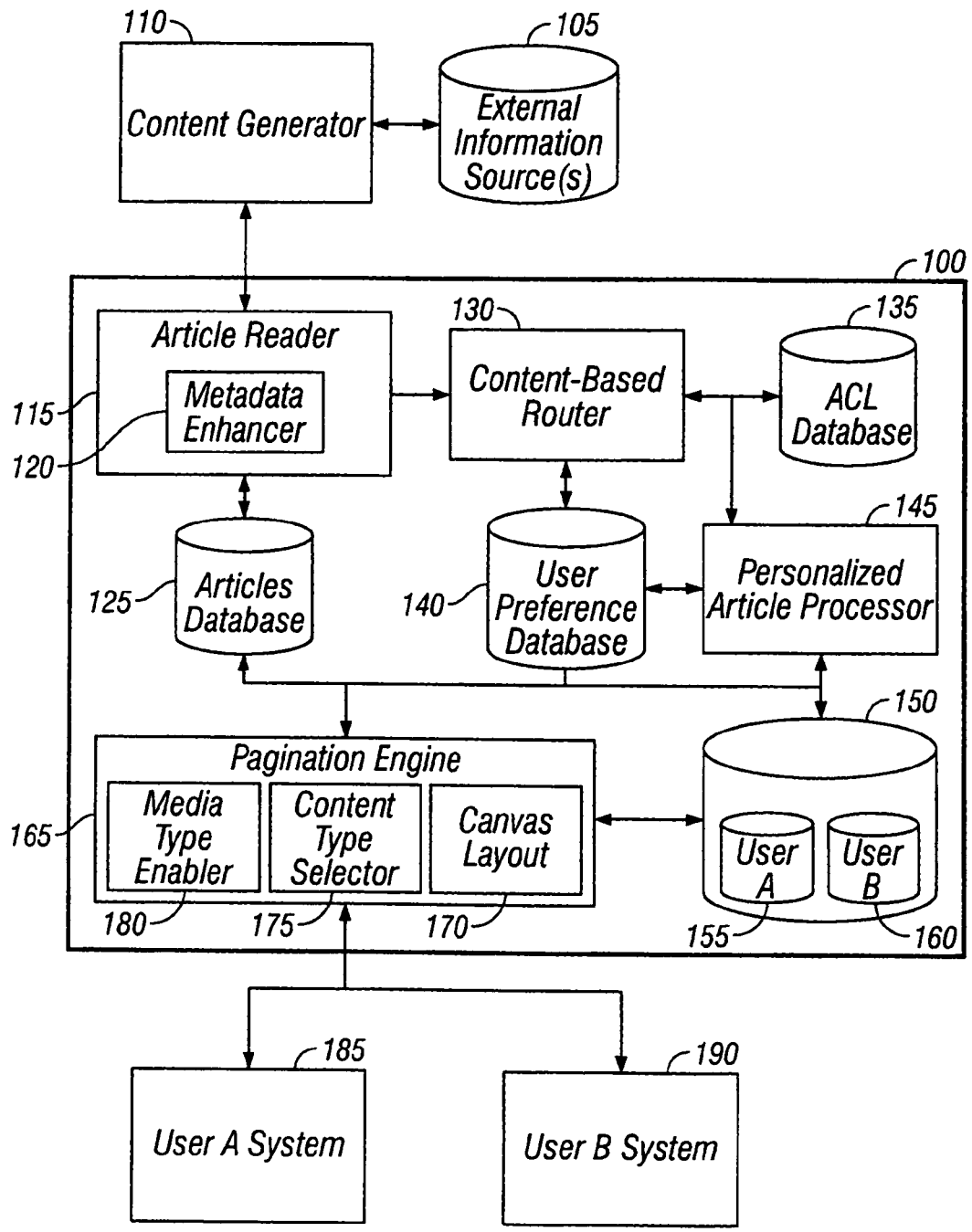
FIG. 1 is an architectural block diagram of one implementation of a content presentation system.

FIG. 1 is an example of a content presentation system including a system 100. In FIG. 1, external information from an external information source 105 is received by a content generator 110, which generates a corresponding article. Many types of external information sources 105 may be used, as will be discussed in more detail with respect to FIG. 2. Also, content generator 110 may utilize various techniques for gathering and publishing the information as discrete articles. For example, content generator 110 may utilize software agents to gather appropriate information (agents are generally defined as automatons running on a scheduled basis and querying a data source for information and either producing or not producing content based in part on the result of that query). Moreover, in other implementations, content generator 110 may be included within system 100.

The use of the term "article" in this context, as is discussed in more detail below, generally refers to a discrete collection of information that may include content and information about the content. Information about the content may include high-level attributes of the article, such as its author or general subject heading (for example, sports or weather). The information about the article also may include portions of the actual content itself used to articulate content metadata, perhaps in the form of "discussion objects."

In general, discussion objects are considered to be conceptual or tangible objects that are mentioned (discussed) as part of an article. Similarly, "discussion classes" are the types, or categories, of discussion objects. For example, an article about a discussion class of "computer manufacturers" may mention discussion objects "International Business Machines" ("IBM") many times, while only mentioning "Dell" infrequently. By determining at least some information directly from such specific discussion objects within the content of the article, this implementation is capable of accurately sorting articles against a user's interests.

Articles may be, for example, text, video, audio, HTML, or another available rendering medium, or a combination of two or more of these media. Articles may contain the same piece of content in multiple forms, and may permit generation of one type of content from another, as discussed below. Therefore, articles also may be referred to as "media assets," or other similar terminology describing such information to be passed on to a user. Content of an article may be a publicly-available web page (or portion thereof), an internal electronic mail, an individual's personal contact information, weather information, or a set of stock quotes. Content also may be obtained from specific applications, such as a profit and loss report of a company, an online analytical processing ("OLAP") report, a "print-out" of a sales order, or many other examples of discrete pieces of content to be made available to the user(s).

In FIG. 1, then, an article reader 115 accesses articles from content generator 110. Some articles may already include attribute and content metadata information. If a particular article has no associated metadata, a metadata enhancer 120 may be used to examine the content of the article and generate metadata accordingly. Even if some information, such as attribute information, is included with an article, metadata enhancer 120 may be used to further enhance the article.

In one implementation, system 100 may be provided to an enterprise as a resource for its employees and/or customers. The enterprise may have its own object model (that is, definition of permissible discussion objects) describing how the content metadata should be generated, characterized, and interpreted. These object models may differ from one enterprise to the next; for example, IBM might be a "customer" to one enterprise and a "supplier" to another. Individual enterprise object models can therefore be implemented instead of, or in conjunction with, a standardized, centralized object model.

In particular, articles generated within a enterprise may require very little metadata enhancement, whereas articles obtained from publicly-available web pages may require a substantial amount of metadata enhancement.

Accessed articles are stored in a database 125, and information referencing the articles is passed on to a content-based router 130. Although entire articles could be passed through the system 100, other techniques may be used. For example, only links to corresponding articles need be circulated through system 100, with the articles themselves remaining stored in database 125. As another example, such links may be circulated with the associated attribute and/or content metadata, but without the content itself, in this way, the article may processed (as discussed below), without actually having to circulate the article in its entirety.

Content-based router 130 examines each article with respect to its content and associated attributes and content metadata, for example, discussion objects, and compares this information to information stored for individual users. For example, an Access Control List ("ACL") database 135 contains a security clearance for each user with respect to various subjects, so that a user who is not cleared to receive certain information within an article will not receive that article. A user preference database 140 contains information about each user, for example, the extent to which a user likes or dislikes a particular subject, or the type of device(s) the user may be receiving the articles on.

Any type of router capable of routing articles based on content as described herein may be built and/or utilized to implement system 100. One type of router that is capable of performing the functionality of content-based router 130 is known as Elvin and is produced by the Distributed Systems Technology Centre (DSTC). Other types of content-based services include Gryphon, produced by International Business Machines (IBM), and Keryx, a Java-notification service by Hewlett Packard.

User preferences for populating user preference database 140 can be obtained by a number of techniques. For example, the preferences could be gained by asking users to fill out a preference form before gaining access to system 100. As another example, the preferences can be modified over time by obtaining feedback from the users, examples of which are discussed in more detail below.

By accessing databases 135 and 140, content-based router 130 is able to filter articles which are restricted or are of no interest with respect to a particular user. The action of content-based router 130 thus eases the burden on a personalized article processor ("PAP") 145, which has the job of individually prioritizing the remaining articles, based on a comparison of contents of the user preference database 140 to the content and to the content metadata/attributes of each article. Accordingly, individually-sorted articles may be stored in a sorted articles database 150, where articles for a User A and a User B are stored with their corresponding priority information for each user in database portions 155 and 160, respectively.

A pagination engine 165 thus gains access to a set of articles associated with, and prioritized with respect to, individual users. Pagination engine 165 will typically have access to characteristics of the client system being used by each user. This information may be stored in user preference database 140, or (as explained in more detail below) it may be determined from the user request at the time of the request.

In either case, pagination engine 165 determines a layout of the canvas being used by each user, using a canvas layout subsystem 170. In this context, the term "canvas" includes any rendering media in which articles may be presented. Canvas examples include web pages (on desktop computers, laptops, Personal Digital Assistants ("PDAs"), web-enabled cell phones, etc.), audio (for example, cell phone or radio), video (for example, television or Motion Picture Expert Group ("MPEG") player), or another type of device capable of receiving content within an article and presenting it to the user.

Since, as a practical matter, a canvas will typically have capacity limitations, one of the services of the canvas layout subsystem 170 within pagination engine 165 is to determine how much "space" is available to the user for displaying articles. For example, a web browser on a PDA will be able to display a smaller number of articles than a browser on a desktop computer. As another example, a user who receives audio articles via cell phone or radio may only have twenty minutes during a car ride during which to listen to articles. In short, canvas layout subsystem 170 determines any user-specific capacity constraints when deciding which articles to provide to a given user.

A content-type selector 175 determines which rendering media are available to the user for the selected canvas, and which articles are consistent, or can be made to be consistent, with that media. For example, content-type selector 175 may determine that a canvas has video and HTML capabilities, but not audio.

Finally within pagination engine 165, a media-type enabler 180 is available to enable a rendering media that would not ordinarily be available to the user (based on the content type(s) of the articles), when feasible and desired. One example of this feature is the capability of reading aloud to the user an email that is included as an article. Another example is the generation of an animation of a newscaster, complete with moving lips, to read aloud a print story to the user. These and other examples are discussed in more detail below.

During a final portion of the pagination process, pagination engine 165 aggregates the selected articles, in their selected formats, and delivers a personalized "page" of information to each user, so that each user receives articles for rendering that are of the most interest to him or her at a given point in time (or that the system determines the user should/must see, even if the user has expressed non-interest in such an article, such as a direction from the user's boss, or an article about a "hot" topic of the day). User systems 185 and 190 thus receive information suitable for rendering a page of information consistently with their respective system capabilities and requirements.

System 100 also may receive feedback from the users to be recorded in user preference database 140, so that the pages increasingly become better-personalized to each user as time goes by. The use of user preference feedback, as well as various formats in which pages may be rendered, are discussed below.

System 100 may be implemented in an enterprise environment, as discussed above, for the convenience of employees and/or customers of the enterprise. Implementations may be utilized via various other private networks, such as a university or other school network. On the other hand, implementations may be provided to members of the public at large, via the Internet.

Figure 2:
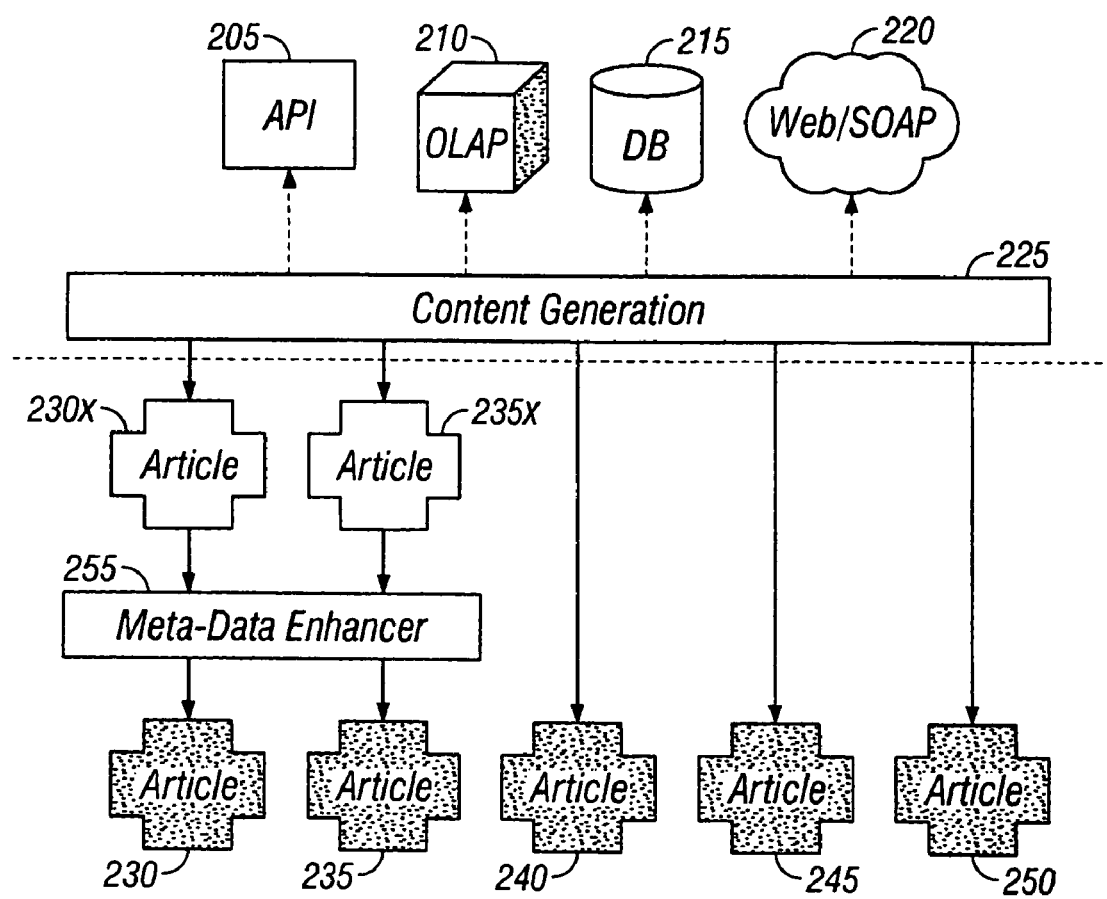
FIG. 2 is an example of a first portion of a process flow used by the system of FIG. 1.
Figure 3:
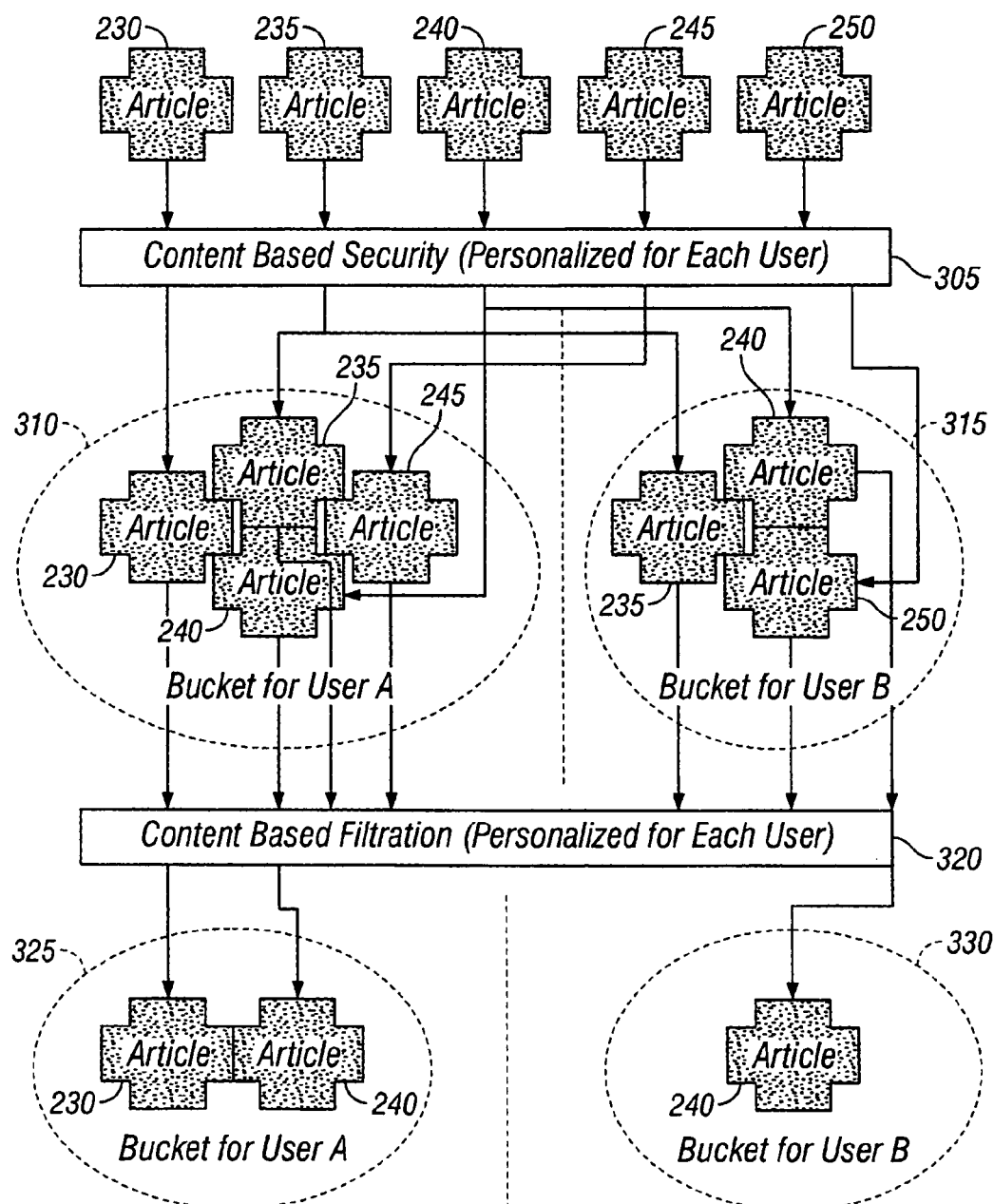
FIG. 3 is an example of a second portion of a process flow used by the system of FIG. 1.
Figure 4:
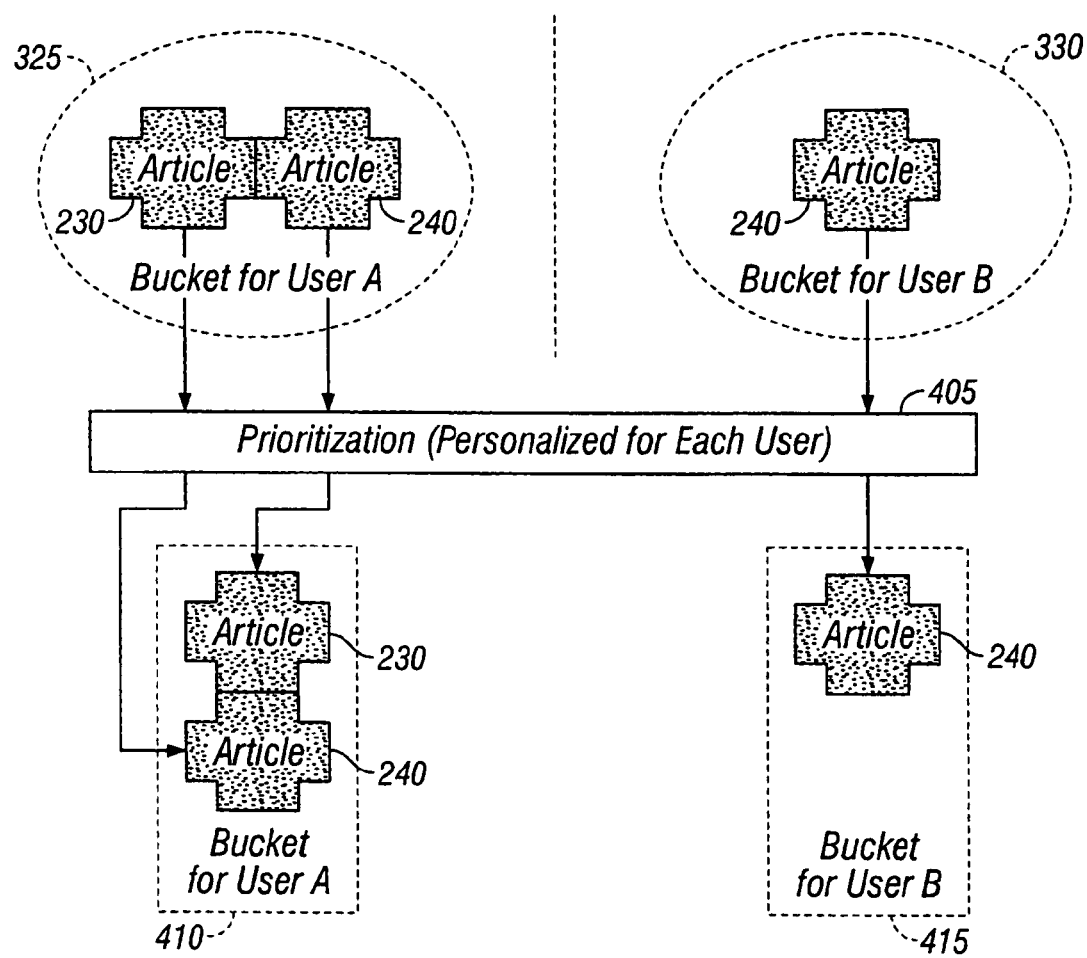
FIG. 4 is an example of a third portion of a process flow used by the system of FIG. 1.

FIGS. 2-4 demonstrate a process flow that might be used by the system of FIG. 1. FIG. 2 demonstrates a technique for gathering a pool of articles to be later filtered, sorted, and rendered to a user. In FIG. 2, sources of information for articles might include an application's application program interface ("API") 205, an on-line analytical processing ("OLAP") server 210, a database 215, and the world-wide web 220 (perhaps queried through the hypertext transfer protocol ("HTTP"), simple object access protocol ("SOAP") or other common protocols of the Internet).

Content generation occurs in a process 225, during which articles are generated. Some articles, such as articles 230× and 235×, might be generated without attribute information or content metadata. In this case, meta-data enhancer 255 may be used to examine such articles and generate content metadata to thereby produce articles 230 and 235. Other articles, such as articles 240, 245, and 250, may already be generated with attribute data (describing general features of the articles such as author and date of publication) and content metadata (characterizing actual content of the articles). It should be noted that, in FIGS. 2-4, articles including content metadata are illustrated with a dotted background, whereas articles having no content metadata (such as articles 230× and 235×) are shown with a plain background.

It should be understood that various techniques may be used for gathering article content. For example, software agents may operate in an agent execution environment which may serve as a host for the runtime execution of agents and administer execution of the agents (for example, scheduling of the agents). The agents may be used to query various databases, such as those shown in FIG. 2. On the other hand, the content could also be generated within system 100, as referred to above with respect to FIG. 1, or could be obtained by a variety of other means.

Examples of content that might be obtained according to FIG. 2 include a querying of the OLAP database 210 for a list of the top twenty customers in a particular region of an enterprise implementing system 100. For each one of these customers, an agent may access the API 205 of a customer relationship management ("CRM") application, and then report the list of top customers that have pending complaints with customer service. This list may be used as an article, as discussed below.

Another example of content for articles might be current levels of the financial markets, gleaned from the web 220. Many other types of content, whether internal to an enterprise or simply drawn from the public domain, may form the basis for an article.

In FIG. 2 and continuing into FIG. 3, articles 230, 235, 240, 245, and 250 thus represent a pool of articles, from which a subset for each user will be drawn. Once a pool of articles is established at a given point in time, a content-based security analysis 305 may be performed, the analysis being personalized for each user. Analysis 305 may be performed within content-based router 130 by accessing ACL database 135, both of FIG. 1. In this way, articles which a particular user does not have security rights to access will be removed prior to actual content-based sorting, in order to make the sorting process more efficient.

After security analysis 305 is complete, a "bucket" 310 of articles exists for a user A, and a separate bucket 315 of articles exists for user B. At this point, content-based filtration analysis 320 occurs, wherein the content-based router 130 interacts with user-preference database 140 in FIG. 1 to determine which of the articles in buckets 310 and 315 match the interests of users A and B, respectively. This process results in refined buckets 325 and 330, as shown in FIG. 3 and continuing into FIG. 4.

FIG. 4 demonstrates a prioritization process 405 that occurs within PAP 145, using data from within user preference database 140 in FIG. 1. As a result of process 405, articles within buckets 325 and 330 are prioritized and stored in final buckets 410 and 415, in accordance with the preferences of users A and B, respectively. Although FIG. 4 shows only a few articles in buckets 410 and 415 for the sake of clarity, the number of articles that can be assigned to a given user as a result of the operations of FIGS. 1-4 can be significantly higher and is limited only by system performance considerations.

Figure 5:
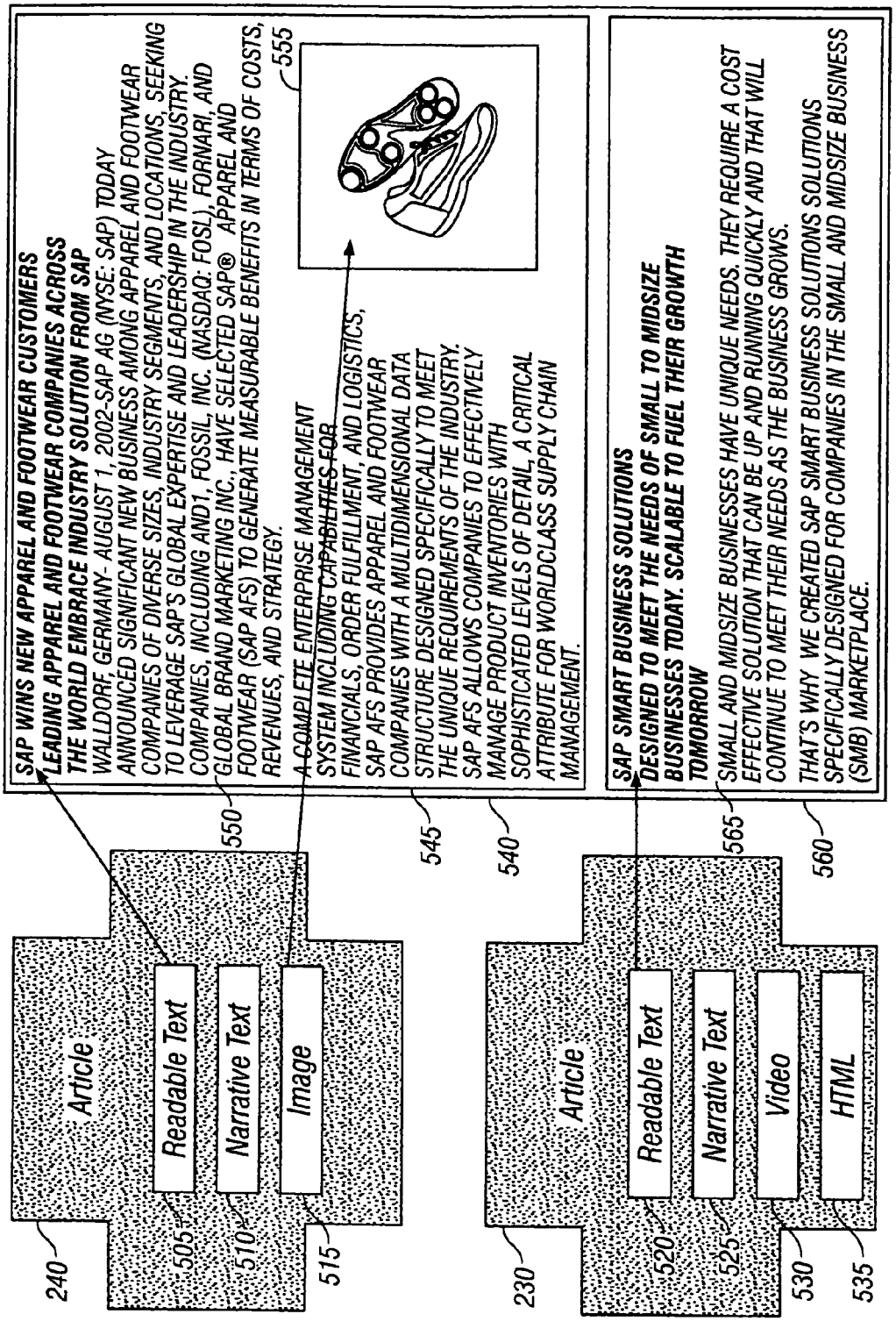
FIG. 5 demonstrates a first example of page generation.

Once the articles have been filtered, sorted, and prioritized, system 100 may begin the pagination process. FIG. 5 demonstrates a first example of page generation. In FIG. 5, articles 240 and 230, which were stored in bucket 410, are shown to contain content in various formats suitable for rendering in various media. For example, article 240 contains content blocks in the form of a readable text block 505, a narrative text block 510 (that is, text to be read as audio), and an image block 515. Similarly, article 230 contains content blocks in the form of a readable text block 520, a narrative text block 525, a video block 530, and an HTML block 535.

Based on knowledge of a user system onto which the page will be rendered, a page 540 is then created by pagination engine 165. In the example of FIG. 5, the user system capabilities and/or user preferences indicate that the article should be rendered as HTML and therefore only readable text and associated images are to be utilized.

Accordingly, page 540 includes article 240 rendered as a section 545, as well as article 230 rendered as a section 560. Section 545 includes readable text content block 505 rendered as a portion 550 in HTML form, as well as image information content block 515 rendered as an image 555 as part of the HTML. Article 230 includes only readable text content block 520 rendered as a portion 565, again in HTML form.

It should be understood from FIGS. 4 and 5 that article 240 was given a higher priority for display than article 230, and was therefore shown on page 540 prior to article 230. In general, relatively more important articles might be shown in a more prominent location on the page, while the less important ones, space permitting, might only be shown as headlines with reference (for example, hyperlinks) to the full article.

Figure 6:
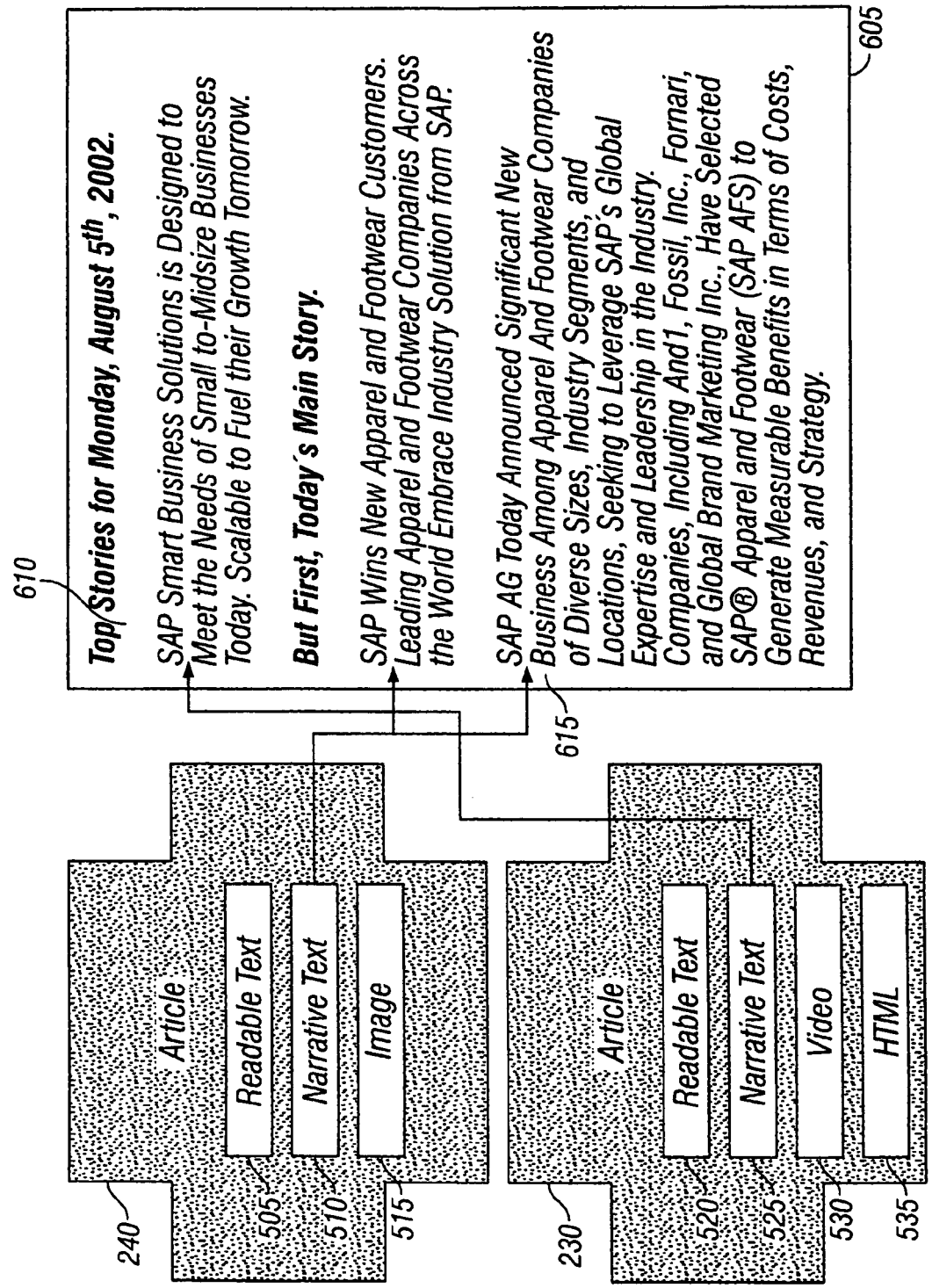
FIG. 6 demonstrates a second example of page generation.

FIG. 6 shows an alternate pagination process for rendering articles 240 and 230 within bucket 410. In FIG. 6, pagination engine 165 determines that user A should receive the content of articles 230 and 240 as audio. This might be the case for a user wishing to receive articles 240 and 230 via radio and/or cell phone. Accordingly, a page 605 includes a portion of narrative text content block 525 rendered as audio portion 610, as well as narrative text content block 510 rendered as an audio portion 615. In page 605, article 230 is still prioritized lower than article 240, and might therefore generally be rendered subsequent to article 240. However, in page 605, a slightly different format is shown, in which a portion of lower priority article is shown as a "top story" to be discussed later in the page 605, whereas the higher priority article 240 is provided in its entirety as the day's "main story."

Alternatively, a "teaser" for the main story could be given first, and then returned to after the less-important articles were read. Such alternate formats mirror popular formats of conventional news programs, and may be preferred by some users.

It should be understood from FIGS. 5 and 6 that an article may contain several content blocks or content segments, which might each represent a subset of the total amount of content within the article (or might include all of the content). Together, these portions represent the entirety of the article content, however, the content need not be shown in its entirety. For example, image 515 is not included in page 605, because the articles were to be rendered only as audio. Thus, the provision of at least a portion of an article's content, in a format most suitable for a particular user, allows maximum flexibility in providing the user with information in a personalized, convenient format.

FIG. 7 shows an example of an article used in one implementation. In FIG. 7, the article is expressed in one possible extensible markup language ("XML") form, however, other implementations of an article may take other forms. In a section 705, the article contains some general attributes like the time it was created, the importance of the story, and the author who created it.

Article 700 also contains several content blocks for one or more possible rendering scenarios. For example, a section 710 includes a "text/narrative" content block for cases where an audio description of the content is necessary (for example, if the content is to be broadcast on radio or read by a TV spokesman). This content block is analogous to narrative text content blocks 510 and 525, and includes a headline section 715, as well as a detailed content section 720.

A "text/html" content block is shown in a section 725, which is useful for cases where the content will be shown in a web browser. Section 725 also contains a headline in a section 730, as well as a body of information (in this case, a table) in section a 735.

Finally, article 700 includes a list of discussion objects in a section 740. As discussed above, these discussion objects can be included when the article is first generated, and/or can be added with metadata enhancer 120 after generation is otherwise complete. Section 740 includes relevant discussion objects that were part of the article content. In this example, four business partners were discussed in the content; therefore, the discussion objects block contains four objects of class "BizPartner." The article also relates to, and mentions in the content, the Eastern region and thus an additional object block is included to represent that object.

The discussion objects also include information about what is shown for the purpose of enforcing a security policy. In this example, article 700 shows sales numbers of customers and therefore a security realm is defined for that article stating that fact. Thus, in a filtering process such as process 305 in FIG. 3, users who are not allowed to see articles of this security realm will be denied access to the article.

Defining classes and determining what classes are available may be done in many ways. For example, classes could be rigidly defined and coupled to the system 100, or classes could be defined in a distributed manner based on the incoming messages. In the latter case, system 100 assumes that an object and class exist if and when such object or class are read in an incoming article. It does not try to enforce validity based on a pre-defined object model; in this case, the full list of discussion classes is the object model referred to above with respect to metadata enhancer 120.

Figure 8:
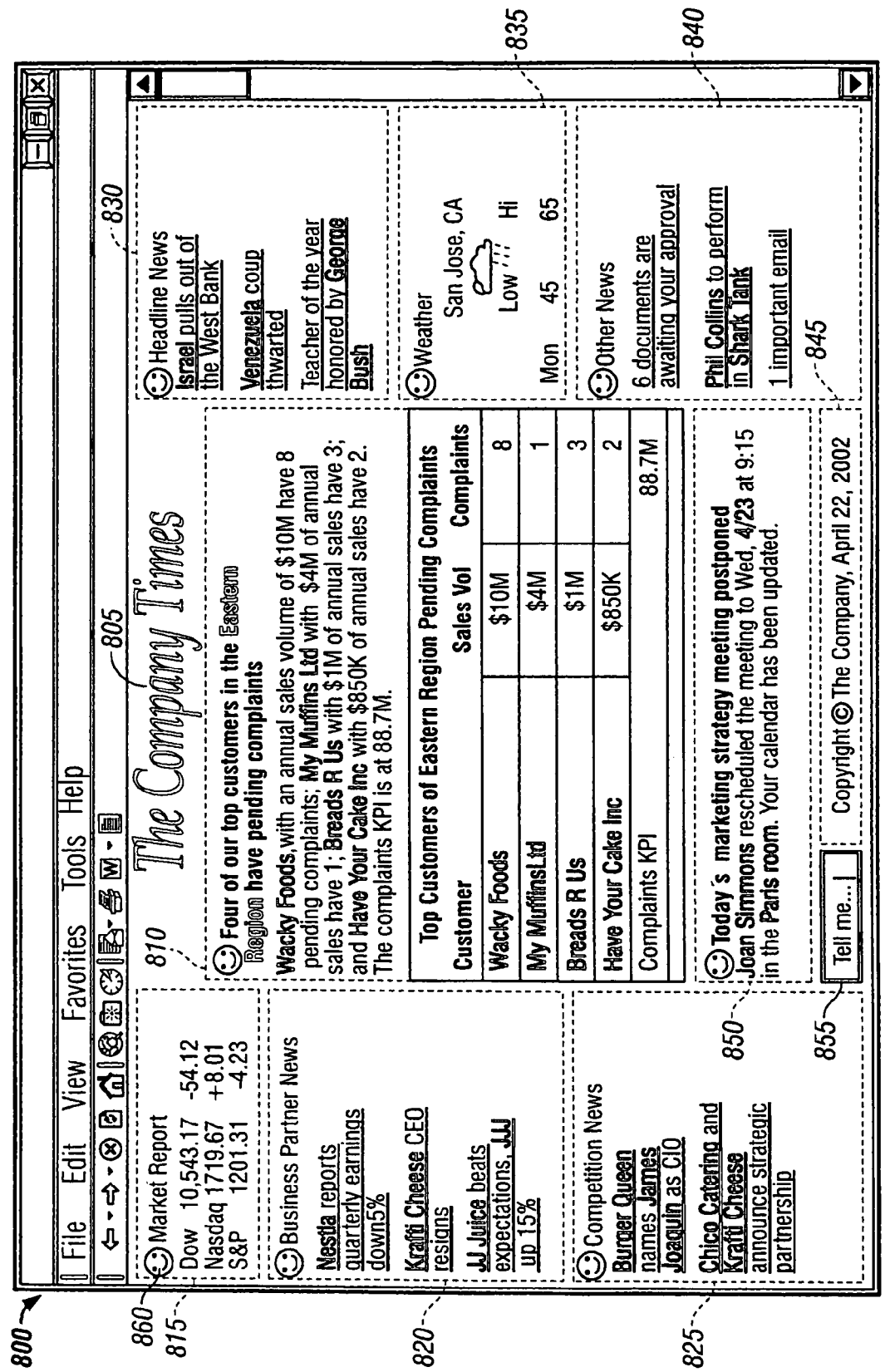
FIG. 8 is an example of a hypertext markup language ("HTML") result page.

FIG. 8 demonstrates an example of an HTML result page 800 that includes article 700. Page 800 is generally organized like a newspaper front page, having a headline 805 (which in this case indicates the enterprise sponsoring the page). A main story 810, corresponding to article 700, is shown in the upper middle portion of the page. A section 815 shows current levels of the Dow Jones, NASDAQ, and S&P 500. The rest of page 800 includes additional hypothetical articles not previously described.

The filtering, sorting, prioritizing, and paginating processes already described determine whether an article is displayed in full size (for example, article 700 in section 810), simply as a link (for example, links within sections 820, 825, 830, 835, 840, and 850, which are shown grouped together with similar articles), with a "more" link (not shown) that does not include any details but allows access to additional articles, or not at all (in case there is no room on the screen). The rules under which the articles are rendered generally take into account both subjective (that is, according to user preferences) and objective (that is, according to the author) levels of importance assigned to each article and its content.

In FIG. 8, the highest-ranking article occupies a central location. If two or more articles are categorized as highest ranking, then a number of options are available for deciding how and whether to display them. Examples include: (i) one article could be selected, at random or otherwise, (ii) all, or some, of the articles could be rotated in and out of the page (which uses time slicing as well as real estate allocation), (iii) if there is enough space, then all of the articles could be displayed, or at least part of each of them, for example, by giving each article the same amount of space or allocating space based on priority, and (iv) one article could be selected for full, or primary display, and the others could be identified with links indicating the title of the article or with a "more" link.

The concept of using time as a variable (T), as well as space (which can be considered as a single variable of area or as two variables—X and Y), can be applied in many ways to render prioritized data on a page or other format. For example, articles or other data could be displayed at particular locations for specified times, scrolled, formed into a collage, zoomed in and out with a fixed or variable size space, etc.

It should be noted that articles within page 800 may take many various forms besides the form of a general news articles. For example, section 840 includes an email that can be read by, or read to, the user. Section 840 also includes internal documents to be approved by the user. As a final example, section 850 is devoted to a personal scheduling issue of the user.

In any case, page 800 is generally arranged such that more important articles, as determined by system 100, are assigned a more prominent position and/or size, whereas less important articles are assigned a less prominent position and/or size (and/or are shown only partially or in summary form). Such prioritized assignment of "real estate" on page 800 is generally without respect to a given category into which an article of page 800 might fall, but rather, as explained above, is determined based on the actual content of the article(s).

Some implementations may group together articles of similar type or content, and in essence "categorize" the page view. For example, all email articles might be shown together. Such categorization may be done dynamically, based on the available content. In some of these implementations, categories such as "emails" may be used due to the presence of a large number of articles within that category for a particular user; in these cases, a combined priority weighting may be used to determine their (collective) prominence on page 800. In others of these implementations, a location for a specific subset may be determined in advance; such fixed positioning may be used for all or part of page 800.

Page 800 may allow the user to express his preferences regarding what is shown in several different ways. In this implementation of the user interface ("UI"), every identified discussion object in the page is highlighted and also an icon (for example, "smiley face" 860) is located next to some articles or groups of articles. By clicking on any of these icons and/or discussion objects, the user is provided with a dialog that allows him to express his opinion on the object or article associated with the point where he clicked.

For example, user A may have previously indicated that articles about the customer Wacky Foods (the company's most important customer) are to be upgraded. Article 700's importance is shown as Normal within section 705 of FIG. 7, but since it discusses Wacky Foods, its importance level is upgraded to Important for user A. Article 700 may thus be shown in a more prominent location in the result page for user A.

A future article about Wacky Foods may come in as already being designated as Important. In such a case, user A's upgrade will make that article Critical, emphasizing it in the result page 800. This later article will then show more prominently than article 700.

Figure 9:
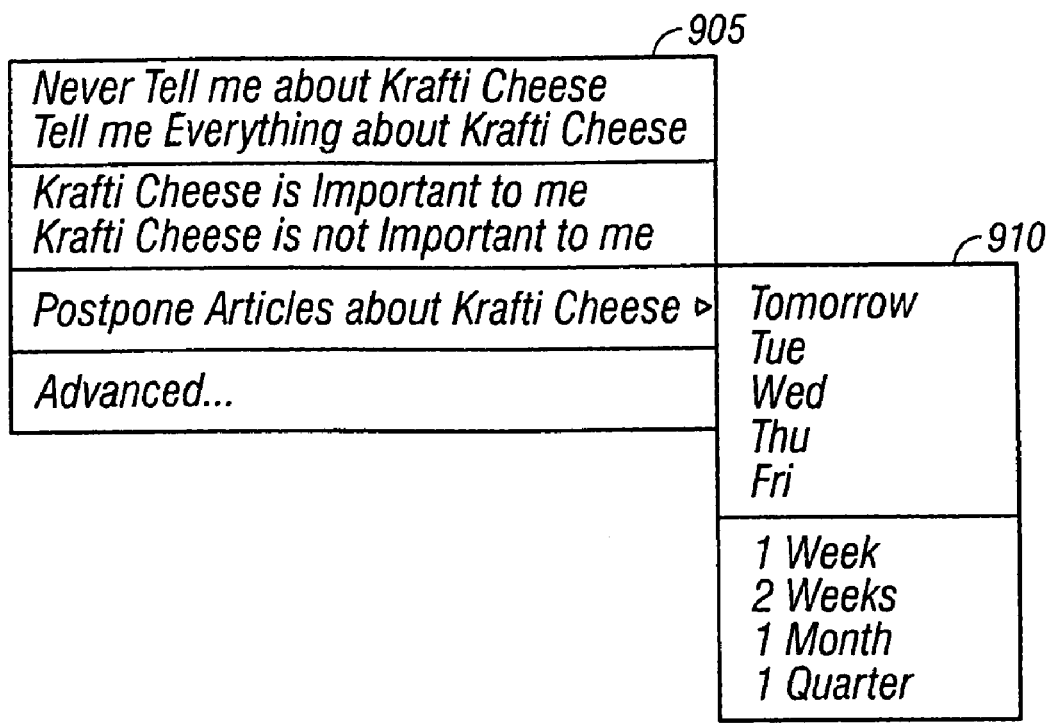
FIG. 9 is a first example of a context menu designed to allow users to input preference information.

Further illustrating techniques by which a user may indicate preferences as to which articles should be shown and how they should be shown, FIG. 9 demonstrates a context menu 905 designed to allow users to input preference information. Context menu 905 may be accessed by a user by clicking on a highlighted discussion object within an article.

For example, a user may click on the words "Krafti Cheese" within one of the links contained in section 820. In context menu 905, the user is then able to indicate one of five possible opinions on Krafti Cheese: never to be shown articles about Krafti Cheese (but note that in cases where articles contain both Krafti Cheese and a discussion object that the user has expressed explicit interest in, the article may still be shown); always to be shown articles dealing with Krafti Cheese; upgrade (or promote) the importance of articles containing Krafti Cheese; downgrade (or demote) the importance of articles containing Krafti Cheese (if the user downgrades a discussion object some predetermined number of times, that discussion object may be thereafter blocked completely); and postpone articles about Krafti Cheese for a specified period of time (this option is useful if the user has more important tasks at the moment but wants to be informed of such articles at a more convenient time).

In the last example, context menu 910 illustrates time periods which may be selected to set a length of a postponement.

Finally, context menu 905 includes an advanced opinion dialog, provided for cases where the user wishes to express, for example, complex conditional opinions on the discussion object. One such condition might be to block all articles about Krafti Cheese unless they are marked as important. Another example might be to block Krafti Cheese articles that originated from publicly-available sources. The "Krafti Cheese" article within section 820 referred to above, about a CEO resignation, is an example of such an article. The fact that it is publicly accessible may be indicated as an attribute of the article, for example, as a security realm, as a custom attribute, or by an author of the article.

It is also possible, though not shown in FIG. 9, to allow the user to express an opinion about the class of the discussion object. This option would allow the user to no longer receive articles concerning any business partners, not just Krafti Cheese.

In a similar fashion, the user may express an opinion about an article as a whole. For example, if the user is no longer interested in receiving a stock market update in section 815, the user may click on the "smiley face" icon 860 next to the market article in section 815.

Figure 10:
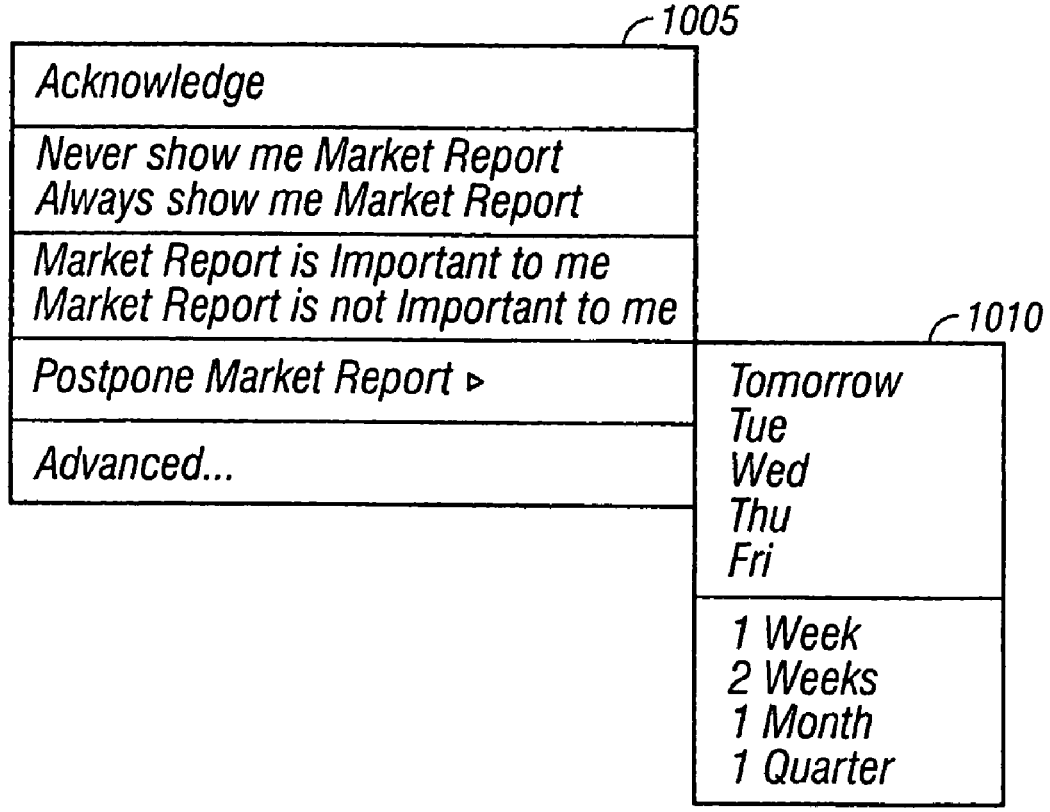
FIG. 10 is a second example of a context menu designed to allow users to input preference information.

FIG. 10 demonstrates an opinion dialog 1005 that enables the user to express his opinion about an article such as the market report article within section 815. Similarly to context menu 905, context menu 1005 allows the user to characterize the article in question. For the postpone operation, a box 1010 is available to provide similar options to those discussed with respect to context menu 910.

An additional option shown in context menu 1005 is the ability to Acknowledge an article, allowing the user to express the fact that he or she does not want to be informed of this particular instance of the article anymore. Future versions of the same article, however, would still be considered interesting to that user.

It is also possible to let the user provide more information. For example, the user may give a reason why he or she is no longer interested in this article, the reason being, for example, one of the discussion objects contained within the article. This feature may be useful in cases where the full article is not fully displayed on screen, and therefore its discussion objects are not visible. For example, the first article in section 840 talks about six documents, but names and authors are not shown as part of the link because of lack of space. The user may specify that he no longer wants to be notified about documents from John Doe (a hypothetical author of one of the documents), for example.

In many cases, the user would like to indicate his preferences regarding objects that are not currently displayed on the screen. Such objects may have been read in a story in a newspaper, or seen on TV, or heard in a rumor. For those cases, the system 100 provides a Tell Me input box or similar UI in section 855 that enables the user to enter the name of what he or she is looking for.

As an example, if the user heard from the sales manager that sales of Pizza Zitti are down 5% this quarter, the user can type in Pizza Zitti in the Tell Me box and press enter. The system 100 will look up the object that matches the text, possibly presenting several options for the user to choose from. In this case, Pizza Zitti is a product, so every article containing a reference to this product will be prioritized based on the user's preferences regarding Pizza Zitti.

Figure 11:
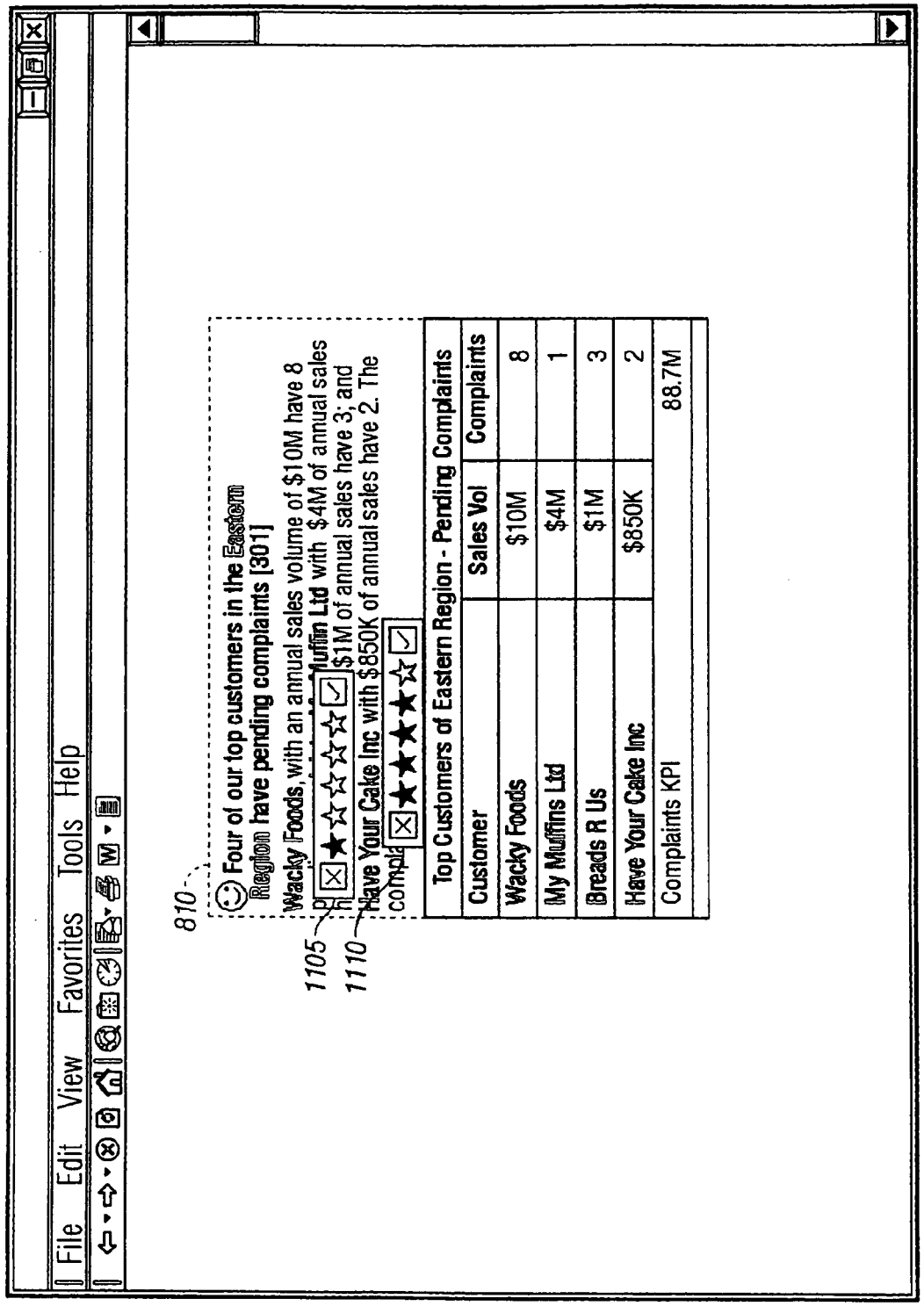
FIG. 11 is an example of a floating toolbar designed to allow users to input preference information.

FIG. 11 demonstrates a different technique by which the user may express his or her opinions about a discussion object. In FIG. 11, clicking on a highlighted discussion object results in a pop-up box that allows the user to rate the discussion object. In FIG. 11, the discussion object "Wacky Foods" has been given one out of a possible five stars in pop-up box 1105, whereas the discussion object "Have Your Cake, Inc." has been given four out of five stars in a pop-up box 1110. Pop-up boxes 1105 and 1110 also include an "x" and a "check" box, by which a user may choose to "block" the given object or select to "always see" it in the future, respectively, as described above. Pop-up boxes like boxes 1105 and 1110 may be used with respect to individual discussion objects, classes of discussion objects, or may be used with respect to articles as a whole.

Figure 12:
FIG. 12 is a page that reflects user-expressed opinions with respect to the page of FIG. 8.

FIG. 12 demonstrates a page 1200 that reflects user-expressed opinions with respect to page 800 of FIG. 8. Specifically, page 1200 illustrates the situation in which the user (1) clicked on the Market Report 815 opinion icon 860 and indicated "no interest" in Market Reports, and (2) clicked on the words "Krafti Cheese" in section 820 and indicated "no interest" in Krafti Cheese.

Page 1200 reflects the resulting new set of preferences. Specifically, articles about Krafti Cheese in sections 820 and 825 are removed, and a new article entitled "Milky Way Milk files Chapter 11" is included instead. Also, the Market Report in section 815 is gone, and the weather article in section 835 has taken its place. Finally, additional space created by the above changes, particularly movement of the weather article in section 835, permits the addition of two new articles in section 840.

In some implementations, system 100 may learn automatically by observing the user's behavior. For example, if a user clicks on a particular article, the implementation may increment the priority of one or more of the various discussion objects represented by that article. Two possibilities, for example, are that (1) all of the discussion objects or object classes in that article are incremented in priority, or that (2) only a primary discussion object in that article is incremented. A primary discussion object could be determined in a variety of ways, such as, for example, by counting occurrences of search strings in the article. Priority may be a numerical scale or otherwise, allowing easy incrementing and decrementing.

Various operations depicted in FIGS. 2-6 may be combined. For example, operations of agents in gathering information for articles may be combined with the filtering, sorting, prioritizing, and/or pagination operations. In one implementation, each user may have an individual "agent" that performs all of the filtering, sorting, prioritizing, and/or pagination operations when a page is requested by the user.

Also, articles may be pushed straight from a source, rather than being collected by an agent. In one implementation, articles are broadcast and are filtered at the time of broadcast, by the broadcaster, to place them in one or more buckets. In another implementation, a user's system performs the filtering operations on articles as the articles are broadcast. In either of these implementations, the function of the agent has been moved to the broadcaster and the user, respectively, and the agent execution environment has been removed.

One implementation may process articles as they come in, filtering them into the buckets of each user at that time. The articles wait in that bucket until such time as a user requests a page. At that time the prioritization and pagination processes kick in, and the page is created. This may provide improved performance over filtering at the time a user requests a page, particularly in cases where the user logs into the system 100 relatively rarely.

Various implementations allow: (i) filtering articles or other data based on content of the delivered or available data, (ii) adjusting display of data based on content, (iii) filtering articles dynamically, upon viewing, or otherwise, (iv) adjusting display of data dynamically, and/or (v) separating producers of articles or other data from consumers of the data.

Implementations discussed above contemplate the use of audio and video presentations as part of a personalized delivery of content. In some implementations, these and other features can be utilized outside of the context of system 100 and the associated discussions above, and can be implemented similarly to portal-based techniques.

Figure 13:
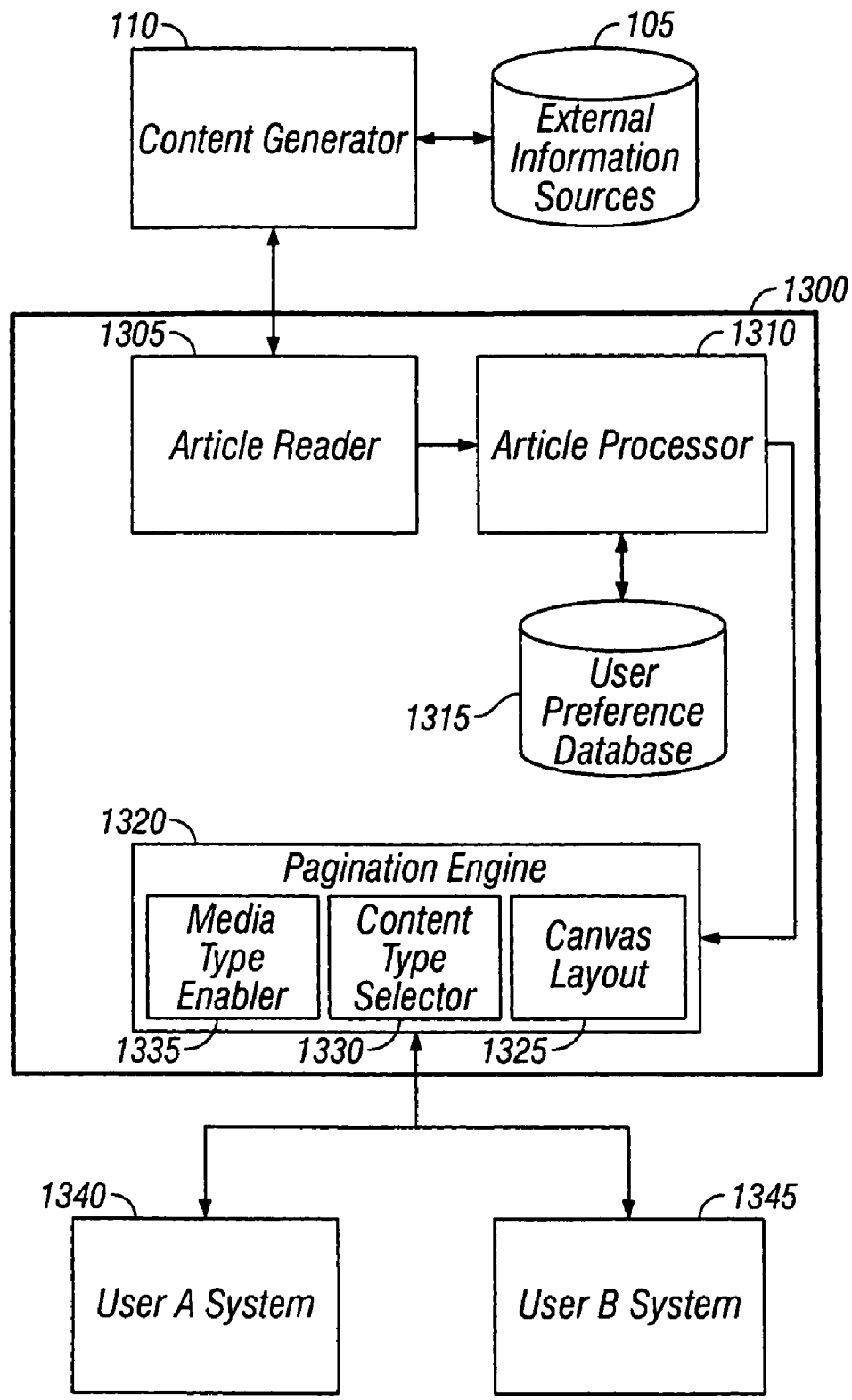
FIG. 13 is an architectural block diagram of an example of a content presentation system designed primarily for generating personalized audio and video.

FIG. 13 demonstrates an implementation of a content personalization system designed primarily for generating personalized audio and video-based information systems.

In FIG. 13, article reader 1305 obtains articles from content generator 110. An article reader 1305 need not include a metadata enhancer, and need not store the articles separately (although the articles could be cached for possible later use, as is known). An article processor may then associate articles with particular users, using a user preference database 1315. This association may occur by virtue of content metadata such as discussion objects contained within the articles, as discussed above, or may occur only by virtue of a comparison of general article attributes to user preferences.

A pagination engine 1320 communicates with both article processor 1310 and user systems 1340 and/or 1345. Pagination engine 1320, as with pagination engine 165 of FIG. 1, will typically have access to characteristics of the client system being used by each user, either from user preference database 1315, or determined from the user request at the time of the request.

In this way, pagination engine 1320 determines a layout of the canvas being used by each user, using a canvas layout subsystem 1325 that is similar to canvas layout subsystem 170 of FIG. 1. As with canvas layout subsystem 170, one of the services of the canvas layout subsystem 1325 is to determine how much "space" is available to the user for displaying articles, as well as any other user-specific capacity constraints relevant to deciding which articles to provide to the user(s).

Content-type selector 1330 may then determine which rendering media are available to the user for the selected canvas, and which articles are consistent, or can be made to be consistent, with that media. Media-type enabler 1335 is available to utilize a type of media that would not normally be available to the user, as discussed above with respect to media-type enabler 180.

As referred to above, in the implementation of FIG. 13, article selection and layout may be determined essentially as is done in the context of traditional portal technology, or may incorporate any or all of the advantageous features of system 100. In any case, as discussed in more detail below, system 1300 serves to provide personalized audio and/or video presentations above and beyond the context of traditional browser-based technologies.

FIG. 14 demonstrates an article 1400 used in one implementation of the system. Article 1400 is similar to article 700 in many respects, and is also written in XML. In article 1400, a section 1405 contains general attributes of the article, such as its author, time of creation, and level of importance. A section 1410 labels a first content portion as being narrative text in proper grammar for reading and having a headline portion 1415 and a details portion 1420.

A section 1425 labels a second content portion as being HTML-based, with a headline in section 1430 and a table 1435, as its detailed content.

A section 1440 labels the next content block as containing a viewable image in a standard format such as ".gif." The image has an associated headline in section 1445, and is itself located in section 1450. Finally, a section 1455 labels a last content block as containing music, which may be, for example, background music having no words, in a standard format such as "midi." The actual midi file is in a section 1460.

Although not explicitly shown, it should be understood that video (for example, MPEG) and other formats also may be used. Also, as should be understood from FIG. 6, articles such as article 1400 may include summaries of the articles, or of article portions. Also, content blocks may be labeled as mutually exclusive or not, for example, typically an article summary would not be included in the same page as the article itself, as that would be redundant.

Figure 15:
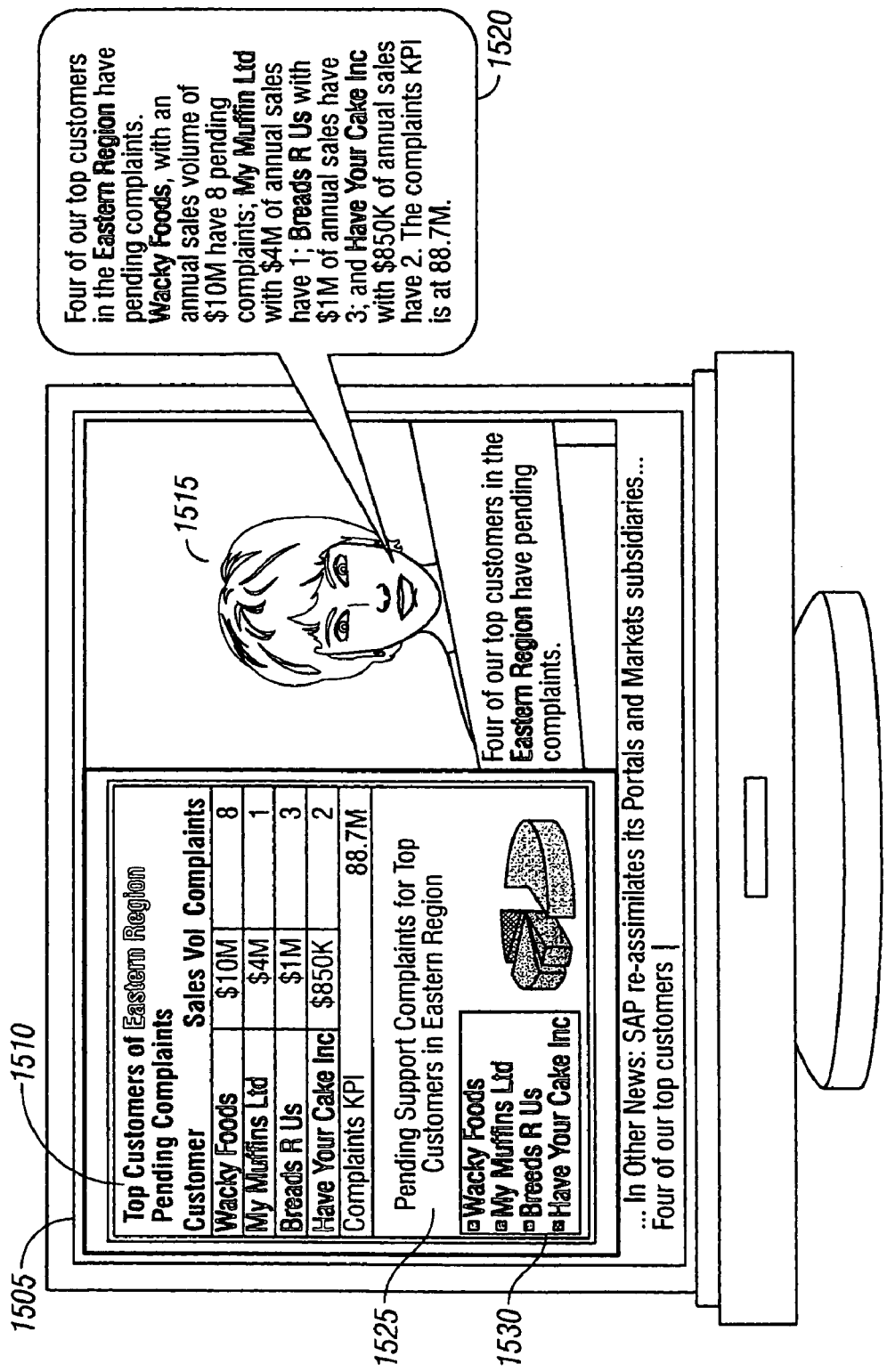
FIG. 15 is an example of a rendering of an article using the system of FIG. 13.

FIG. 15 shows one implementation of a rendering of article 1400. In FIG. 15, a computer 1505 displays in a section 1510 the HTML table from sections 1430/1435 of article 1400. A section 1515 depicts an anchorwoman "reading" the story of section 1415/1420; that is, a computer-generated image of a woman with animated lips and eyes moving to simulate talking, generates audio represented by a section 1520. Headline 1425 may be read by the generated anchorwoman image, and/or may be shown as an image 1535 (note that, since narrative text can be treated as readable text, it does not always have to be read).

A section 1525 displays the gif image from sections 1445/1450 of article 1400, and though not explicitly shown in FIG. 15, the midi music file from section 1460 may be played in the background, or may be ignored. Finally, a section 1530 displays additional headlines from other articles, which may be aggregated for inclusion in the display of computer 1505 by pagination engine 1325. These articles may be, for example, articles designated as "headlines of the day" by article processor 1415 or articles related to the currently-displayed article. These articles may be non-specific to users A and B, or may be specific to a group of users.

In FIG. 15, the layout places the sensory input types into appropriate positions. For example, the anchorwoman cannot "read" an image; she can only read narrative text. The system 1300 has chosen, using canvas layout subsystem 1325, to display the two viewable images contained in the article 1400; two are shown because there is enough real estate on the screen of computer 1505. Other implementations may show one at a time, flicking between them, or not show some of them at all.

The following examples demonstrate various utilizations of content presentation systems. Many people today spend a lot of their time commuting to work. They sit in a car usually listening to the radio without the ability to access corporate data, or perhaps they have a conference call with several colleagues. Content presentation systems as described herein may allow this time to be better used by generating an audio track summarizing the day's news. The track's time length can be set so as to cover the time it takes the employee to commute. Then, the employee can simply call a phone number to access the information needed to start the day. Alternatively, the audio track may be delivered to a capable audio player like an MPEG Layer 3 ("MP3") player or a PDA. Delivery may be made, for example, by downloading from a cellular network.

In a company building, there are several places of high-traffic where people congregate. Those places are often characterized by not having access to computers. Two examples of these places are the lobby and the cafeteria. Implementations of content presentation systems may be used to generate a video track that will run in a loop and be shown on a television screen. People can then watch that video while they wait in the lobby (for example, public company data shown to a guest of the company) or eat lunch (for example, internal company news for its employees).

Another example of a location where people wait, often with little or nothing to do, is an airport. In many airports, next to the boarding gate, there are TV sets tuned to a news station, such as the Cable News Network ("CNN"). In some cases, the channel is even customized for airport use. However, there is only one channel for all airports, so the channel is not personalized to a particular airport or even a gate. Various implementations allow for such personalization. For example, depending on a destination of a flight leaving a near-by gate, as well as connecting flights out of that location, the video may show relevant weather reports, flight delays, security alerts, or terminal maps.

Various implementations allow a content editor to personalize an information system for a group of users, such as by personalizing a TV station for passengers at a particular gate in a specific airport. Various implementations allow an individual user to personalize an information system for himself, such as by personalizing a voicemail recording of particular news items so that the user can listen to it during the morning commute. The acquisition, rendering, and delivery of such personalized information can be automated and no human involvement is necessary. Mediums such as, for example, TV, telephone, computer, and radio can be used.

Moreover, the personalization process itself can be automated. For example, using the example of the airport gate TV, the destination of a flight can be input as "user preferences" in database 1315 (here the "user" is, for example, an airport administrator, and system 1340 is the gate TV) by accessing a flight schedule database.

As already mentioned, acquiring, rendering, and editing data, as well as various other operations, can be performed in whole or in part using elements of system 100. Additional editing may be used to control the content for a specified period of time. For example, a user may personalize the rendering format to provide ten minutes of different content in an audio format. Articles or other data could be prioritized based on content, with entire articles narrated in order of priority. Such narration could be used in an audio format, and also in a video format with additional information being visible.

A number of implementations of methods and systems for presenting personalized content have been described. Nevertheless, it will be understood that various modifications may be made. For example, the system 100 can be used without the personalized security and/or preference-based filtering performed in content-based router 130; that is, all articles in database 125 may be prioritized by PAP 145. Also, prioritization in PAP 145 may occur before security/preference-based filtering. Security-based filtering may occur without preference-based filtering, and vice-versa. Also, content-based router 130 could be implemented in two separate subsystems, one subsystem being responsible for security-based filtering, while the other subsystem is responsible for preference-based filtering.

Figure 16:
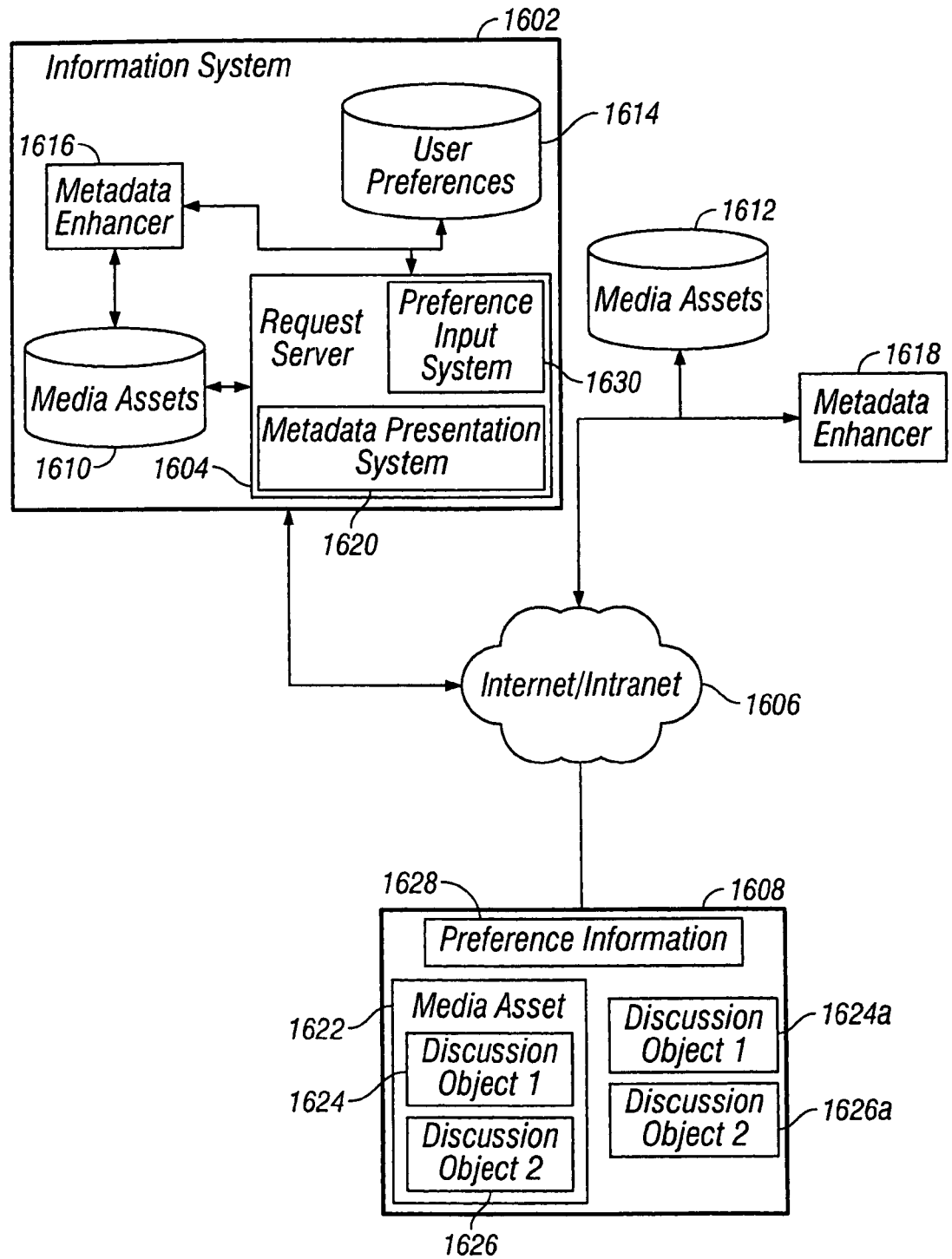
FIG. 16 is a block diagram illustrating a structure and use of a personalized information system.

FIG. 16 is a block diagram illustrating a structure and use of a personalized information system 1602. In FIG. 16, the information system 1602 includes a request server 1604 operable to output media assets, using a network 1606, to a user of a user interface 1608. The network 1606 may be for example, the public Internet, or may be an intranet, such as an enterprise-wide intranet. The user interface may be shown on a presentation device, which may be some type of user display. Such a user display may be, for example, a television or computer screen. Such a presentation device includes presentation of content in any format, including video, audio, text, or any other format, or any combination thereof.

The request server 1604 may obtain media assets from a plurality of sources. For example, a media assets database 1610 is shown as being co-located with the request server 1604 within the information system 1602. Alternatively, the request server 1604 may obtain media assets from external sources, via network 1606, where the external sources are represented in FIG. 16 by an external media assets database 1612.

The request server 1604 selects particular media assets for delivery to the user based on user input and/or information stored in a user preferences database 1614. The request server 1604 is assisted in populating the user preferences database 1614, and in selecting particular media assets for delivery to the user, by the use of metadata associated with each of the media assets. Such metadata may be added to, and/or identified within, each of the media assets by the request server 1604, using a metadata enhancer 1616 that is co-located with the request server 1604 within the information system 1602. Alternatively, media assets obtained from sources external to the information system 1602, that is, from the media assets database 1612, may be similarly, but externally, supplemented by an external metadata enhancer 1618.

The metadata enhancer 1616 may be similar to, or the same as, the metadata enhancer 120, discussed above (for example, see FIG. 1 and associated discussion). Thus, the metadata enhancer may be used to identify and classify discussion objects, as discussed herein, or may be used simply to identify particular words, numbers, or other content characters/elements within a media asset. Such identification may, for example, allow a user to input preference information with respect to the identified content element. The content elements could be identified by, for example, matching elements within the content to a predetermined list of elements. As another example, the metadata enhancer 1616 may have the ability to analyze content for types of information, such as examining content for numbers in the form xxx-xx-xxxx, and identifying this content element as a social security number. Other techniques could also be used for selecting content elements from within the content of a media asset.

It should be understood that some or all of the functionality of the request server 1604 may be performed on the client side, that is, at a local computer of the user. For example, preference information related to the user may be stored and used locally, and changes to the preference information (which may be updated or modified in the various manners described herein) also may be stored locally. Similarly, metadata enhancement and presentation within (or with respect to) a particular media asset may be performed on the client side, and may be performed on media assets stored locally and/or obtained via the network 1606.

The term "media assets" in this context, as discussed in more detail herein, generally refers to a discrete collection of information that may include content, as well as information about the content. Information about the content may include high-level attributes of the media asset, such as its author or general subject heading (for example, sports or weather). The information about the media asset also may include portions of the actual content itself, used to formulate the content metadata referred to above.

Such content metadata may be referred to herein by a number of terms, such as metadata, elements, content elements, objects, or discussion objects. In general, "discussion objects" are considered to be conceptual objects that are mentioned (discussed) as part of a media asset. Similarly, "discussion classes" are considered to be types, or categories, of discussion objects. For example, a media asset about a discussion class of "computer manufacturers" may mention the discussion object "Hewlett Packard" many times, while only mentioning the discussion object "Dell" infrequently.

It should be understood that a discussion object within a media asset may represent more than the literal representation of a particular word. For example, a discussion object "America" may be associated with various terms determined to have similar meanings, such as "U.S.," or "United States." By analyzing and considering information conveyed by, or with respect to, such content metadata, the implementations discussed herein are able to gather and utilize user preference information in the manner discussed below.

The term "media assets" is used herein to represent, for example, text, video, audio, HTML, or any other available rendering medium, or a combination of two or more of these media. Media assets may contain the same piece of content in multiple forms, and may permit generation of one type of content from another (for example, generation of audio content from textual content). Media assets may be referred to by multiple terms, such as "articles," "documents," or other similar terminology describing information to be passed on to a user.

Content of a media asset may be obtained from, for example, a publicly-available webpage (or portion thereof), an internal electronic mail (e-mail), an individual's personal contact information, weather information, or a set of stock quotes. Content also may be obtained from specific applications such as a profit and loss report of a company, a printout of a sales order, or many other examples of discrete pieces of content to be made available to users. Media assets may include files stored locally on the user's computer, such as, for example, office-productivity documents such as word processing files, spreadsheets, or presentations.

By using content metadata such as the discussion objects mentioned above, the request server 1604 within the information system 1602 is able to gather and utilize very specific information about particular media assets, as well as different users' interest levels in those media assets. For example, the request server 1604 may include a metadata presentation system 1620 which specifically identifies discussion objects or other content metadata for a user within the display 1608.

In FIG. 16, for example, a media asset 1622 is presented to the user on the display 1608 by the request server 1604. The media asset 1622 has a first discussion object 1624 and a second discussion object 1626, which are particularly presented to the user by the metadata presentation system 1620. The presentation of the discussion objects 1624 and 1626 by the metadata presentation system 1620 may include, for example, highlighting, underlining, or bolding the discussion objects 1624 and 1626 within the content of the media asset 1622. As another example, the discussion objects 1624 and 1626 may be presented outside the content of the media asset, and within a separate portion of the display 1608, as a discussion object 1624a and a discussion object 1626a.

Regardless of how the discussion objects 1624 and 1626 are presented, a user of the display 1608 can enter a piece of preference information 1628 particularly regarding one or more of the discussion objects 1624 and 1626. The request server 1604 may thus input the preference information 1628 using a preference input system 1630, and thereby store preference information of the user within the user preferences database 1614.

As described in more detail below in various contexts, the implementation of FIG. 16 provides for fast, easy, and efficient collection of user preference information. Users are allowed to enter very specific preference information, while in the context of a particular media asset and/or user session, and/or while they are viewing the media asset. This preference information may include, for example, not only whether the user likes/dislikes a particular element of the media asset, but also an extent to which the user likes/dislikes that element. In the example of FIG. 16, the user will be able to express his or her opinion about particular elements of the media asset 1622, without ever having to leave the display 1608 currently displaying the media asset 1622.

Moreover, information other than preference information may be entered in a similar manner, for example, with respect to a particular element, as that element appears within a particular media asset. For example, an administrator may want to select the discussion object 1624 to create a record or listing of every media asset containing this discussion object, or to route media assets containing this discussion object to particular destinations/users. Such a rule or macro, for example, for the particular content element may be created with the content element is viewed within a media asset.

The information system 1602 of FIG. 16 may be implemented in various ways and in various settings. As examples, FIGS. 17-25 discuss variations of the information system 1602 in the context of a network search engine, while FIGS. 28-32 discuss variations of the information system 1602 in the context of a network portal page. As further examples, FIG. 33 discusses a variation of the information system 1602 in the context of a reverse-query portal page, while FIGS. 34-36 discuss variations of the information system 1602 in the context of a video presentation, such as a television broadcast.

Figure 17:
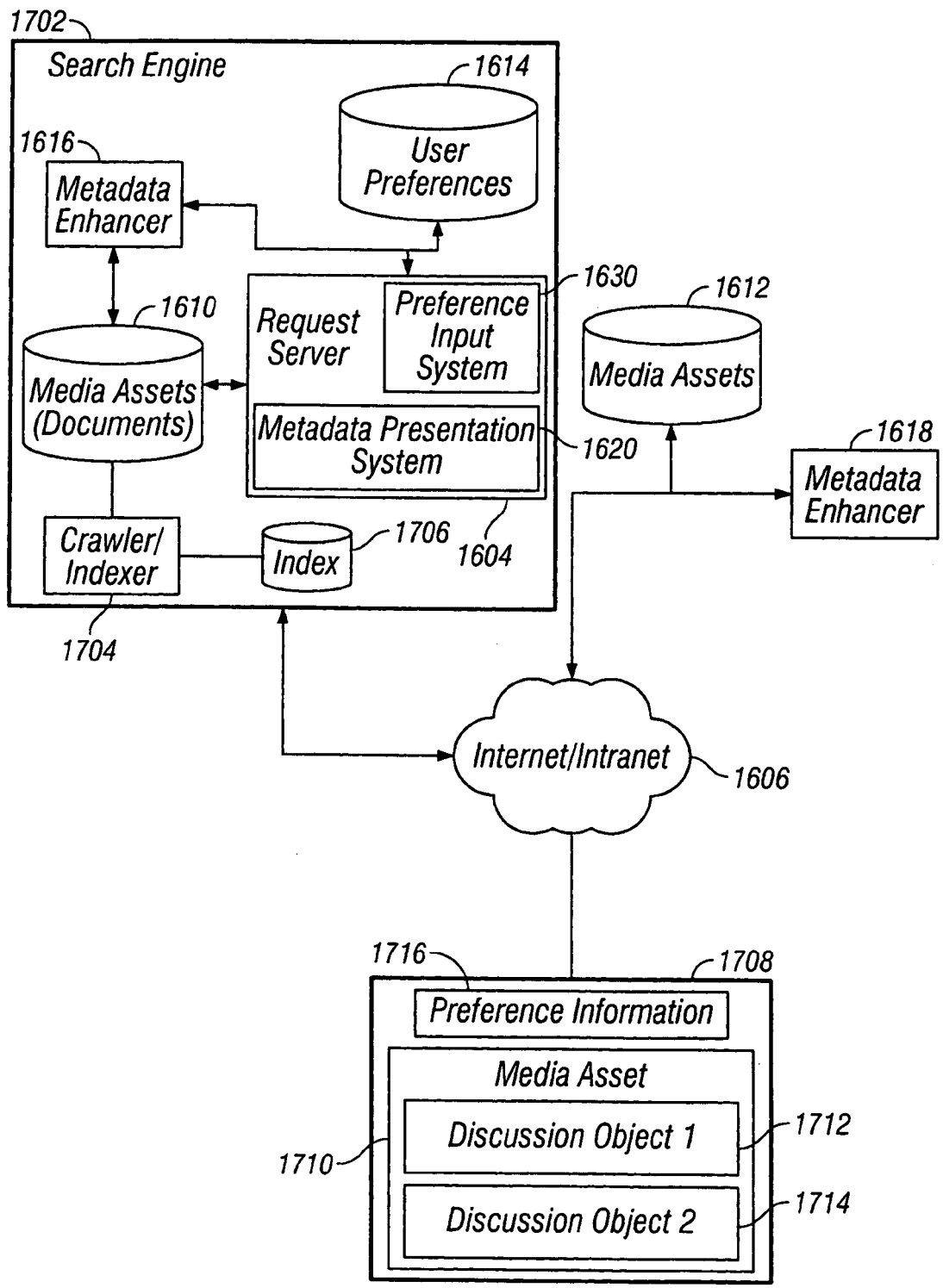
FIG. 17 is a block diagram illustrating a structure and use of an internet search engine.

FIG. 17 is a block diagram illustrating a structure and use of an internet search engine 1702. The search engine 1702 includes various elements in common with the information system 1602 of FIG. 16, and these common elements are not further described. The search engine 1702 utilizes a crawler/indexer 1704 to scan external data sources represented by the media assets database 1612. The crawler/indexer 1704 then analyzes and indexes the media assets obtained in this manner, storing the media assets (or a pointer to their remote location(s)) in the media assets database 1610, while storing the index information in an index database 1706.

In operation, the search engine 1702 typically receives a search request for one or more search terms from the user, examines the media assets database 1610 using the index information from index database 1706, and outputs the media assets to the user on a search engine display 1708. Other techniques for performing such a search also may be used.

In FIG. 17, the search engine 1702 outputs, as a result of the requested search, a media asset 1710 including a first discussion object 1712 and a second discussion object 1714. It should be understood in FIG. 17 that the media asset 1710 may represent a displayed portion of, and/or a link or reference to, a larger media asset, such as, for example, a title of the larger media asset. The title may be displayed along with the first few lines of the larger media asset (with the discussion objects 1712 and 1714 highlighted therein).

Alternatively, the discussion objects 1712 and 1714 need not be located within the first few lines of the larger media asset, but may be selected as particularly important or "primary" discussion objects from within the content of the larger media asset. In this case, the index database 1706 also may be used to store the discussion objects 1712 and 1714 (and any other primary discussion objects), in association with their respective media asset 1710. As a further alternative, the media asset 1710 may represent a media asset in its entirety.

In the context of the search engine 1702, preference information 1716 includes the search terms entered by the user. Conventionally, such search terms may be entered into an initial search engine home page, such that a conventional search engine may return search results, or a summary page of search results, including, for example, a plurality of various media asset portions which correspond to (for example, are hyperlinks to) media assets that include the search terms. In this way, the user may select a particular one of the media asset portions, in order to view the corresponding media asset in its entirety. If a user wishes to alter or refine the performed search, the user typically must return to the original search engine home page (for example, by using a "back" button on a web browser), and enter the new search term(s) into the original search field. Alternatively, some conventional search engines provide the search field within the initial search results summary page.

In contrast, search engine 1702 allows a user to obtain search results (and/or a summary of search results), and to enter preference information regarding those search results directly from the results themselves, that is, while viewing the media asset(s) (or portions thereof). In this way, the user may refine/alter a search quickly and easily, as explained in more detail below.

Figure 18:
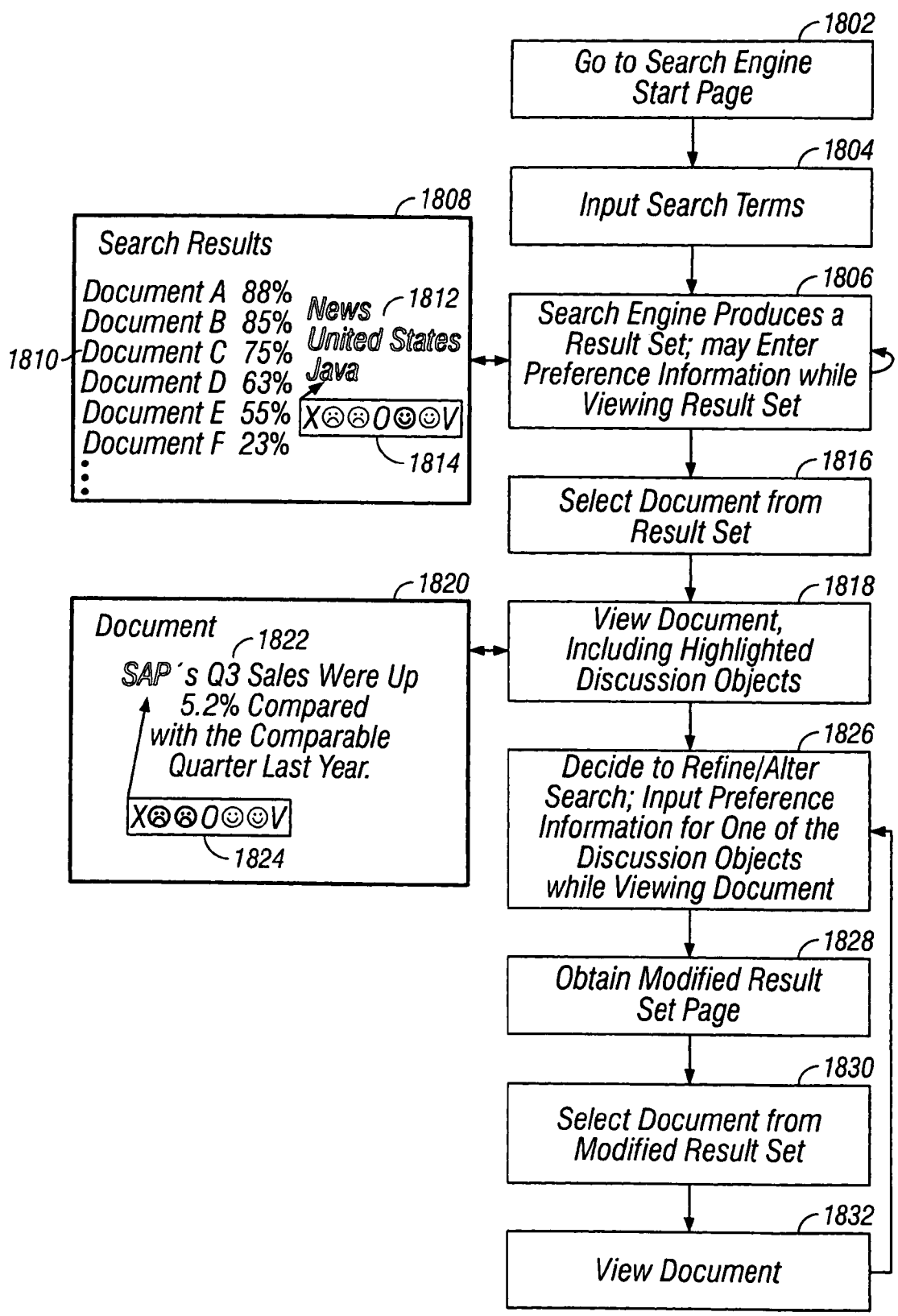
FIG. 18 is a flow chart illustrating an operation of the search engine of FIG. 17.

FIG. 18 is a flow chart illustrating an operation of the search engine 1702 of FIG. 17. In FIG. 18, a user first interacts with the search engine 1702 by going to an associated search engine start page (1802). At the search engine start page, the user inputs desired search terms (1804), whereupon the search engine 1702 produces an initial result set (1806). Alternatively, the initial search term may be obtained from an external location, for example, a web site.

An example of a result set is shown in a sample search result page 1808, in which a plurality of documents 1810 (that is, media assets) are displayed. The plurality of documents 1810 may represent, for example, portions of individual documents, where the user may select and view one of the documents in its entirety by, for example, clicking on a chosen document. As shown in page 1808, each of the documents 1810 includes an associated percentage indicating an extent to which the particular document matches the search terms input by the user. Also on page 1808, a plurality of discussion objects 1812 may be highlighted for the user, so that the user may input preference information about one or more of the discussion objects 1812. In page 1808, the discussion objects 1812 are shown separately from the documents 1810, however, the discussion object 1812 (as illustrated below) also may be included within the content of each of the documents (or document portions) 1810.

In page 1808, and as discussed in more detail below, a technique for indicating a preference about a particular discussion object includes a pop-up window 1814. The pop-up window 1814 may be obtained, for example, by the user clicking on a particular discussion object, or simply by "hovering" a cursor over the desired discussion object, using the user's mouse or other computer input technique. The pop-up window 1814 includes a range of preference information which may be selected by the user, ranging from "never show information about this discussion object," represented by the "x" at the left side of pop-up window 1814, all the way to "always show information about this discussion object," represented by the "v" on the right side of pop-up window 1814. Of course, other preference information could be incorporated within the pop-up window 1814, or elsewhere.

Once the user has received the initial search result set such as page 1808, and has expressed additional preference information about any one of the documents 1810, or the discussion objects 1812 within the page 1808, a new search result page (not shown) may be generated accordingly. The new search result set may be generated automatically upon inputting preference information from the pop-up window 1814, or may be generated upon a "refresh" command from the user. In the latter case, the user may input preference information about a plurality of discussion objects before reloading the page and thereby obtaining a new search result set.

At some point, the user selects a particular document from a result set currently being viewed (1816), so that the user is able to view the selected document (1818). An example of a selected document is a document 1820, which includes an associated discussion object 1822. The user may express preference information about the discussion object in the manner discussed above, using, for example, a pop-up window 1824. This preference information may be used by the search engine 1702 to refine/alter the current search, and is entered while the user is viewing the document 1820 (1826). Thus, the user will obtain a modified result set page (not shown), similar to page 1808 (1828), and may thus continue to select a second document from the modified results set (1830), and thus view the newly selected document (1832).

The above technique for collecting preference information in the context of a search engine is discussed in more detail below with respect to FIGS. 19-27. However, it should be understood from FIG. 18 that the techniques discussed therein may be advantageous over conventional search engine systems. For example, conventional systems often require a user to return from a viewed document to a search engine home page and/or search result page in order to refine or alter a particular search. Moreover, in conventional search engines, the user typically refines or alters a search by entering new search terms into a search field. In contrast, the techniques discussed with respect to FIGS. 17-27 allow a user to enter preference information while actually viewing a particular document (or portion thereof), and do not require the user to explicitly type in the preference information in order to have the preference information reflected in a revised search. Thus, the user may perform searches quickly, easily, and efficiently.

Further, the techniques of FIGS. 17-27 may actually suggest new search terms, by identifying discussion objects within the search results, to aid the user in constructing a desirable search. Moreover, the ability to enter a range of preference information, rather than just "include" or "don't include," allows a user more options in refining a search. For example, by expressing only a slight dis-interest in a particular discussion object, a user may find the discussion object still included within a search result set (as long as there are few or no documents within the result set that contain search terms of greater interest).

Figure 19:
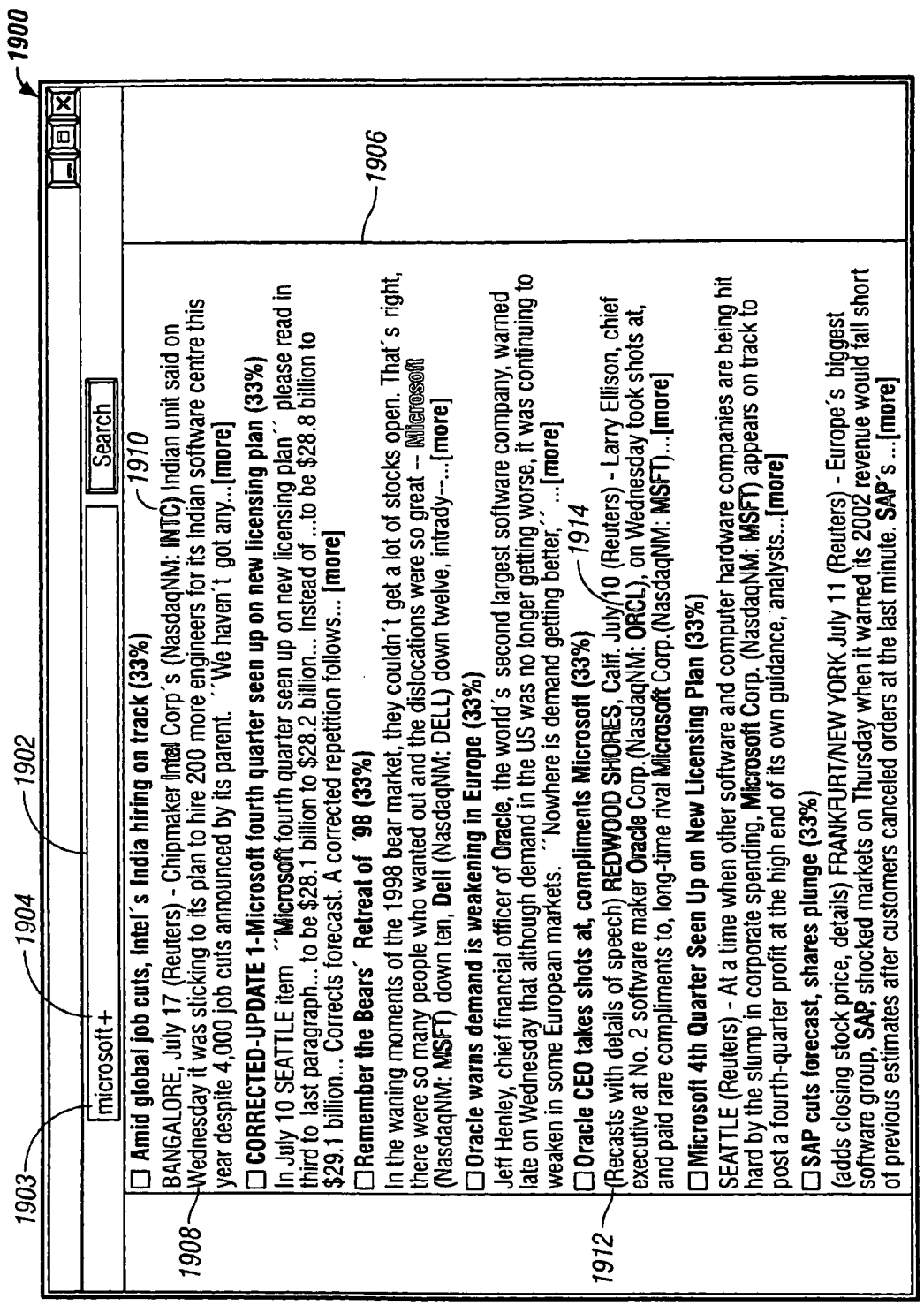
FIG. 19 is a first screen shot illustrating an operation of the search engine of FIG. 17.

FIG. 19 is a first screen shot 1900 illustrating an operation of the search engine 1702 of FIG. 17. Screenshot 1900 is analogous to the page 1808 in FIG. 18, that is, it includes references to a plurality of documents (and portions of each of the referenced documents), where the documents have been obtained by the search engine 1702 in response to a particular search term. In particular, in screenshot 1900, it can be seen that the user has entered the search term "Microsoft," which appears in a search field 1902. It should be noted that a plus sign 1904 after the search term Microsoft indicates that the term must be found in each returned document. A plus sign may be assigned as the default level of approval assigned to the search term, based on the fact that it was used as a search term by the user. As a result of performing a search on the term Microsoft, the search engine 1702 has returned a plurality of documents 1906 within the screenshot 1900, where each document contains the search term "Microsoft."

Within each of the documents 1906, at least one discussion object has been highlighted. For example, in an article 1908, a discussion object 1910 is a stock symbol "INTC" for semiconductor chipmaker Intel Corporation. Similarly, an article 1912 includes a discussion object 1914 showing "ORCL," the stock symbol for the software maker Oracle Corporation.

In one implementation, the user may be provided with a mechanism to take one or more predefined actions with respect to a discussion object. For example, the user may be provided with a set of choices regarding each discussion object (for example, when the user "right clicks," that is, clicks on the discussion object using a right mouse button), where such actions may include performing a search only on this discussion object, or obtaining a stock quote for this discussion object. The set of choices also may be provided as a listing within a reserved portion of the screenshot 1900 (not shown), so that the user may "drag" the discussion object and "drop" it over a particular action from within the listing, to thereby cause that action to be performed.

Figure 20:
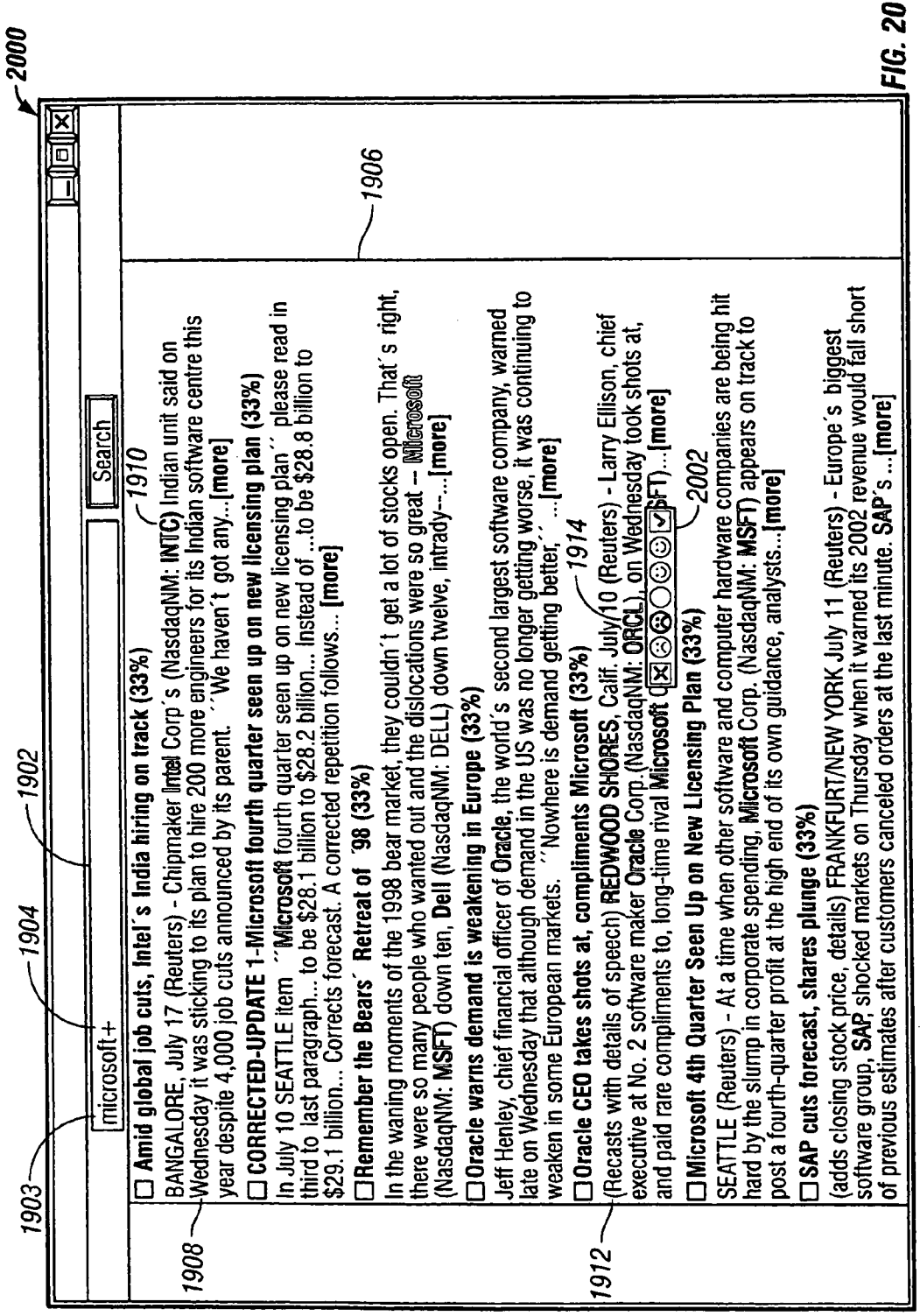
FIG. 20 is a second screen shot illustrating an operation of the search engine of FIG. 17.

FIG. 20 is a second screen shot 2000 illustrating an operation of the search engine 1702 of FIG. 17. In screen shot 2000, the user has selected the discussion object 1914, in order to input preference information about this discussion object. Specifically, the user has obtained a pop-up window 2002 by selecting the discussion object 1914 (that is, by clicking on the discussion object 1914, hovering the mouse over it, or using a similar technique, as discussed above), and the user has selected a slightly negative rating for this particular discussion object, as shown.

Figure 21:
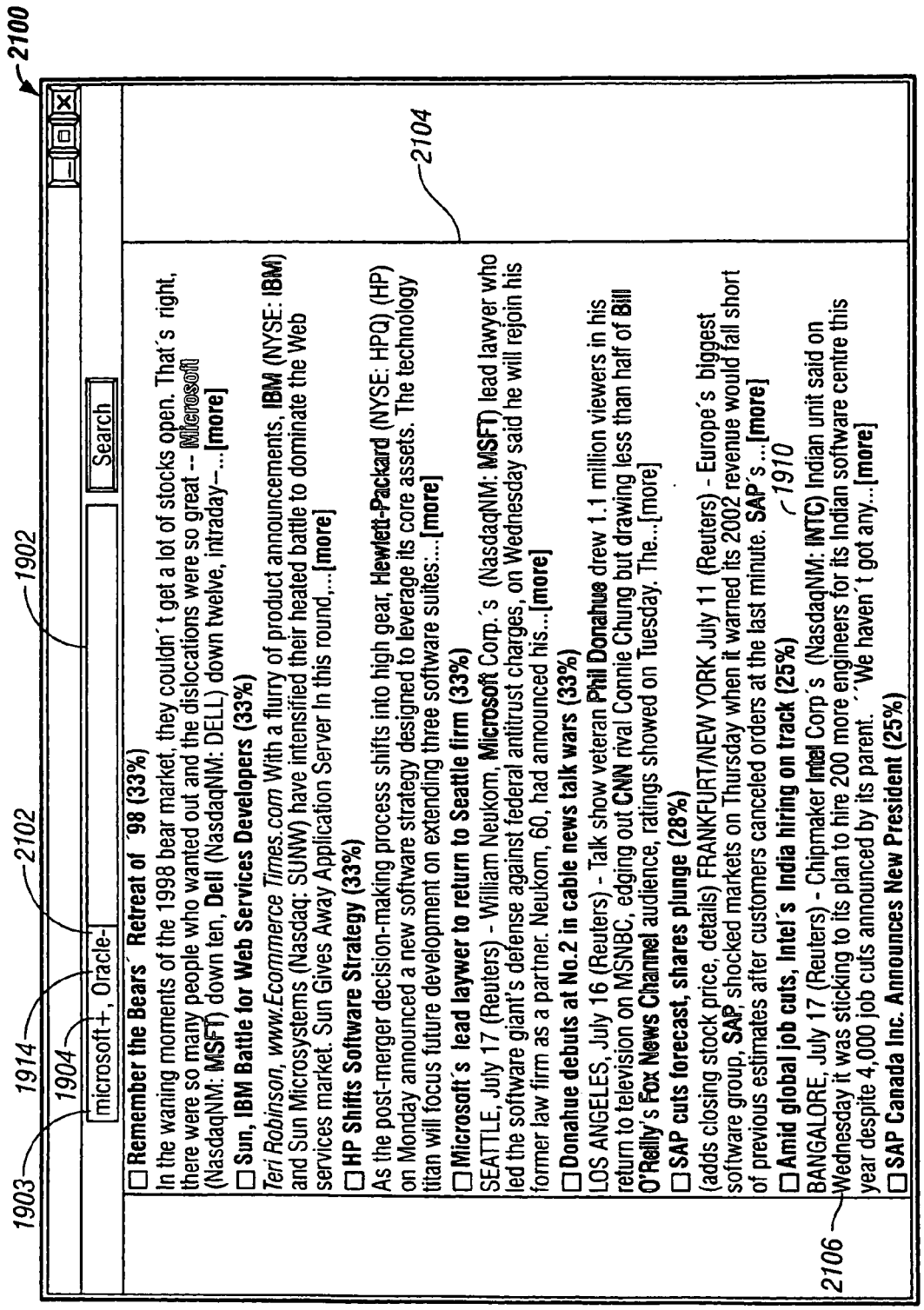
FIG. 21 is a third screen shot illustrating an operation of the search engine of FIG. 17.

FIG. 21 is a third screen shot 2100 illustrating an operation of the search engine 1702 of FIG. 17. Screen shot 2100 reflects a result of the preference information entered by the user with respect to screenshot 2000. Because of the negative preference indicated by the user regarding the discussion object 1914 "Oracle," this discussion object 1914 is now included within field 1902, along with a minus sign 2102 indicating the slight negative preference input with respect to screenshot 2000. That is, a stronger negative preference might be shown as two or three minus signs, or by some other designation. It should be understood that the discussion object 1914, although shown as a stock symbol in screen shot 2000, may include information referencing the software maker Oracle Corporation more generally.

As a result of the preference information entered in screen shot 2000, screenshot 2100 includes a new set of documents 2104 (documents 2104 are actually portions of referenced documents). For example, the documents 2104 include a document (portion) 2106 including the discussion object 1910 "Intel," discussed above with respect to FIG. 19. In screenshot 2100, it should be noted that documents 2104 no longer include documents related to the discussion object 1914 "Oracle," since the negative rating given to that discussion object caused corresponding documents to be listed lower than the eight documents partially or completely listed in screenshot 2100.

Figure 22:
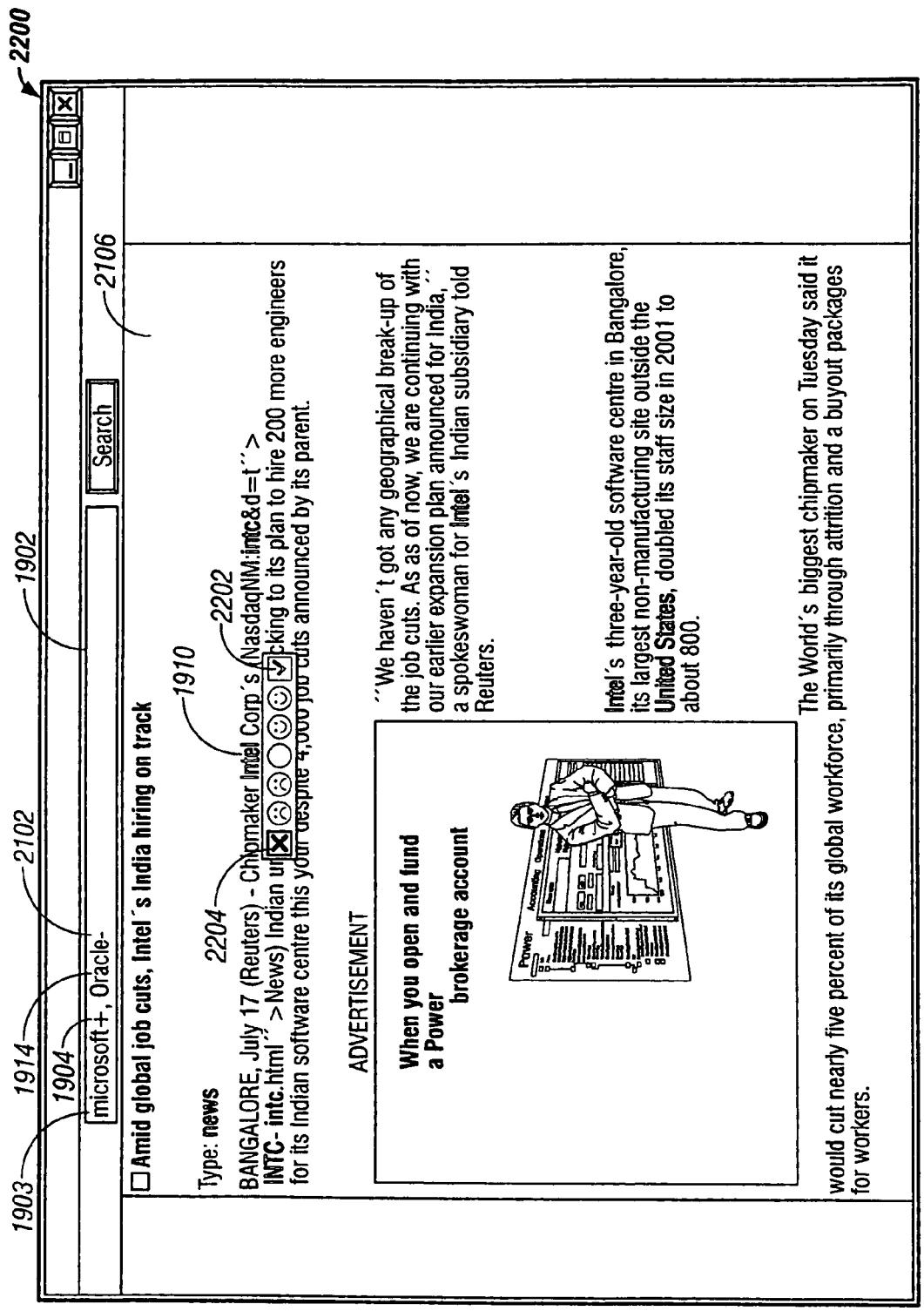
FIG. 22 is a fourth screen shot illustrating an operation of the search engine of FIG. 17.

FIG. 22 is a fourth screen shot 2200 illustrating an operation of the search engine 1702. In screen shot 2200, the user has selected the document 2106 from screenshot 2100, and search engine 1702 now displays the entirety of the referenced document 2106. While viewing the document 2106, the user is able to input preference information about the discussion object 1910 "Intel," using a pop-up window 2202. Specifically in the example of screen shot 2200, the user has input the preference that information about discussion object 1910 should never be included in future result sets, by selecting a box 2204 marked "X."

Figure 23:
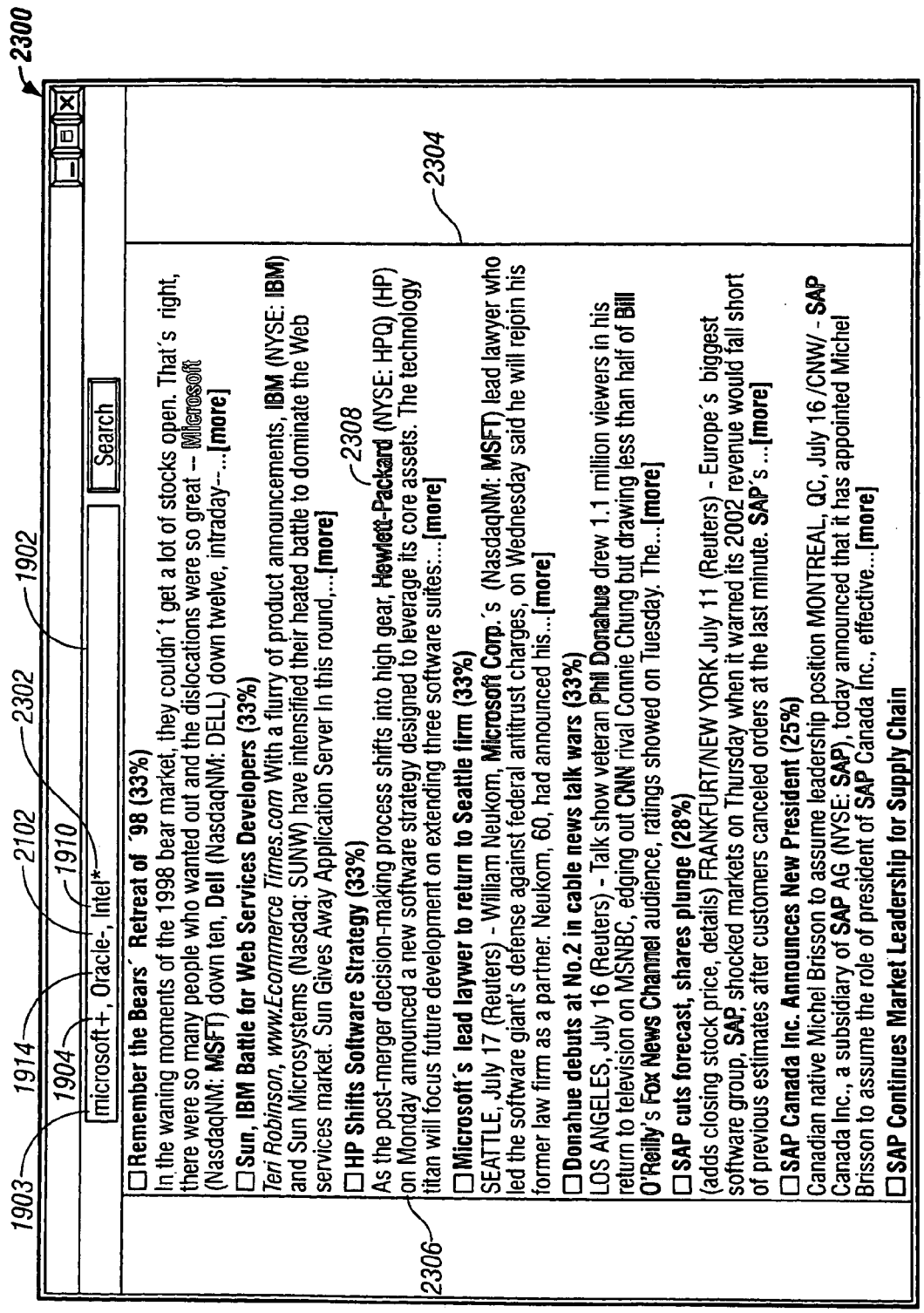
FIG. 23 is a fifth screen shot illustrating an operation of the search engine of FIG. 17.

FIG. 23 is a fifth screen shot 2300 illustrating an operation of the search engine 1702 of FIG. 17. In screen shot 2300, the discussion object 1910 "Intel" is now included within the field 1902, along with an asterisk (*) 2302, indicating that it is a discussion object not to be included in future search results. Also in screen shot 2300, a plurality of documents 2304 have been returned, reflecting all the preference information input to date, that is, an interest in discussion object 1903 "Microsoft," a slight dis-interest in discussion object 1910 "Oracle," and a total lack of interest in the discussion object 1910 "Intel."

Reflecting this information, the documents 2304 do not include the document 2106 from FIGS. 21 and 22, since this document contains the discussion object 1910 "Intel." Other documents within documents 2304 may have already been included in previous search results, such as, for example, an article or media asset 2306, which includes discussion objects such as a discussion object 2308 "Hewlett-Packard."

Figure 24:
FIG. 24 is a sixth screen shot illustrating an operation of the search engine of FIG. 17.

FIG. 24 is a sixth screen shot 2400 illustrating an operation of the search engine 1702 of FIG. 17. In screenshot 2400, the user has selected the media asset 2306, which is now displayed for viewing. The media asset 2306 may be shown in its entirety, either within a single screen, or, if necessary, with the benefit of scroll bars or other techniques for viewing a document which requires more than one full screen to view. In screenshot 2400, the media asset 2306 is rendered (by the search engine 1702) so as to highlight the various discussion objects (for example, the discussion object 2308 "Hewlett-Packard") within the body of the media asset 2306.

Figure 25:
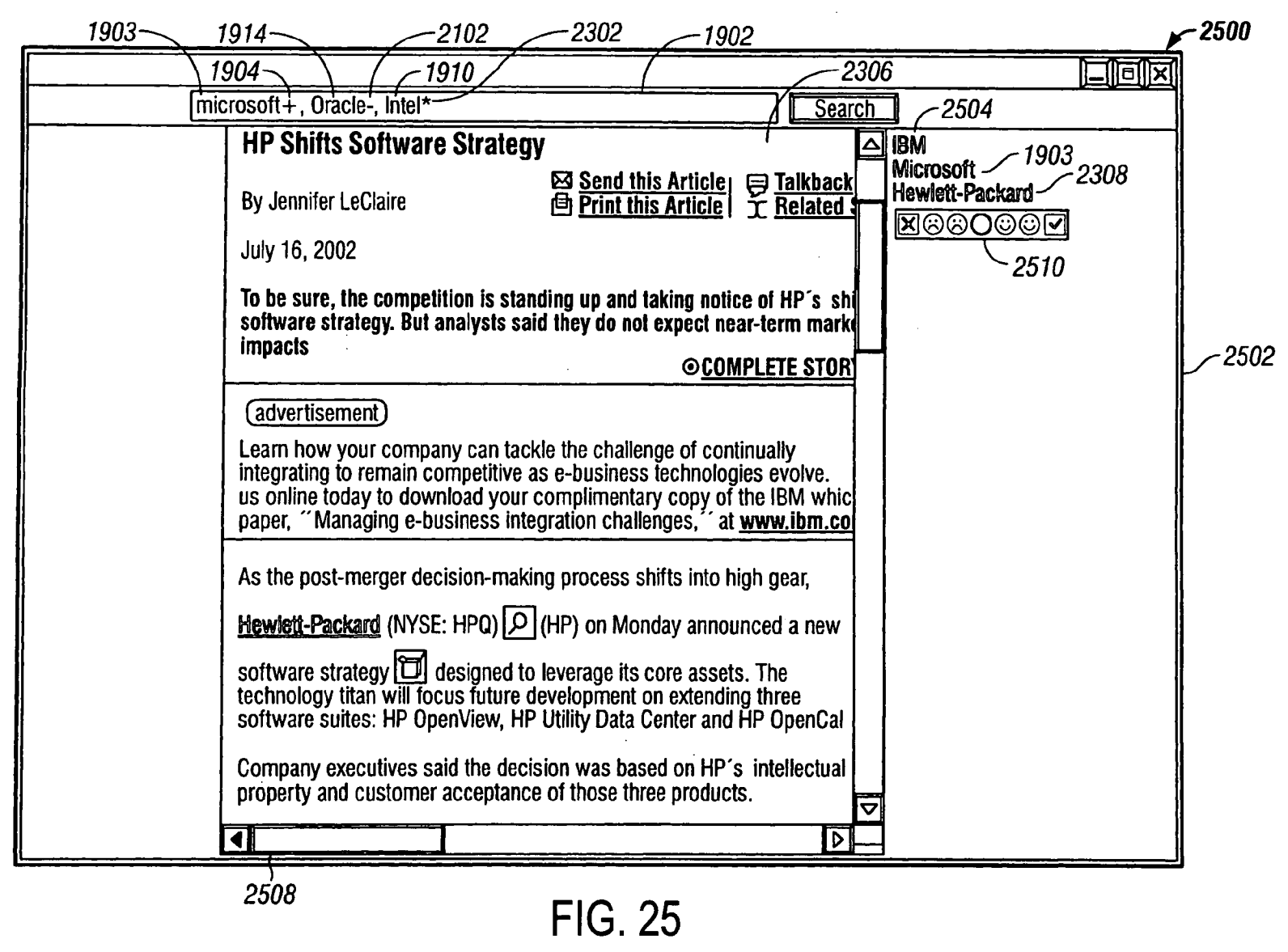

FIG. 25 is a seventh screenshot 2500 illustrating an operation of the search engine 1702 of FIG. 17. In screenshot 2500, the original media asset 2306 is displayed, that is, the discussion objects associated with media asset 2306 are not displayed within the context of the media asset 2306 itself. Instead, some of the discussion objects are provided to the user within a reserved portion 2502 of the screen shot 2500. Within portion 2502, the discussion object 1903 "Microsoft," the discussion object 2308 "Hewlett-Packard," and a discussion object 2504 "IBM" ("International Business Machines") are displayed.

Although these discussion objects are shown grouped at the top of portion 2502, they also may be dispersed throughout the portion 2502, such that the discussion objects correspond to a location of their appearance(s) within the media asset 2306. In screenshot 2500, the original version of the media asset 2306 is displayed to the user by directing the user to a remote location of the media asset 2306, using a frame 2508. Also, it should be understood that discussion objects included in portion 2502 may be a partial or complete listing of discussion objects within the media asset 2306, and/or may contain discussion objects entered as a search term, even if such discussion objects are not actually contained in the particular media asset being viewed.

In differentiating between screen shots 2400 and 2500, it should be understood that screen shot 2400 represents, for example, a situation in which the search engine 1702 has rendered a media asset (document) 2306. The media asset 2306 may be stored locally, or may be obtained (on-the-fly) from a remote location. Once obtained, the discussion objects within the media asset 2306 are identified (for example, using the metadata enhancer 1616), and the media asset is rendered by being converted to (in this case) HTML, with the discussion objects embedded within the HTML-formatted version of the media asset.

In contrast, screen shot 2500 represents a situation in which the search engine 1702 displays an original version of the media asset 2306. In this case, the media asset is an HTML document, and is displayed within the frame 2508, which may display the media asset 2306 by obtaining it directly from a remote location, as described above, or by obtaining the media asset 2306 from the database 1610. In either case, in screenshot 2500, the search engine 1702 has not altered the original version of the media asset 2306, but rather has determined discussion objects within the media asset 2306 for display within the portion 2502. In screenshot 2500, the discussion objects may be determined using, for example, the metadata enhancer 1616 and/or 1618.

In short, when the media asset 2306 is shown in its original version, its metadata may be better presented externally to the document, rather than within the content of the document itself. Such external presentation of the discussion objects may be in addition to, or instead of, inclusion of discussion objects within the document 2306 itself.

Regardless of where the discussion objects are displayed, all of the above information related to entry of preference information may be equally applicable. For example, a pop-up window 2510 also may be used with respect to the discussion objects within the portion 2502 of screen shot 2500.

In the above examples, preference information was entered using the pop-up windows such as the pop-up window 2510. However, various other techniques may be used for entering preference information.

FIG. 26 is a screenshot 2600 illustrating a technique for entering preference information, similar to the technique shown above with respect to FIG. 11. In screenshot 2600, a pop-up menu 2602 illustrates various examples for entering preference information, such as never/always including a particular discussion topic, or indicating a relative importance of the discussion topic (discussion object). A sub-menu 2604 illustrates the possibility of providing additional information beyond that initially shown in menu 2602. In this case, the sub-menu 2604 is used to postpone media assets which include a particular discussion object for some selected amount of time.

Figure 27:
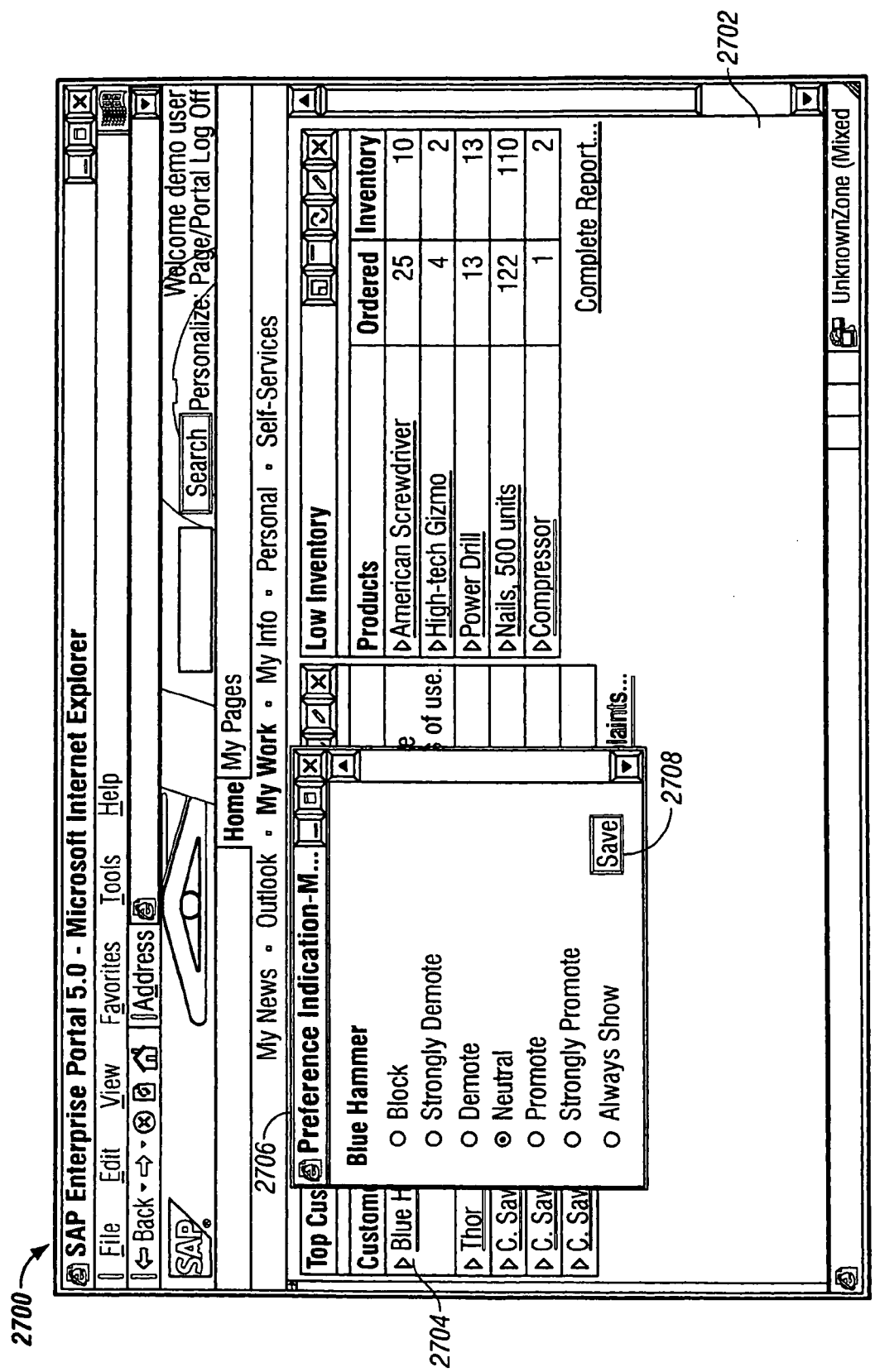
FIG. 27 is a screenshot 2700 illustrating a technique for entering preference information.

FIG. 27 is a screenshot 2700 illustrating a technique for entering preference information. In screenshot 2700, a page 2702 includes a discussion object 2704 "Blue Hammer." The user has selected (for example, by clicking with a mouse) the discussion object 2704 "Blue Hammer," whereupon a pop-up browser window 2706 is shown to the user. The pop-up browser window contains the name of the relevant discussion object, as well as a range of preference options for the user to select. Finally, the user may save the selected option ("Neutral" in this case) by selecting a "save" button 2708.

Figure 28:
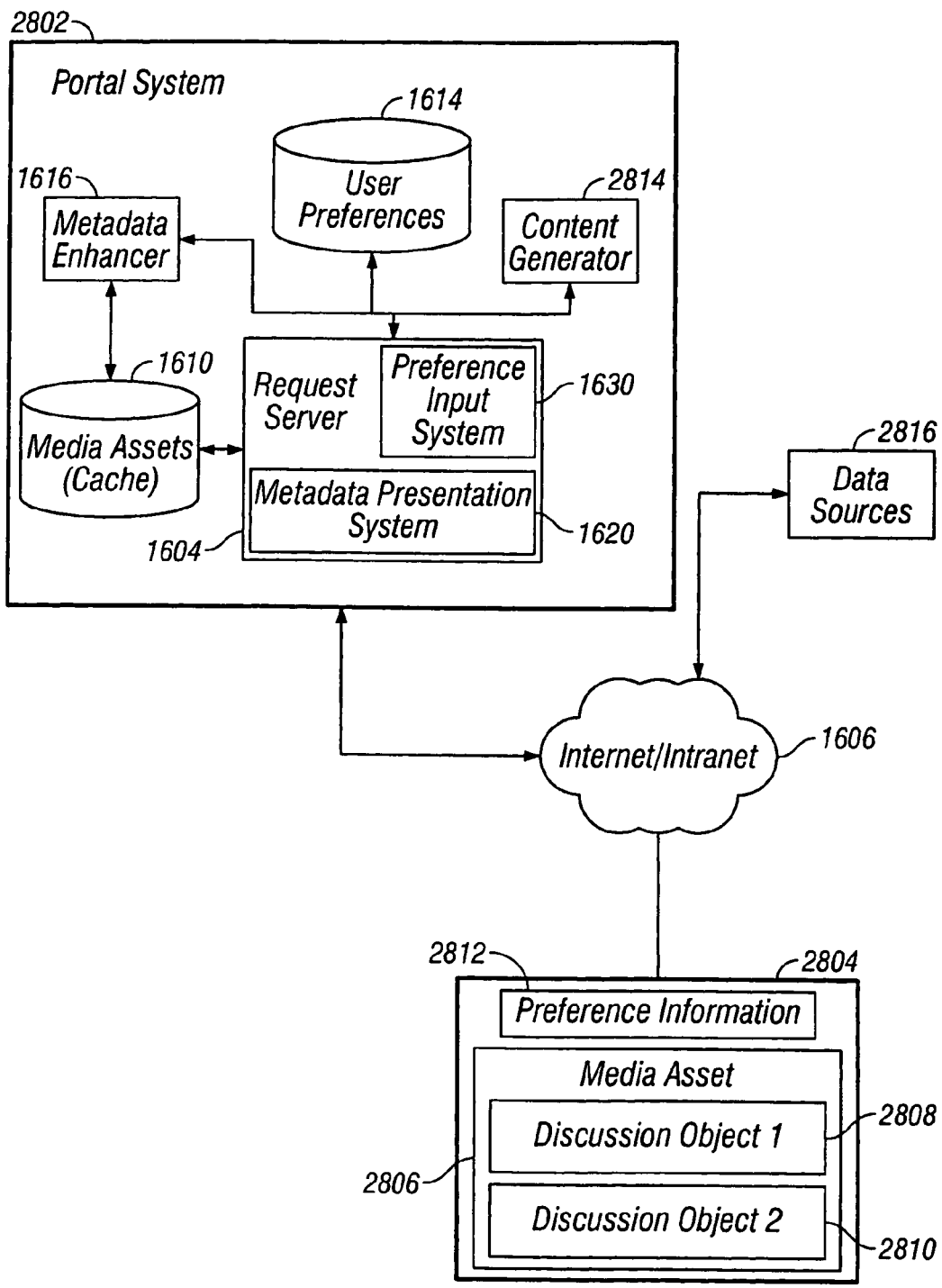
FIG. 28 is a block diagram illustrating a structure and use of a portal system.

FIG. 28 is a block diagram illustrating a structure and use of a portal system 2802. In an example of a conventional portal system, as referred to above, a portal page may include one or more sub-sections or windows, which may exist in various (proprietary) forms, and may be known by a variety of names, such as "iViews" or "portlets."

In particular, iViews have two primary characteristics, specifically, their definition and their visual presentation. The term definition refers to the fact that iViews may be thought of as parameterized topics/queries, where the queries are pre-defined and encapsulated, for example, within Java code, thereby resembling a software module or a Java class. The values of the iViews parameters may then be set by, for example, the user, an administrator, and/or by default. The term visual presentation refers to the techniques for giving form to the iView, and associating the iView with a user and a page. At a time of visual presentation, the iView is typically allocated a location on a page (screen), and its parameters are filled based on the user preferences.

An iView may be associated with a personalization page, in which a user may modify a query associated with that iView by editing the values of the parameters. Thus, an iView designed to query a customer database and produce a list of the top ten customers, by revenue, may be edited to return only the top five customers.

A user may be provided with an initial preference page for associating an iView with a desired location on the user's portal page. Using the preference page, for example, the user might arrange multiple iViews, each associated with a query related to a topic such as "sports," "weather," and/or "stock market."

Then, each time the user logs onto the portal system and views the portal page, the iViews automatically run their respective queries, thereby obtaining relevant information for the user. Thus, iViews may be considered to be media assets themselves, and/or may contain a media asset (including a simple data list), a portion of a media asset, or a link to a media asset (for example, links to other iViews). If the user wishes to revise preference information (for example, a location of an iView on the portal page), typically the user returns to the initial preference page to do so, and then refreshes or reloads the actual portal page (which refreshes all contained iViews) to view the revisions.

As just described, it is not typically until the user logs on and requests a viewing of the (personalized) portal page that the portal system 2802 (that is, each iView) generates the corresponding information using a content generator 2803, which delivers a page 2804 to the user by performing a parameterized query against data sources 2805. However, it should be understood that the portal system 2802 also may perform predictive or preemptive publishing of media assets, in order to speed up an overall operation of the portal system 2802. In some cases, media assets may be temporarily cached after delivery to a user, in case a user requests the same media asset(s) in the near future.

Thus, the portal system 2802 typically generates media assets, and provides these assets to the user according to a plurality of iViews that have been individually associated with queries that are of interest to the user. These iViews and their related information may be stored/implemented in, for example, the user preferences database 1614 and/or the content generator 2803. It should be understood that the media assets database 1610 within the portal system 2802 thus may represent a cache of media assets assembled in response to previous user requests, as described above.

During operation, the portal system 2802 presents the page 2804 to the user, as mentioned above. The page 2804 in FIG. 28 represents, for example, either an initial portal set up page, a portal page requested by the user, or a media asset 2806 selected by the user from the portal page (for example, an iView, or a media asset selected by way of a link contained within an iView, as described above). Page 2804 may thus include the media asset 2806 (or portion thereof), including a first discussion object 2808 and a second discussion object 2810.

As referred to above and discussed in more detail below, the discussion objects 2808 and 2810 may be highlighted within the media asset 2806, or may be provided to the user within a second portion of the page 2804. The user may express preference information 2812 specifically with regard to one or both of the discussion objects 2808 or 2810.

Figure 29:
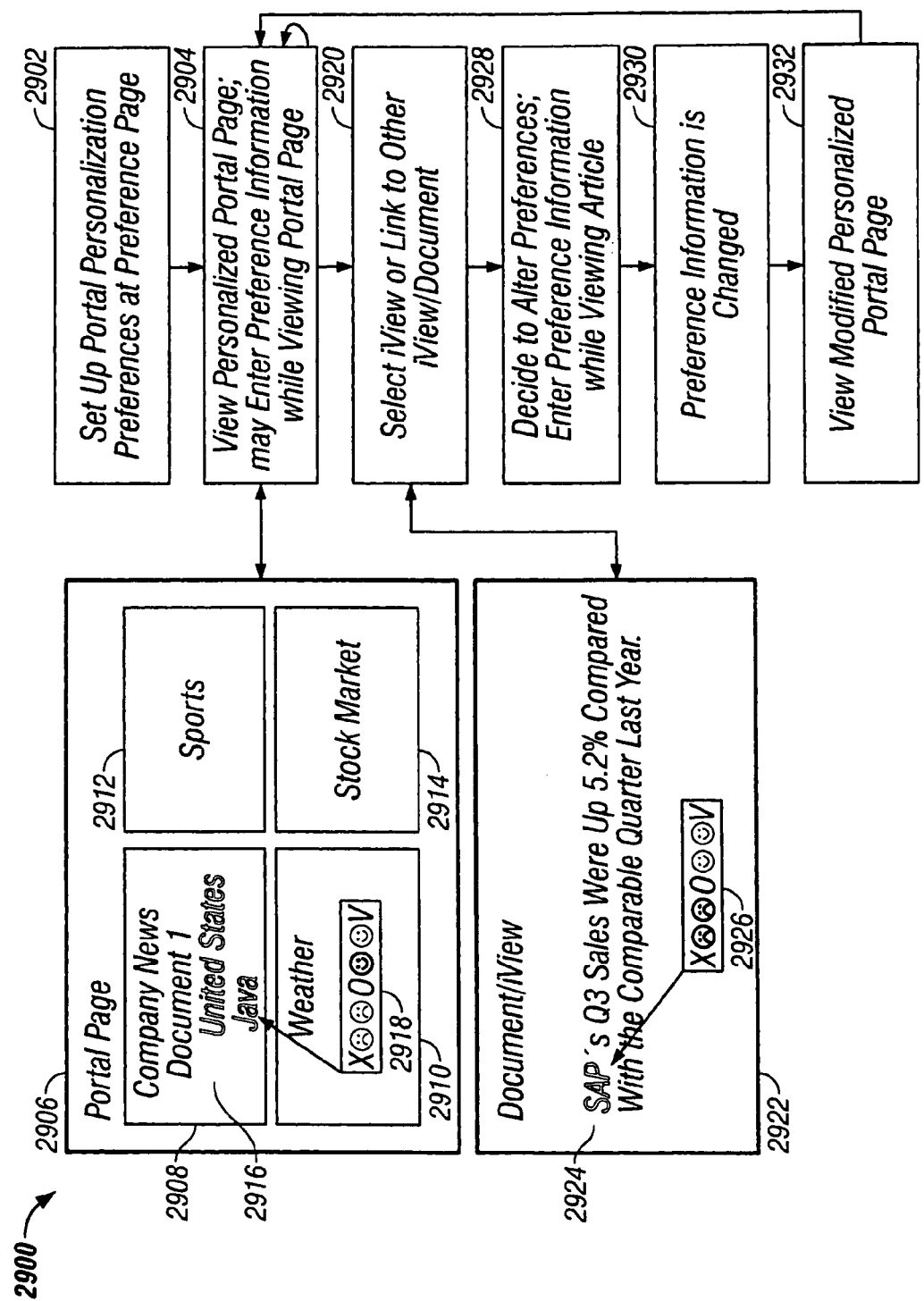
FIG. 29 is a flowchart illustrating an operation of the portal system in FIG. 28.

FIG. 29 is a flowchart 2900 illustrating an operation of the portal system 2802 in FIG. 28. In flowchart 2900, a user begins by setting up portal personalization preferences (for example, selecting a number/size of iViews) at an initial preference page provided by the portal system 2802 (2902). These portal personalization preferences may be stored in the user preferences database 1614. In some cases an administrator will preset the initial set of user preferences according the role of the user. Whatever the case may be, based on the preferences just entered, the user may then view a personalized portal page accordingly (2904). An example of such a personalized portal page is shown in a portal page 2906.

The portal page 2906 includes various iViews. For example, a first iView 2908 may contain information related to "company news," that is, news regarding the user's employer, who may be providing the portal system 2802. A second iView 2910 may be devoted to weather information, a third iView 2912 may be devoted to sports information, and a fourth iView 2914 may be devoted to news about the stock market. Each of the iViews may contain documents or portions thereof (or links to other documents), and the documents may contain discussion objects, such as discussion objects 2916 within the first section 2908. Additionally, or alternatively, the iViews may contain a simple listing of information (including discussion objects within the information), or the iViews may contain links to other iViews (on the page 2906, or on another page).

As with the search engine 1702 discussed above, a user may select one or more of the discussion objects in order to input preference information about that discussion object. In FIG. 29, a pop-up window 2918 similar to pop-up windows discussed above allows the user to enter preference information about a particular discussion object.

Upon entering preference information in this or similar manners, the user receives a revised portal page similar to the page 2906, but reflecting information expressed regarding the discussion objects. For example, the revised portal page may include different information/documents within a particular iView, or could even remove an entire one of the iViews in favor of a new, more preferred iView.

Once the user has obtained a particular portal page such as the page 2906, the user may select one of the iViews for more detailed viewing, or may select (a link to) another iView or document (2920). In selecting one of the iViews, for example, the user may "zoom in" on a selected iView, so that the iView is displayed on the entirety of an available user display. For example, the user may select the sports iView 2912 to occupy an entirety of the user's display; in this case, the iView would, of course, be able to display more sports information than would be possible in the example of the page 2906.

In selecting a particular document or iView (or link thereto) from within one of the iViews 2908, 2910, 2912, or 2914, the user may be shown the corresponding document/iView as a document/iView 2922, which includes a discussion object 2924, about which the user inputs preferences using a pop-up window 2926. If the user decides to alter his/her portal preference information, he/she may do so while viewing the document/iView 2922, using, for example, the pop-up window 2926 (2928). Accordingly, the portal system 2802 inputs the preference information using the preference input system 1630, and changes user preference information stored within the user preference database 1614 (2930). At this point, the user is capable of viewing a modified personalized portal page, for example, a modified version of page 2906 (2932).

It should be understood from the above discussion that the portal system 2802, via its operation as explained above with respect to flowchart 2900, allows a user to directly enter preference information about a specific portion of a media asset, while the user is actually viewing the media asset (or portion thereof). As seen above in the context of the search engine 1702, such techniques provide a fast and efficient way to collect user preference information, and are convenient for the user in that they minimize the different number of screens that a user must access in order to input preference information. Moreover, the user is not taken out of his or her current context to another screen to input preference information; rather, the user still sees the content he was reading. Further, such techniques allow a user to see the effect of a preference change quickly, so that the user can easily fine-tune the preference change.

Figure 30:
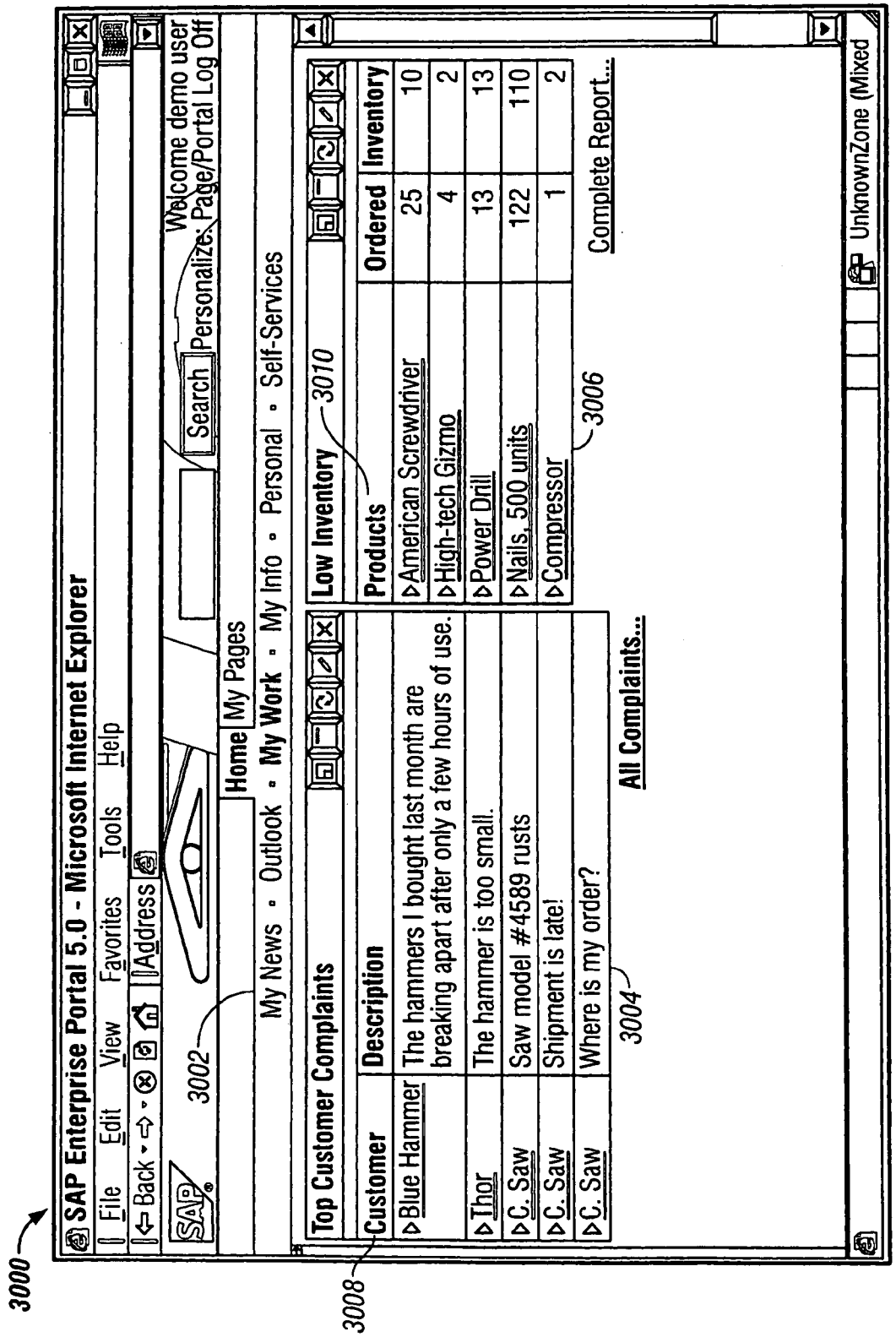
FIG. 30 is a first screen shot illustrating an operation of the portal system of FIG. 28.

FIG. 30 is a first screen shot 3000 illustrating an operation of the portal system 2802 of FIG. 28. In screen shot 3000, the user may select a portal page from among a plurality of portal pages 3002, the portal pages 3002 including, for example, "My News," "My Work," "My Info," and "Personal." In screen shot 3000, the user has selected "My Work," and has therefore received for viewing a portal page that includes a first iView 3004 of "Top Customer Complaints," as well as a second iView 3006 "Low Inventory."

The iView 3004 includes a listing of various customers, and a corresponding description of their respective complaints. The iView 3006 includes an inventory listing of various products, along with a number of the products that have been ordered versus a number that is actually in inventory. The iViews 3004 and 3006 each contain discussion objects. For example, iView 3004 includes each of the customer names within a customer column 3008 as discussion objects, while a column 3010 within the iView 3006 contains each of the product names as discussion objects.

As discussed above, the iViews 3004 and 3006 also may contain links to other media assets and/or iViews. For example, each of the customer names in iView 3004 might represent a link to a general information file (document) about that customer, or to other information, such as a current stock market quote.

Figure 31:
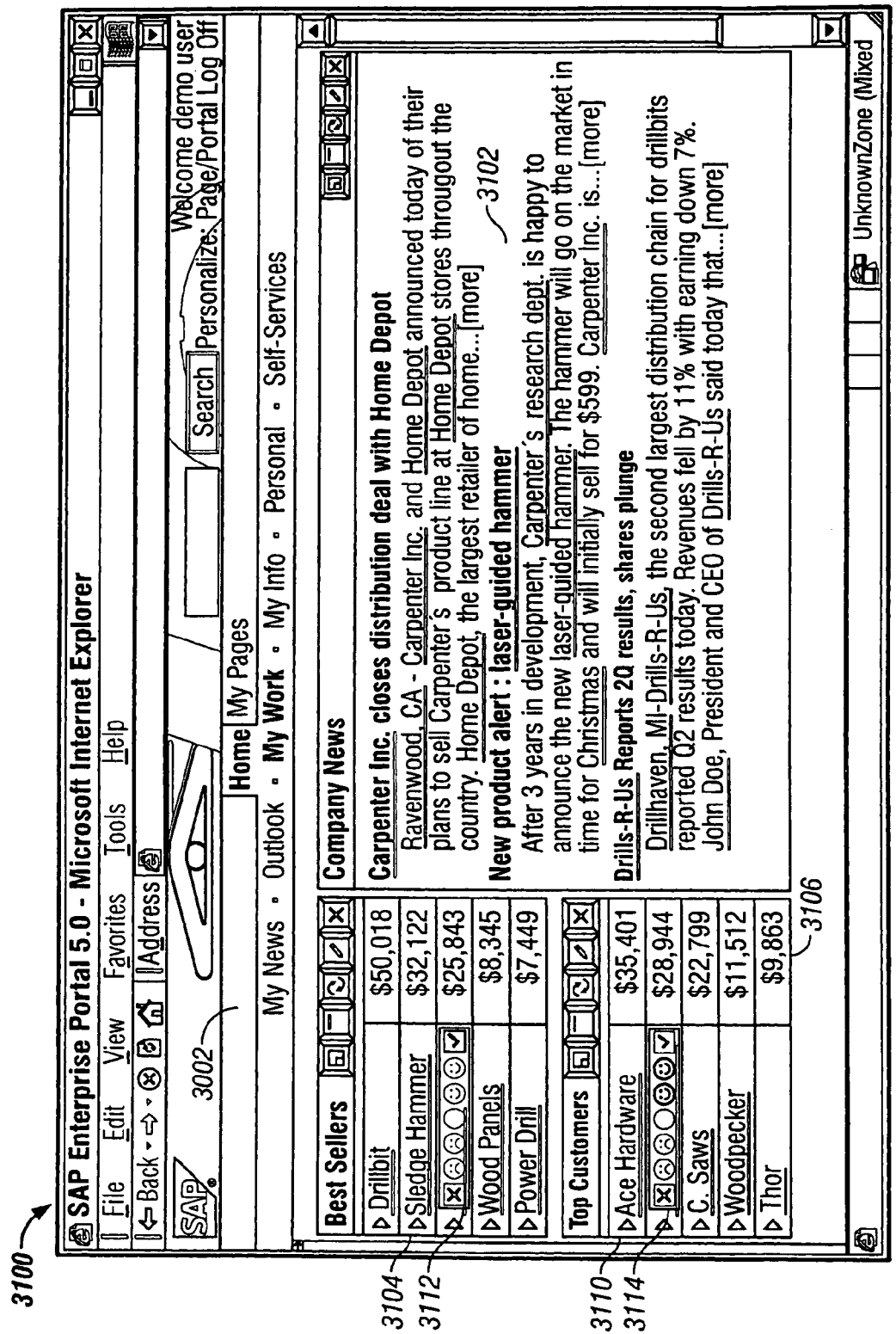
FIG. 31 is a second screen shot illustrating a use of the portal system of FIG. 28.

FIG. 31 is a second screen shot 3100 illustrating a use of the portal system 2802 of FIG. 28. In screen shot 3100, the user has selected a different portal page from within the portal pages 3002. Specifically, the user has selected the "My News" portal page. As a result, the user is shown a first news iView 3102 "Company News," a second iView 3104 "Best Sellers," and a third iView 3106 "Top Customers." As shown in screen shot 3100, and similarly to screenshot 3000, each of the iViews 3102, 3104, and 3106 includes information about their respective query, and the information includes discussion objects, about which the user may express preference information.

For example, iView 3104 includes a discussion object 3108 "Sledge Hammer," and the iView 3106 includes a discussion object 3110 "Ace Hardware." Accordingly, the user may express information about either of these discussion objects using a first pop-up window 3112 or a second pop-up window 3114, respectively. Specifically, in screen shot 3100, the user has provided preference information regarding discussion object 3108 "Sledge Hammer," such that this discussion object should always be included in future media asset listings, by selecting a check box within the pop-up window 3112. Similarly, the user has expressed a strong positive preference for the discussion object 3110 "Ace Hardware," by selecting multiple "smiley faces" within the pop-up window 3114.

In screenshot 3100, the pop-up windows 3112 and 3114 are shown simultaneously, that is, the user may express preference information about a plurality of discussion objects, using such a series of corresponding pop-up windows (which may or may not be shown simultaneously), and then refresh/reload the page 3100. However, as discussed above, the page 3100 also may reload automatically upon an inputting of any preference information via one of the pop-up windows 3112 or 3114.

Figure 32:
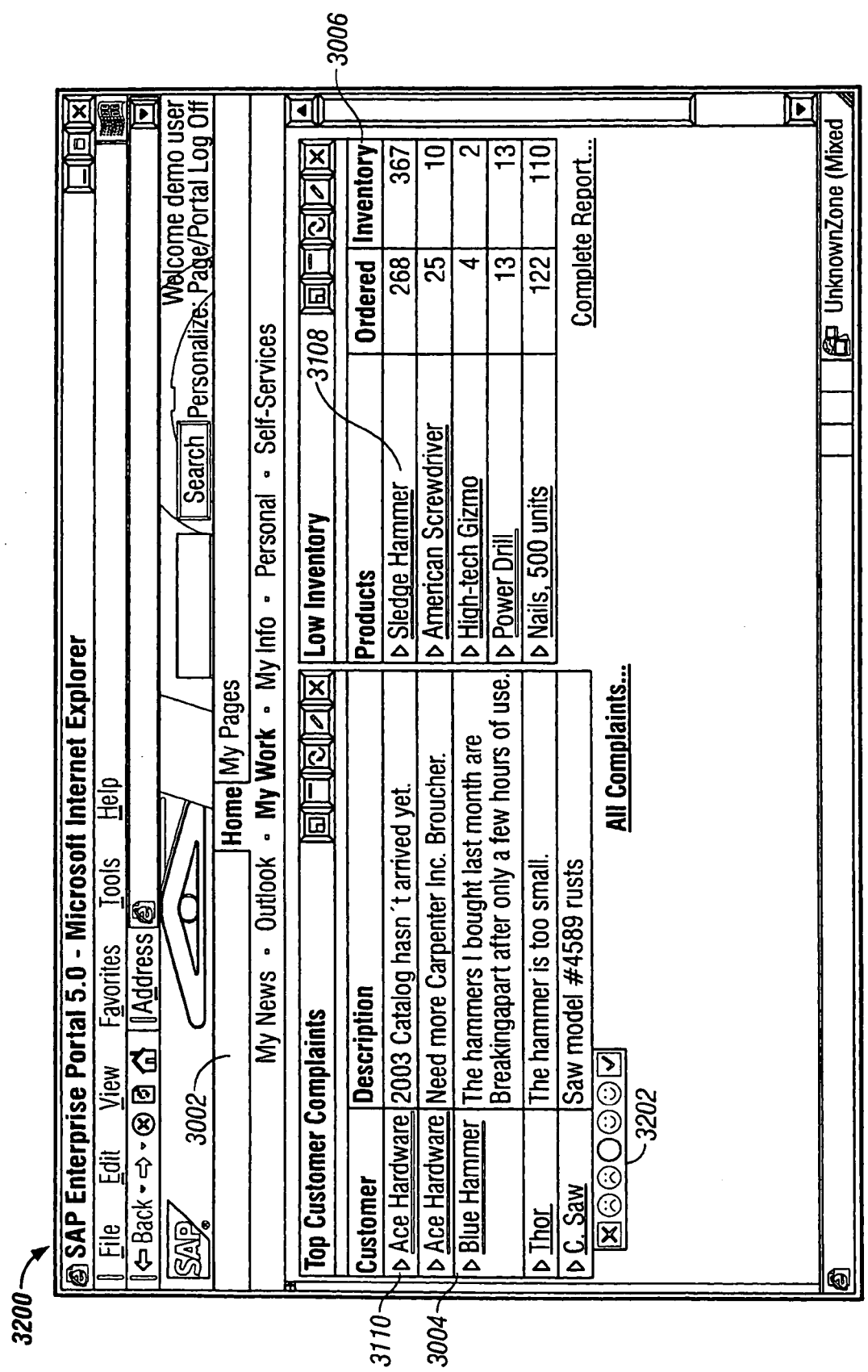
FIG. 32 is a third screen shot illustrating use of the portal system of FIG. 28.

FIG. 32 is a third screen shot 3200 illustrating use of the portal system 2802 of FIG. 28. In screen shot 3200, the user has reselected the portal page "My Work" from the category listing 3002. As a result, the iViews 3004 and 3006 are returned to the screenshot 3200. In this case, however, the discussion objects 3108 "Sledge Hammer," and 3110 "Ace Hardware," are more heavily emphasized and/or prioritized within the iViews 3004 and 3006, reflecting the preference information entered with respect to the screen shot 3100.

It should be noted that this preference for the discussion objects 3108 and 3110 is executed despite the nature of media assets associated with these discussion objects. For example, customer complaints associated with the discussion objects 3110 "Ace Hardware" may be relatively trivial customer complaints. Similarly, there may be no obvious inventory problems associated with the company represented by the discussion object 3108 "Sledge Hammer." Nonetheless, these items are promoted ahead of other customers or products, due to the preference information input with respect to screen shot 3100.

In the portal system 2802 described above with respect to FIGS. 28-32, many of the features discussed above with respect to the search engine 1702 also may be implemented. For example, discussion objects, particularly with respect to information obtained form sources external to the portal system 2802, may be presented to the user in a separate, reserved portion of the user display 2804 of FIG. 28. As another example, a pop-up window for expressing preference information, such as a pop-up window 3202 in FIG. 32, may be obtained by a number of methods, such as clicking on a selected discussion object or hovering over the selected discussion object, using a computer mouse or other input technique.

Figure 33:
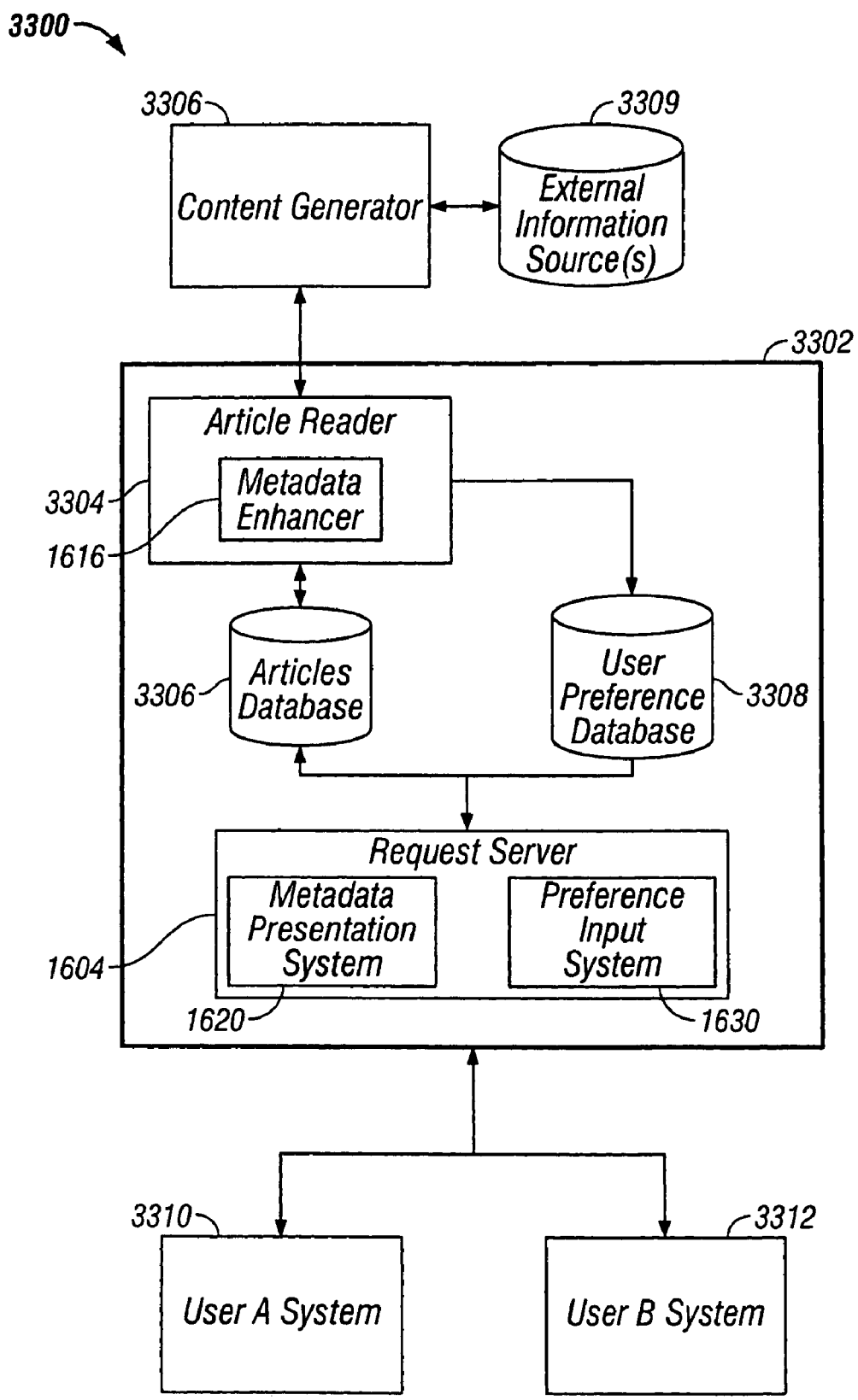
FIG. 33 is a block diagram of a reverse-query portal system.

FIG. 33 is a block diagram 3300 of a reverse-query portal system 3302, similar in some ways to the system 100 of FIG. 1. In the system 3302, an article reader 3304 contains media assets from a content generator 3306, which in turn obtains content from external information sources 3308. The article reader 3304 may provide metadata enhancement to the content using the metadata enhancer 1616, similar to the metadata enhancer 1616 of FIG. 16. By so doing, the article reader 3304 may accumulate a database of media assets 3310.

The reverse-query portal system also contains a user preference database 3312. Thus, the system 3302 may collect a pool of articles associated with each of a plurality of users represented by a first user 3314 and a second user 3316. In this way, the system 3302 may provide articles of interest to a plurality of users.

It should be understood with respect to the system 3302 that articles are collected and sorted (for example, with respect to each user) before any particular request(s) are made by a user, based simply on information in the user preference database 3312. Thus, the articles are obtained and/or generated prior to a direct query being entered by the user 3314 or 3316. This is in contrast to portal systems, such as the portal system 2802, in which articles are often obtained for delivery to a particular user, or allocated or assigned to the particular user, only in response to a request from the particular user.

The user preference information for user preference database 3312 may be initially collected, for example, using a preference selection page. The user 3314 or 3316 may express preferences about particular articles or categories of articles using the preference collection techniques discussed above with respect to particular discussion objects.

Although the information system 1602 of FIG. 16 has primarily been discussed above with respect to portal systems, reverse-query portal systems, and search engines, the information system 1602 also may be used in various other settings. For example, the system 1602 may be used in an email system, in which each email is considered a media asset, so that discussion objects may be highlighted inside emails. Similarly, discussion objects could be highlighted while viewing lists of emails, as in an email inbox. In this way, a user may prioritize emails regarding particular topics of interest, or from/to particular senders/recipients. As in the other implementations, such an implementation would reduce the time, effort, and number of screens accessed by the user to enter preference information, and would allow the user to enter the preference information, for example, while viewing the content about which preference information is being entered, or while viewing the discussion objects in some other context.

Figure 34:
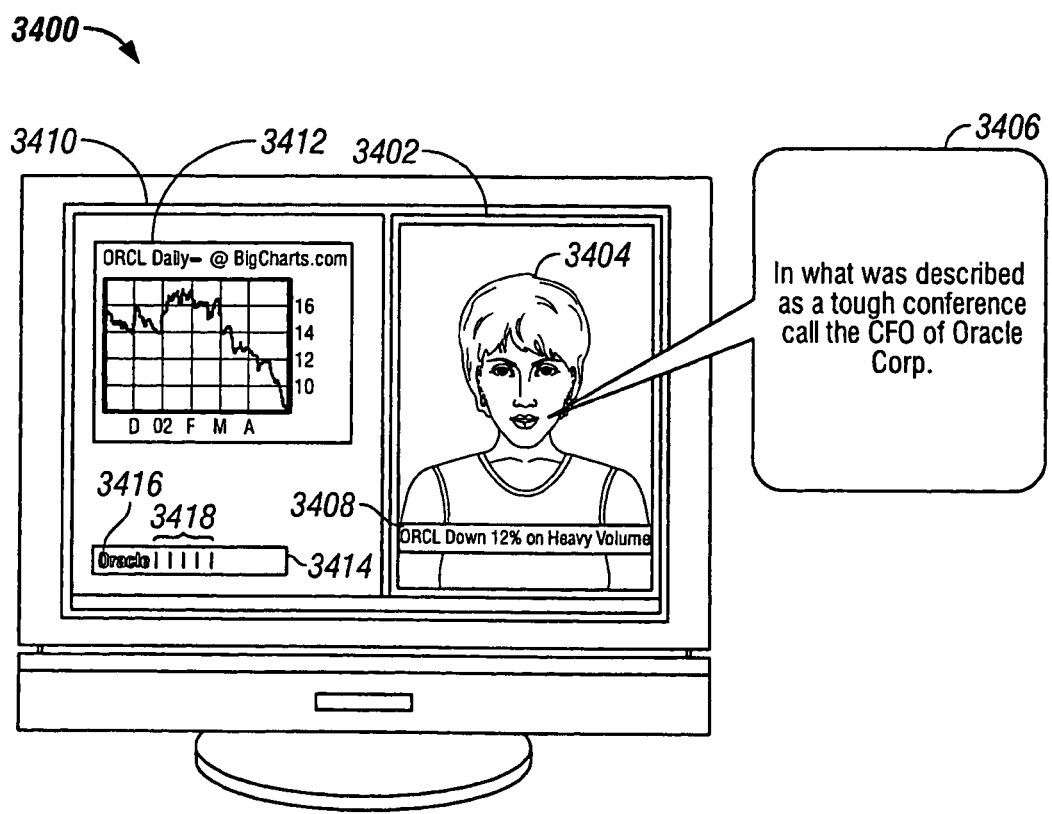
FIG. 34 is a first screenshot of a video presentation using the information system of FIG. 16.

FIG. 34 is a screenshot 3400 of a video presentation using the information system 1602 of FIG. 16. Screenshot 3400 may be, for example, an audio-video media asset that may be shown, for example, on a television or other video player (for example, a Moving Picture Experts Group ("MPEG") player).

Screenshot 3400 includes a first section 3402 displaying a narrator 3404 reading an article, as represented by a word balloon 3406. A title of the article being read by the narrator 3404 is included in the section 3402 as a text bar 3408. The text bar 3408, or another text bar (which may be static or scrolling, for example), could be used to display current headlines of the day, which may not be related to the article being read by the narrator 3404.

The screenshot 3400 also includes a second section 3410. The section 3410 includes in a chart 3412 supplemental and/or contextual information about the article being read by the narrator 3404. In this case, the chart 3412 provides stock market information about the company Oracle Corp.

Information to be included in the chart 3412 may be provided manually; for example, a person may be listening to the article being read (or may have read the article beforehand), and determining what, if any, information, should be included in the chart 3412. Alternatively, information for the chart 3412 may be provided using automated techniques.

Finally in the section 3410, a discussion object section 3414 is included. In the discussion object section 3414, a discussion object (or objects) 3416 is (are) included. In this case, the discussion object 3416 "Oracle" is included in the section 3414. Additionally, a section 3418 within the section 3414 displays preference information about the currently displayed discussion object 3416. In this case, the preference information is conveyed as a number of bars (using an appearance similar to that of techniques used for adjusting a volume of a television), but other techniques for indicating preference, such as those discussed above, also may be used.

The discussion object 3416 may be displayed automatically, concurrently with its occurrence within the article being read by the narrator 3404. In other words, as the narrator 3404 reads the word, in this case, "Oracle," during the reading of an article, then that word appears within the section 3414. The words within an article that are designated as discussion objects can be selected/determined using the various techniques discussed above, and may be displayed in other ways that are not specifically illustrated. For example, a closed-captioning rendering of the article being read may be streamed along a bottom of the display 3400, and the discussion object(s) 3416 "Oracle" may be highlighted, underlined, colored differently, or otherwise identified from within the closed-captioning text.

Even when an entire closed-captioning rendering of the article is not provided, as in screenshot 3400, text from within the closed-captioning text may be used to identify and extract words as the discussion object(s) 3416 "Oracle" for display in section 3414. Similarly, other audio sub-channels (for example, a secondary audio programming ("SAP") channel) may be designed and/or used to broadcast the discussion object 3416 "Oracle."

As the narrator 3404 continues to narrate a particular article, discussion objects may correspondingly appear within the section 3414. For example, in FIG. 35, a screenshot 3500 displays an example in which the narrator 3404 has continued reading the same article being read in screenshot 3400, and has now spoken the words "Larry Ellison," as shown in a word balloon 3502. Accordingly, the words "Larry Ellison" appear as a discussion object 3504 within the section 3414. The discussion object 3504 "Larry Ellison" may appear before, during, or after the reading of the words "Larry Ellison." As in screenshot 3400, the discussion object 3504 "Larry Ellison" is displayed along with a current preference indication, that is, a set of bars 3506, associated with that discussion object 3504. In screenshot 3500, the set of bars 3506 includes four bars, indicating a certain extent of preference based on a scale maximum of, for example, seven bars. FIG. 36 is a screenshot 3600, in which a set of bars 3602 within the section 3414 has been raised to a maximum of seven bars by a user, where the user has used a remote control 3604 to select the discussion object 3504 "Larry Ellison" for voting, and then to actually vote by raising the number of bars associated with the discussion object 3504 "Larry Ellison," as shown.

Figure 35:
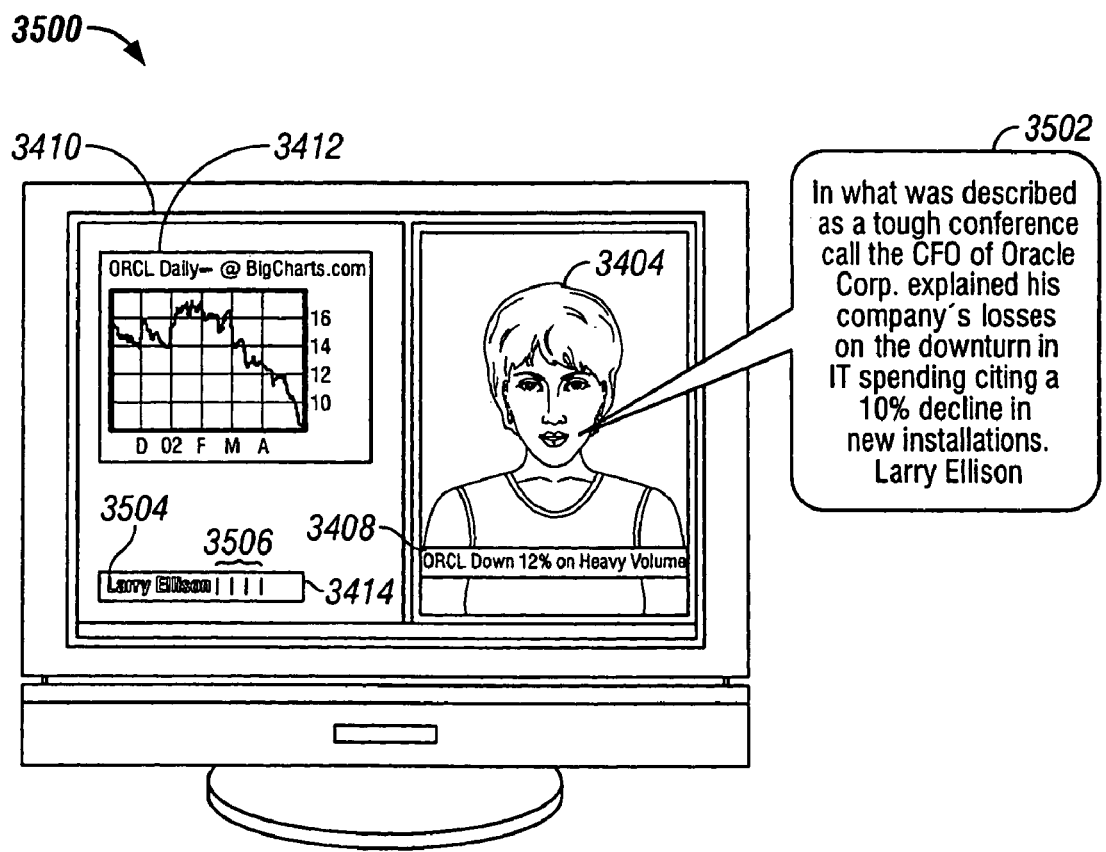
FIG. 35 is a second screenshot of a video presentation using the information system of FIG. 16.
Figure 36:
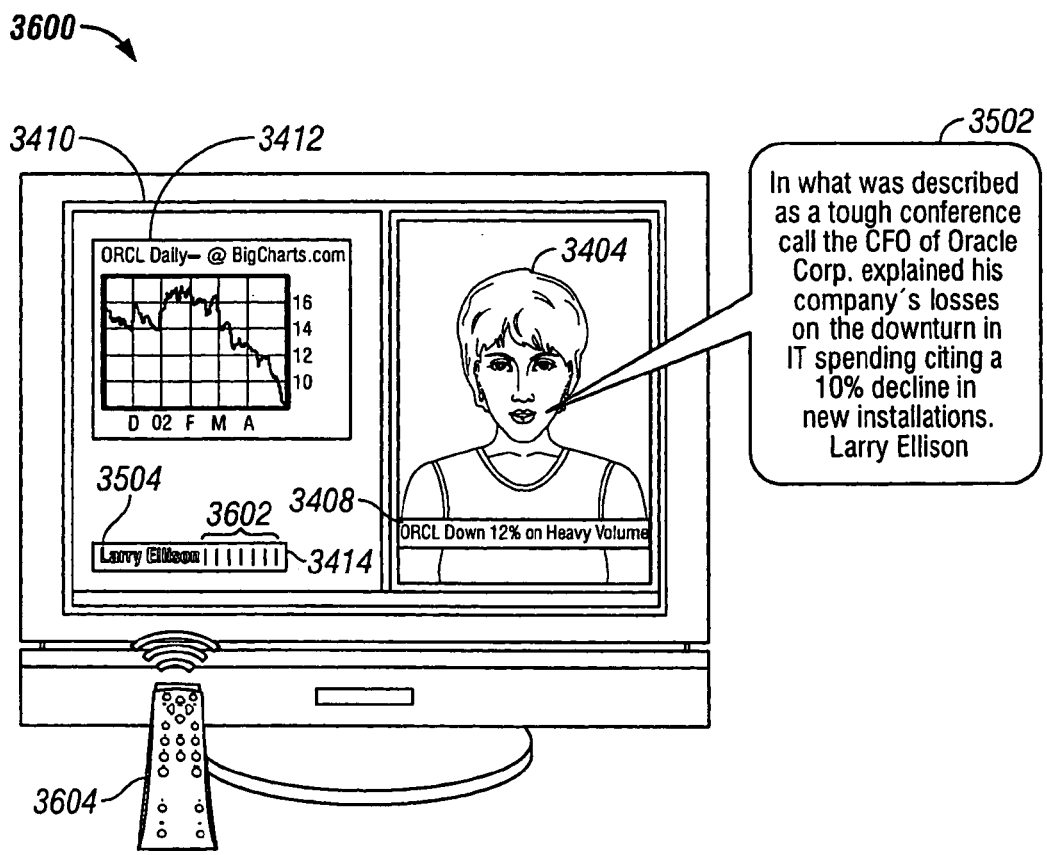
FIG. 36 is a third screenshot of a video presentation using the information system of FIG. 16.

Although not shown in the screenshots of FIGS. 34-36, a user may select an option in which multiple discussion objects appear simultaneously. If the user decides to vote on (that is, indicate a preference about) a discussion object such as the discussion object 3416 or 3504, then additional discussion objects spoken by the narrator 3404 while the user is voting on a current discussion object may be skipped, saved for later viewing (voting), or displayed in a different portion of the display. Alternatively, the video of the narrator 3404 may be paused during a voting process.

In other implementations, the user may use the remote control 3604 to select all discussion objects associated with the article currently being read for simultaneous display, perhaps on a separate screen, whereupon the user may change his or her preference information associated with any one of the discussion objects. As in the implementations above, the narrator 3404 may be paused during this operation, or may simply continue speaking while the user votes.

The information system 1602, or variations thereof, may be used to implement the screenshots of FIGS. 34-36. For example, on the client side in FIG. 16, the media asset 1622 would be an audio-visual media asset, such as the article being read by the narrator 3404. The discussion objects 1624 and 1626 would be the spoken versions of the discussion objects 3416 and 3504, while the discussion objects 1624*a* and 1626*a* would represent the textual versions of the discussion objects 3416 and 3504. The preference information 1628 would represent the section 3414 and associated information, or merely the section 3418 and associated information (bars). On the side of the request server 1630, the metadata presentation system 1620 may, as referred to above, interact with a closed-captioning system, or other secondary-audio programming channel, to provide discussion objects 3416 and 3504 within the section 3414, perhaps using the metadata enhancer(s) 1616 and 1612 to determine discussion objects for presentation. Such a system may be used, for example, to transmit MPEG video over the network 1606.

In other implementations, the audio-visual media asset may be broadcast over a television channel, which may be a public television channel, or a closed-circuit television channel, such as, for example, a company-wide television channel or a channel displayed on a television in a public or semi-public waiting area. Also, although not specifically illustrated, some subset of the discussion objects associated with an audio-visual media asset may be selected and presented within a portion of the screenshots of FIGS. 34-36, to serve as a visual summary of the media asset, in the manner described above with respect to FIGS. 18-21.

To implement the screenshots of FIGS. 34-36, a device (not shown) for obtaining and storing set-up and/or preference information from the user may be kept at either a broadcasting site (for example, server side), and/or at the client (for example, user) side. For example, a receiver such as a cable or satellite receiver, and/or a personal video recorder, could be used to input, record, and transmit the user's preference information.

As a result of inputting the user's preference information, an information system such as the information system 1602 may select future programming for the user accordingly, and similarly to the way other media assets were promoted, demoted, excluded, or included in the various examples above.

Although the examples of FIGS. 34-36 are discussed in terms of an audio-visual media asset, an audio media asset(s) also could be provided to the user, as part of an audio presentation device. For example, a user practicing the system 1300 of FIG. 13, in which a personalized audio presentation is delivered to the user, may listen to an audio media asset over a cell phone or car radio. Discussion objects could be distinguished to the user by way of a pre-determined sound, such as a "ping," after every discussion object. Alternatively, the discussion objects could be listed together, at a beginning or end of a particular media asset, or in conjunction with a title of a media asset. By inputting voice commands, the system 1300 (or other audio-content presentation system) may input preferences of the user.

In the above examples, various techniques were discussed for inputting preference information from a user, where the preference information is specific to content elements within a media asset, and the preference information is collected while the user is accessing a display of the media asset. These techniques allow a user to change his or her preference information quickly, easily, and efficiently, and to improve the use of, for example, a search engine, a portal page, a reverse-query portal page, or a video (for example, television) display. For example, the user may update/modify a search being performed by a search engine while viewing one of the media assets discovered during the search, without having to return to a search engine home page or search results page.

Figure 37:
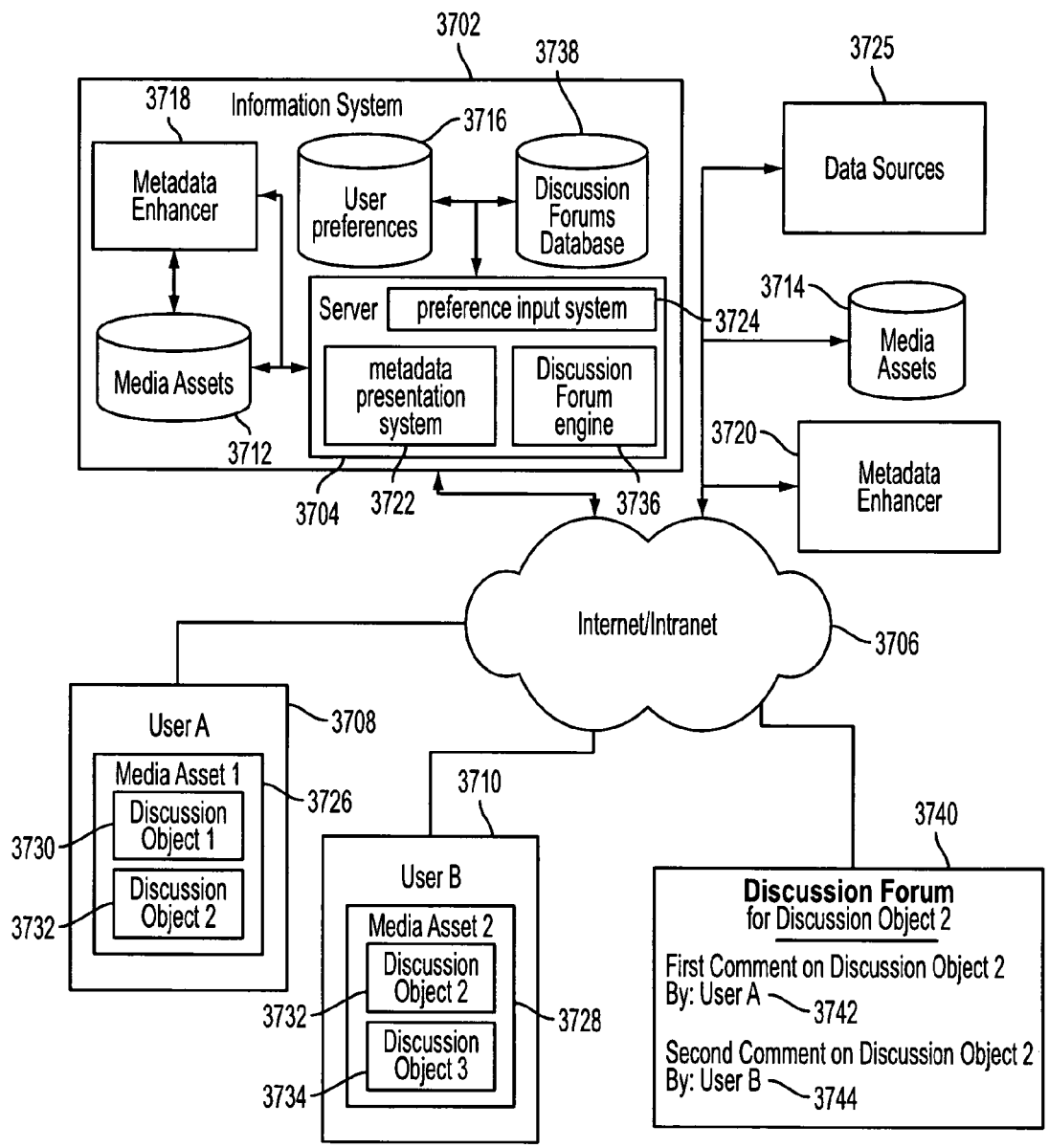
FIG. 37 is a block diagram of an information system for enabling user collaboration through discussion forums.

FIG. 37 is a block diagram of an information system 3702 for enabling user collaboration through discussion forums. In FIG. 37, the information system 3702 includes a server 3704 operable to output media assets, using a network 3706, to one or more users. For example, server 3704 may transmit media assets to a user interface 3708 associated with a first user identified as "user A," and also may deliver media assets to a second user interface 3710 associated with a user identified as "user B."

Media assets delivered by the server 3704 may be obtained from a media assets database 3712 that is internal to the information system 3702, or from a media assets database 3714 that is external to the information system 3702 (and accessed via the network 3706). As with the various networks discussed above, the network 3706 may be, for example, the public Internet, or may be an intranet, such as an enterprise-wide intranet.

The server 3704 may select particular media assets for delivery to users based on, for example, user preference information contained in a user preferences database 3716. A metadata enhancer 3718 may have previously modified and/or augmented content of the media assets by determining content metadata, e.g., discussion objects, associated with the content of the media assets, so as to assist in the selection of particular media assets for delivery to users by the server 3704. Additionally, or alternatively, such content metadata may be added by a metadata enhancer 3720 that is external to the information system 3702.

Once such content metadata has been selected from (and/or added to) content of the media assets being delivered, the server 3704 uses a metadata presentation system 3722 to present the metadata in an identifiable and distinguishable way on, for example, the user interface 3708 or the interface 3710. This presentation of the metadata may contain means for the user to express preferences about the metadata. The server may then use a preference input system 3724 to accept preference information from users receiving delivered media assets. In this way, the server may modify the user preferences database 3716 so as to be able to better provide media assets that are of interest to a particular user.

It should be understood from the above description that the information system 3702 shares many common features with the various information and content delivery systems described above. As a result, the information system 3702 may represent any one or more of these systems, as well as many other types of information systems that are not explicitly described herein.

For example, the information system 3702 may be utilized as a search engine, such as the search engine 1702, described above with respect to FIG. 17. In such an implementation, the information system 3702 may be modified to include, for example, an indexer and associated search index database, such as the indexer 1704 and index database 1706 illustrated in FIG. 17.

Similarly, the information system 3702 may be implemented as part of a portal system, such as the portal system 2802 illustrated above with respect to FIG. 28. In such an implementation, the information system 3702 may utilize access to data sources 3725, so as to generate media assets for delivery to users, as described above with respect to, for example, FIG. 28.

In yet another implementation, the information system 3702 may be used as part of a reverse-query portal system, such as the system 3302 described above with respect to FIG. 33. More specifically, the information system 3702 could be implemented as the content presentation system 100 illustrated in FIG. 1, or the content presentation system 1300, discussed above with respect to FIGS. 1 and 13, respectively.

In the latter two examples, it should be understood that the server 3704 may be modified to include various types of functionality not explicitly discussed or illustrated with respect to FIG. 37, such as the canvas layout subsystem 170, the content-type selector 175, or the media-type enabler 180 associated with the pagination engine 165 of FIG. 1. Of course, the request server 3704 and various other elements within FIG. 37 also may exhibit many other types of functionality related to selection, presentation, and/or delivery of content that are not explicitly discussed or illustrated with respect to FIG. 37.

Although the information system 3702 is described above as being utilized in conjunction with various other network elements, it should be understood as well that various elements of the information system 3702 may be omitted from certain implementations. For example, the preference input system 3724 may not necessarily be operated in the manners described above with respect to, for example, the information system 1602 of FIG. 16 (e.g., the preference input system may not make use of the various preference collection techniques described above with respect to, for example, FIGS. 9-11 and 18).

Instead, other techniques, including conventional techniques, may be used to collect the preference information of the user. Additionally, or alternatively, the media assets 3708 and 3710 may be provided based on some other criteria besides user preferences, such as some predetermined classification of the user that may be made by, for example, the enterprise providing the information system 3702. One example of such a classification may include a user's security classification, so that all users of a certain security classification may be designated to receive a particular media asset).

In any of the various implementations as discussed above, as well as in various implementations not explicitly mentioned, the information system 3702 outputs one or more media assets to a plurality of users. More specifically, the server 3704 outputs, for example, a first media asset 3726 to the interface 3708 associated with user A. Similarly, the server 3704 outputs a second media asset 3728 to the interface 3710 associated with user B. The media asset 3726 delivered to user A contains a first discussion object 3730 and a second discussion object 3732. Similarly, the media asset 3728 contains the discussion object 3732, as well as a third discussion object 3734.

The various discussion objects within the media asset 3726 and the media asset 3728, as explained in various contexts above, represent, for example, content metadata associated with the content of the media assets 3726 and 3728, where such content metadata has been provided by the metadata enhancer 3718 and/or the metadata enhancer 3720. The discussion objects 3730, 3732, and 3734 thus may be presented by the metadata presentation system 3722 in any of the various manners described above, such as, for example, highlighting, bolding, coloring, underlining or double underlining, or any other technique for visibly or audibly identifying the discussion object within the content of the media asset.

As described above, the inclusion of discussion objects within media assets delivered to users offers several features and advantages. For example, the discussion objects allow users to input preference information about a particular term or concept, simply by "hovering" a cursor over a discussion object related to that concept and indicating preference information accordingly, by, for example, indicating a degree of like or dislike of the discussion object using a pop-up window such as, for example, the pop-up window 1105 or 1110 illustrated and discussed above with respect to FIG. 11. Additionally, the user may select a particular discussion object by clicking on that discussion object, so as to view information about that discussion object, or to view information about a discussion class of the discussion object. As yet another example, the user may select a discussion object as a link to a separate page that may be associated with the discussion object.

In the implementation of FIG. 37, one possibility associated with selecting a particular discussion object is to view and/or participate in a discussion forum 3740 that is associated with the particular discussion object selected. Specifically, in FIG. 37, selection of the discussion object 3732 provides a link to the discussion forum 3740 that is dedicated to discussion of the discussion object 3732 and related matters.

In this regard, it should be noted that the discussion object 3732 appears separately within the different media assets 3726 and 3728 delivered to the user A and the user B, respectively. Nonetheless, selection of the discussion object 3732 directs both of user A and user B to the single discussion forum 3740, whereupon both the users may read and/or contribute to content of the discussion forum 3740. For example, the user A may publish a first comment 3742 about the discussion object 3732, and, in response, the user B may input a second comment 3744 about the discussion object 3732.

More specifically, and as discussed in more detail below, the discussion form 3740 contains and displays the same comments, whether viewed by user A or user B. Nonetheless, even though the discussion forum 3740 contains the same comments, these comments may be sorted differently for each user, based on, for example, individual preferences of that user. For example, if user A indicates a preference for comments of user B (based on, for example, approval of user B's previous comments), then user A may view the discussion forum 3740 with comments by user B posted at or near a top of the listing of comments. In this sense, every user may be treated like a discussion object, i.e., other users may enter preference information about the user using any of the techniques described herein, or other techniques. As a result, the discussion forum 3740 may be personalized for each user.

The discussion forum 3740 and similar discussion forums associated with other discussion objects may be set up, administered, and maintained by a discussion forum engine 3736 within the server 3704. For example, the discussion forum engine 3736 may be used to input and subsequently display comments from the various users of the discussion forum 3740. As another example, the discussion forum engine 3736 may be used to route communications between the various users of the discussion forum 3740, perhaps using a private e-mail system. As yet another example, the discussion forum engine 3736 may be used to determine rankings associated with particular users, so as to rank a value of contributions of the particular user.

In administering and maintaining the discussion forum 3740, the discussion forum engine 3736 may utilize a discussion forum database 3738 that is designed to store information about the discussion forum 3740. For example, the discussion forum database 3738 may store the various comments and postings to the discussion forum 3740, as well as a list of registered users of the discussion forum 3740, and the associated rankings of the various users. Further examples and explanations of the functions and ability of the discussion forum engine 3736 and the discussion forums database 3738 are provided below.

It should be understood from the description provided herein that the term "discussion forum" refers at least to any site or content that allows multiple users to post information thereto, such that at least one other authorized user may view the posted information. The information may be posted and exchanged either synchronously or asynchronously, and users may participate either by discrete postings or by continuous or "live" postings.

The term discussion forums thus encompasses any technology for providing such a capability, as well as any terminology for referring to this capability. For example, the term discussion forums should be understood to include any type of "chat room," "chat group" "bulletin board," "instant messaging," "discussion group," or any other type of virtual meeting that may be conducted using a network.

Figure 38:
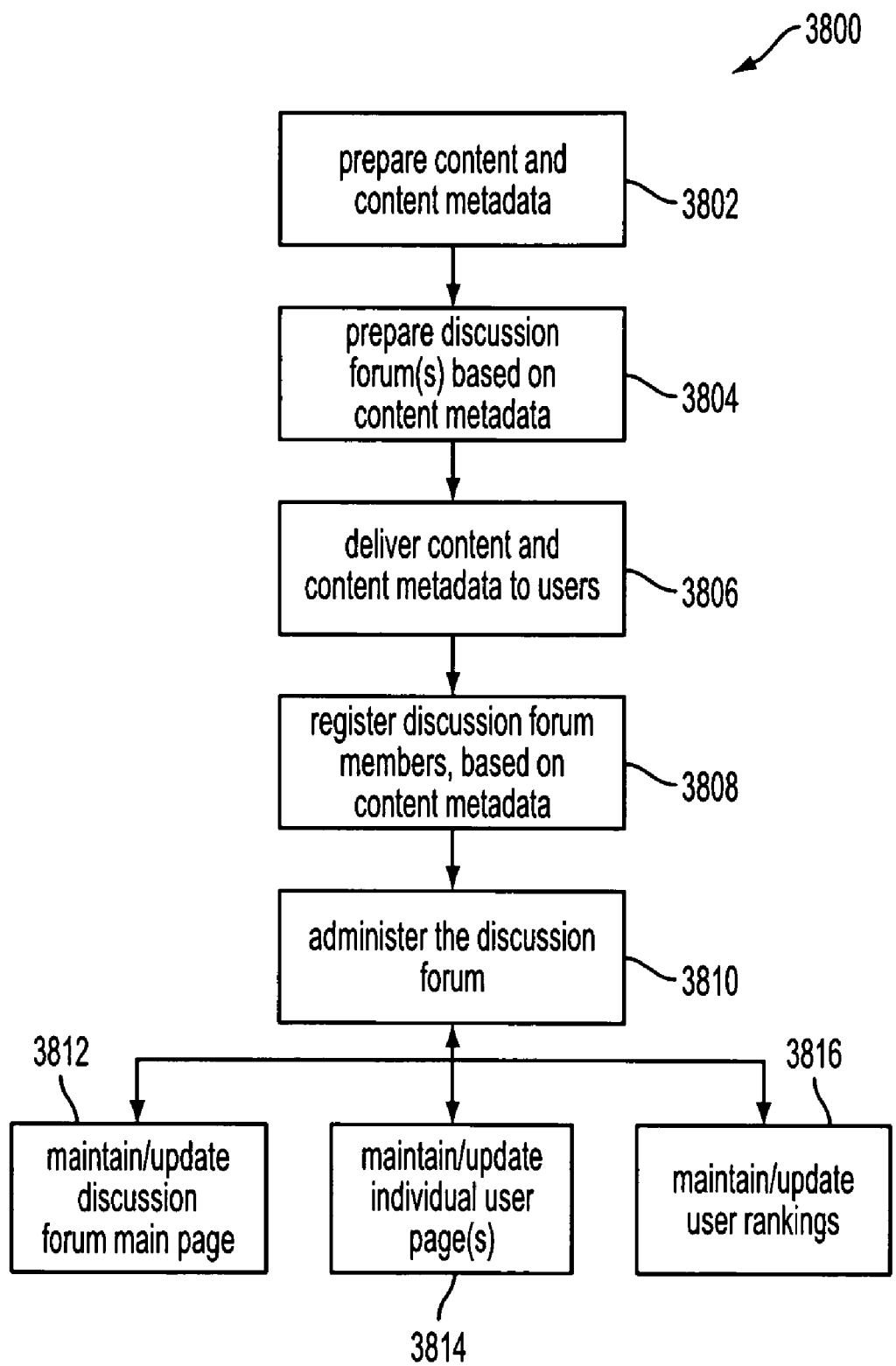
FIG. 38 is a flowchart illustrating techniques for creating and administering the discussion forums of FIG. 37.

FIG. 38 is a flowchart 3800 illustrating techniques for creating and administering the discussion forums of FIG. 37. In FIG. 38, the information system 3702 begins by preparing content and associated content metadata (e.g., discussion objects), in one or more of the various manners described above (3802). The information system 3702 then prepares discussion forums, where each discussion forum is associated with specific content metadata (3804). In another implementation, the information system 3702 may create a discussion forum only after at least one user expresses interest in joining the discussion forum.

The information system 3702 then delivers the content and the content metadata to users of the information system 3702, as part of one or more of the various content selection, presentation, and/or delivery systems described above (3806).

Based on user interaction with the content metadata, if any, the information system 3702 (specifically, the discussion forum engine 3736) registers specific discussion forum members within a particular discussion forum (3808). Various techniques exist for performing this registration functionality. For example, a user may be automatically registered for a discussion forum associated with a particular discussion object, based on a preference indication about the discussion object that is made by the user. That is, upon an indication of at least minimal preference for receiving information about a particular discussion object, a user may be registered as a member of the discussion forum associated with that discussion object. As another example, a user may be able to select a discussion object and be provided (e.g., in a pop-up window) with a simple yes/no choice as to whether that user wishes to be registered as a member of an associated discussion forum. As yet another example, all (or some subset of) users may be made members of all (or some subset) available discussion forums automatically, or by default.

Upon registration of one or more members in discussion forum, the information system 3702 proceeds to administer use of the discussion forum by those registered members (3810). For example, the information system 3702, and more particularly, the discussion forum engine 3736, may maintain and update a main page of the discussion forum (3812). For example, such duties may include insuring a proper order and appearance of comments submitted by the discussion forum members, and/or deleting user comments after some predetermined period of time.

Additionally, the discussion forum engine 3736 may be responsible for maintaining and updating a user page associated with each of the discussion forum members, so that other members may, for example, view all of the postings of a particular member in one common window (3814). As a final example of administering the discussion forum, the discussion forum engine 3736 may be responsible for maintaining and updating user rankings associated with each member (3816), so that other members of the forum may have an accurate idea of other members' opinions as to a value, if any, of contributions of a particular users. The user rankings may be maintained, for example, in conjunction with the individual user pages just discussed, perhaps using the discussion forums database 3738.

Figure 39:
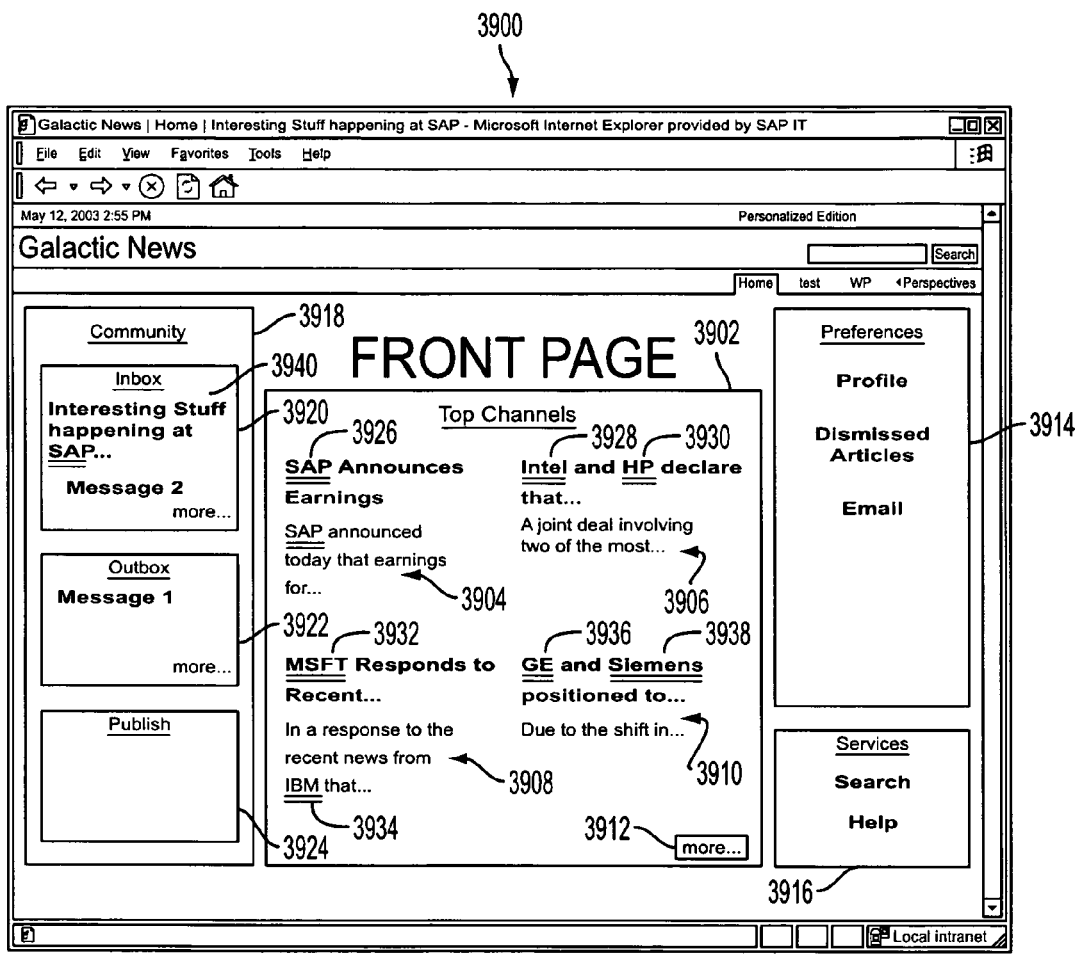
FIG. 39 is a screen shot of a page delivered by the information system of FIG. 37.

FIG. 39 is a screen shot 3900 of a page delivered by the server 3704 to a user interface, such as the interface 3708 and/or the interface 3710 described above with respect to FIG. 37. In FIG. 39, the screen shot 3900 represents a plurality of media assets that are combined according to certain categories and preferences associated with the particular user who is receiving the content. In this regard, the screenshot 3900 may represent a result of the content presentation system 100 of FIG. 1, which, as described in detail above, is operable to filter, prioritize, and present media assets of many different types, according to current preferences of the user. However, the screenshot 3900 could of course represent a result of many other types of content presentation and/or delivery systems, including otherwise conventional portal systems, as already discussed.

The screenshot 3900 includes a section 3902 presenting top channels or preferences of the user receiving the screenshot 3900, based on information stored in the user preferences database 3716. The section 3902 includes a first media asset 3904, a second media asset 3906, a third media asset 3908, and a fourth media asset 3910. Additionally, the section 3902 includes a button 3912 for obtaining more articles that relate to primary preferences of the user.

The screenshot 3900 further includes a preferences section 3914 that allows the user to, for example, change preference information related to the user's profile, the user's preferences regarding dismissed or unwanted articles or other information, or e-mail preferences of the user. Further, a services section 3916 includes, for example, a search functionality and a help functionality, whereby the user may search for information in the information system 3702 and/or on the network 3706, or may seek help in utilizing the information system 3702, respectively.

The screenshot 3900 further includes a community section 3918. The community section 3918 includes an inbox section 3920, an outbox section 3922, and a publish section 3924. In the inbox section 3920, the user may view one or more recently-received messages. More specifically, the user may view messages sent privately to the user, perhaps in response to a posting by the user on a given discussion forum.

In the outbox section 3922, the user may view information that is to be sent to a particular recipient(s). For example, the outbox section 3922 may include information to be posted to the community of users at-large, or to a group of users, or to a particular discussion forum. As another example, the outbox section 3922 may include information to be individually sent to another user.

The publish section 3924 primarily provides an ability to access a screen in which the user may enter information for publishing, to the community at large and/or to a particular discussion forum. An example of such a screen is discussed in detail below, with reference to FIG. 44.

With respect to the community section 3918, in one implementation, messages or other information in the inbox section 3920 and/or the outbox section 3922 may be provided by way of the information system 3702, which may represent any of the various information systems discussed herein, as well as other information systems. Additionally, or alternatively, a conventional email system may be used to provide messages.

In any of the various sections of the screenshot 3900, and as described above with respect to various implementations, a particular media asset may include one or more identified discussion objects. For example, the media asset 3904 includes a discussion object "SAP" 3926. Similarly, a media asset 3906 includes a discussion object "Intel" 3928, and a discussion object "HP" 3930 (representing, in this case, "Hewlett-Packard"). Further, the media asset 3908 contains a discussion object "MSFT" 3932 and a discussion object "IBM" 3934. Finally, the media asset 3910 includes a discussion object "GE" 3936 (representing, in this case, General Electric), and a discussion object "Siemens" 3938.

As described above, any one of the discussion objects 3926-3938 may be linked to a discussion forum dedicated to an exchange of information about that particular discussion object. As also explained above, a given discussion forum will be linked to its associated discussion object regardless of where the discussion object appears in association with the information system 3702.

For example, even when the discussion object is included within separate media assets provided to multiple users, a selection of the particular discussion object by the particular user in any one of the media assets will lead that user to the associated discussion forum. In this way, users of the information system 3702, who may otherwise be unaware of other users of the system 3702 who share common interests or problems, may be allowed to meet one another and collaborate with one another in an easy, convenient, and useful way.

In addition to selecting a particular discussion object for directly linking to its associated discussion forum, a user viewing screenshot 3900 also may select one of the various media assets shown in the screenshot 3900 for viewing in its entirety. For example, the user may select a message 3940 from the inbox section 3920 of the screenshot 3900. In this example, the message 3940 happens to include the discussion object "SAP" 3926.

Figure 40:
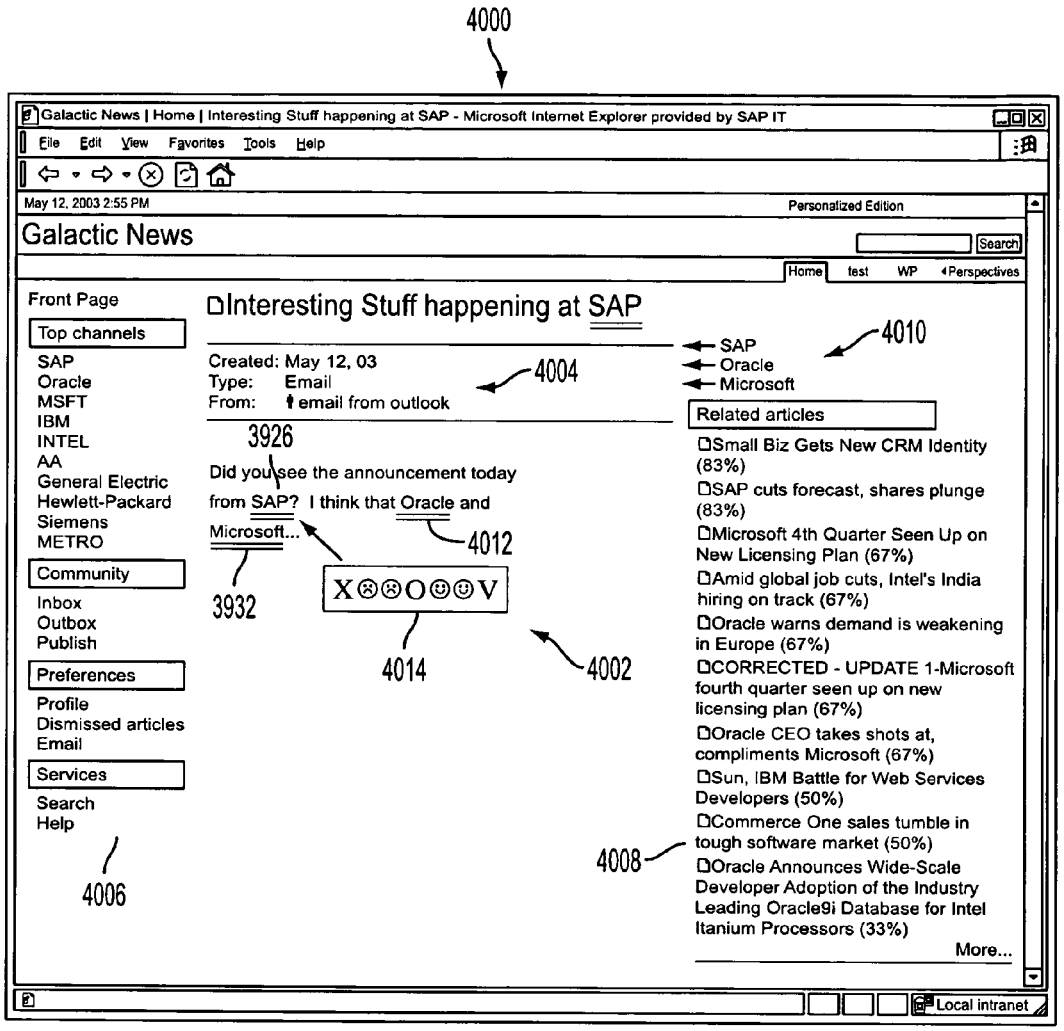
FIG. 40 is a screenshot illustrating a media asset selected from the screenshot of FIG. 39.

FIG. 40 is a screenshot 4000 illustrating a media asset selected from the screenshot 3900 of FIG. 39. More particularly, the screenshot 4000 presents the message 3940 from the screenshot 3900. The message 3940 may be displayed in its entirety in a primary section 4002. The section 4002 also may include a section 4004 identifying characteristics of the, in this case, message 3940. For example, the subsection 4004 may provide information that the media asset being displayed in the section 4002 is a message created on a particular date.

The screenshot 4000 also may include a section 4006 referring back to the front page displayed in the screenshot 3900. The screenshot 4000 also may include a section 4008 for displaying media assets related to discussion objects included within the media assets displayed in the section 4002.

The screenshot 4000 also may include a section 4010 for displaying particular discussion objects that appear within the media asset displayed in the section 4002. The section 4010 may thus provide a visual snapshot or summary of content displayed in, in this case, the message 3940, and may further provide direct links to occurrences of the respective discussion objects within the message 3940. The latter functionality may be particularly useful in cases where the media asset displayed within the section 4002 is particularly lengthy.

In the example of screenshot 4000, the message 3940 includes the discussion objects "SAP" 3926 and "Microsoft" 3932 (note that the discussion object "Microsoft" 3932 is similarly identified regardless of whether it happens to be spelled out, as in FIG. 40, or represented as a stock market symbol, as in FIG. 39, since it either terminology refers to the same company). Additionally, a discussion object "Oracle" 4012, which was previously unviewable in the screenshot 3900, is now displayed within the screenshot 4000.

There are a variety of ways that a user may elect to view or otherwise participate in a discussion forum, such as the discussion forum 3740 of FIG. 37. For example, as mentioned above, the information system 3702 may be designed such that all users are automatically made members of all available discussion forums. Thus, by selecting a discussion object, users may read available postings and/or post their own messages.

In another implementation, a pop-up window 4014 may be used to enable users to have input as to whether they wish to register as members of a particular discussion forum. Specifically, the pop-up window 4014 provides a preference input technique that may work in conjunction with the preference input system 3724 of the information system 3702. Upon expressing a positive preference with respect to the discussion object "SAP" 3926, the user may automatically be registered as a member of a discussion forum associated with that discussion object and/or may be brought to a page displaying that discussion forum.

The pop-up window 4104 may be designed and/or implemented similarly to other pop-up windows discussed herein, such as the pop-up windows shown in FIGS. 9-11 or 18. As another example, the pop-up window 4104 may be designed so as to directly provide explicit choices for accessing, joining, or viewing a discussion forum associated with the discussion object. For example, the pop-window 4104 might contain selections such as "join discussion forum," "view discussion forum," or "resign membership in discussion forum."

It should be understood that the discussion object "SAP" 3926 may be used in a variety of ways to access its associated discussion forum, either directly and/or using the pop-up window 4104. For example, a user may access the pop-up window 4104, and consequently the relevant discussion forum, by "hovering" a mouse cursor over the discussion object "SAP" 3926, by left- or right-clicking on the discussion object "SAP" 3926, by double-clicking on the discussion object "SAP" 3926, or by otherwise selecting the discussion object "SAP" 3926.

In various implementations, these and other techniques for selecting a particular discussion object may be assigned specific functionality. For example, a user may "hover" over a particular discussion object in order to assign preference information to the discussion object (e.g., to view the pop-up window 4014), and may right-click on the discussion object in order to view a secondary pop-up window designed specifically for allowing the user to join or view the relevant discussion forum. Various other combinations of the techniques for selecting and/or operating on a particular discussion object also may be used.

Figure 41:
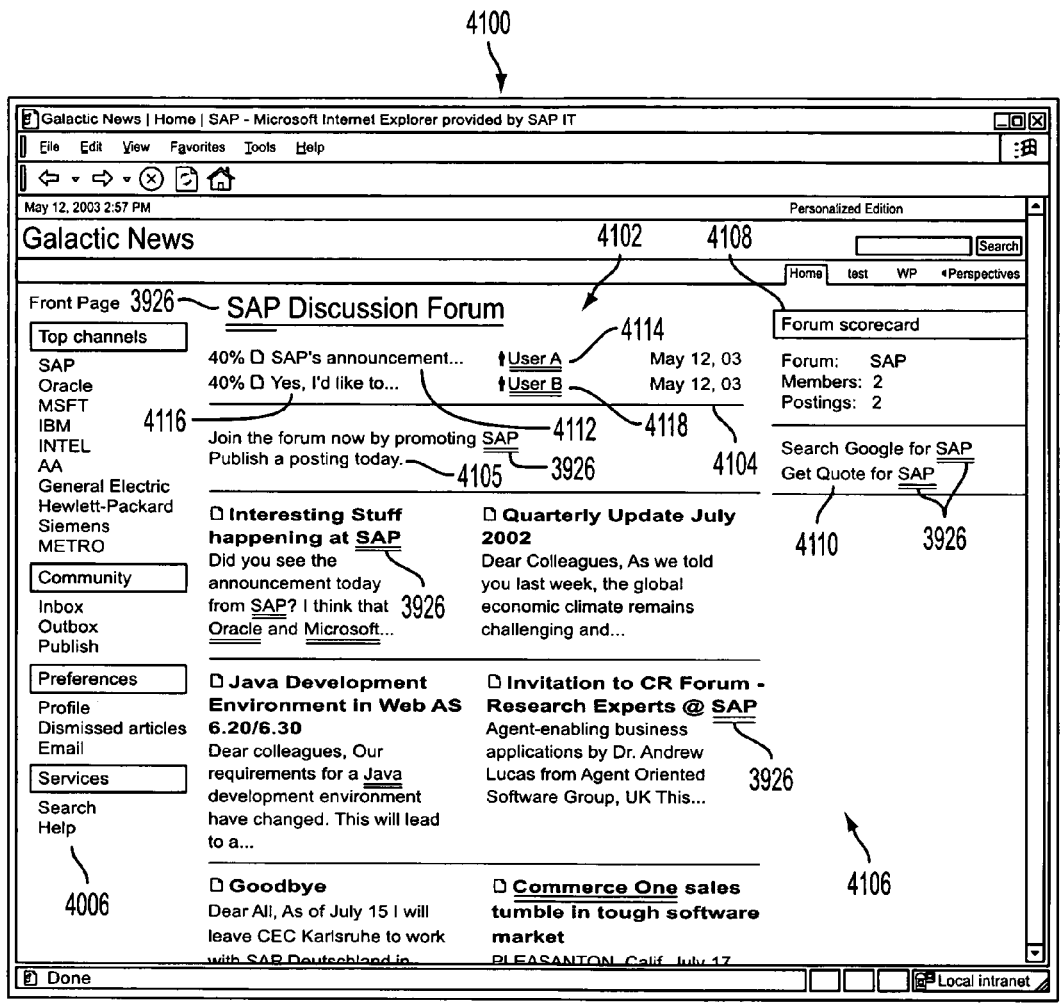
FIG. 41 is a screenshot illustrating a discussion forum associated with a discussion object from the screenshot of FIG. 39 or 40.

FIG. 41 is a screenshot 4100 illustrating a discussion forum 4102 associated with the discussion object "SAP" 3926. As should be understood from the above, the screenshot 4100 may be reached via either the screenshot 3900, the screenshot 4000, or any other screen which contains a media asset that includes the discussion object "SAP" 3926.

In addition to the section 4006 previously described, the screenshot 4100 includes a discussion forum section 4102. The discussion forum 4102 includes a posting section 4104 that lists all of the current postings of the discussion forum 4102 from various users. In particular, for example, the posting section 4104 includes a title or subject of each post, an identification of author of the post, a date of the post, and a relevance indication to the viewing user showing an extent to which the post matches preference information of that user.

A section 4105 includes general information about the discussion forum 4102, such as, for example, that a viewer of the forum may join the forum by promoting, i.e., expressing a positive preference indication, regarding the discussion object associated with the discussion forum 4102. A section 4106 includes a number of media assets related to the discussion object associated with the discussion forum 4102. In this case, the section 4106 includes articles related to the discussion object "SAP" 3926. It should be understood that, due to space limitations and/or preference information, not all of the articles within the section 4106 of the discussion forum 4102 could normally be displayed within a front page of information such as that displayed within the screenshot 3900.

The discussion forum 4102 also includes a forum scorecard section 4108 that identifies the discussion object associated with the discussion forum 4102. The scorecard section 4108 also identifies a number of members of the discussion forum, and a current number of postings included within the discussion forum 4102.

A section 4110 includes additional information that may be available with respect to the discussion object being viewed. In this case, the additional information includes a network search for information related to the discussion object, as well as a stock market quotation associated with the discussion object. Of course, such additional information sources may be changed or modified based on, for example, the particular discussion object being considered, or relevant user preferences.

In the example of the discussion forum 4102 of FIG. 41, the posting section 4104 includes two posts, as indicated within the forum score card section 4108. In particular, the posting section 4104 includes a first post 4112 posted by a user A 4114, as well as a second post 4116, posted in response to the post 4112 by a user B 4118.

Figure 42:
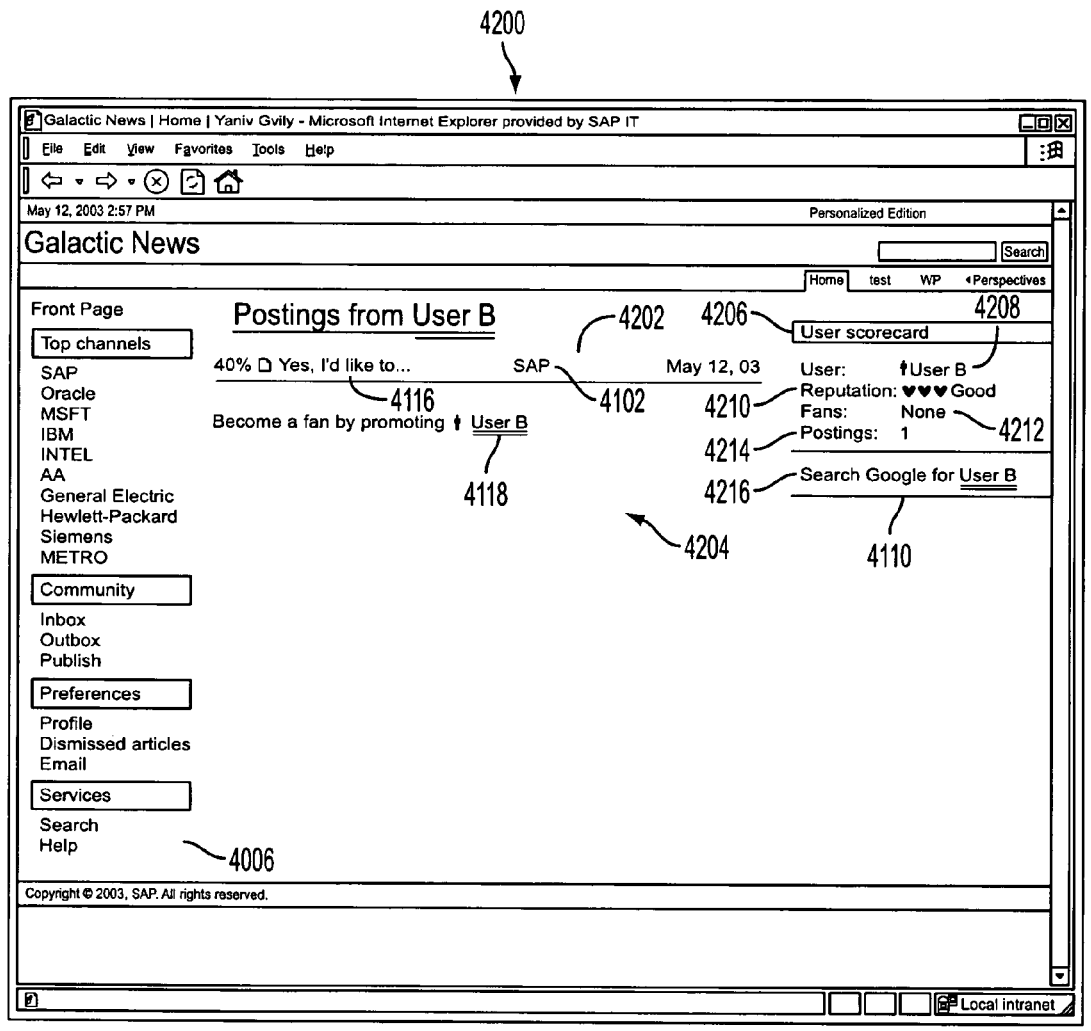
FIG. 42 is a screenshot showing a result of selecting a user from a posting section of FIG. 41.

FIG. 42 is a screenshot 4200 showing a result of selecting a user from the posting section 4104. Specifically, in the screenshot 4200, a viewer of the discussion forum 4102 has "clicked on" or otherwise selected the user B 4118, and is thus able to view all current and previous postings of the user B 4118. Specifically, the screenshot 4200 includes a section 4202 listing, in this case, the post 4116, as well as the fact that this post appears in the forum 4102.

A section 4204 allows a viewer of the screenshot 4200 to express preference information regarding the user B 4118. In this regard, reference to the user B 4118 may be understood to be provided as a discussion object, in much the same way as any of the discussion objects previously discussed. That is, a user may be allowed to, for example, express preference information about a user B using, for example, a preference indication pop-up window such as the pop-up window 1105 shown in FIG. 11, or using any of the various other preference indication techniques described above.

As a result, a user scorecard section 4206, somewhat analogous to the forum scorecard section 4108 of FIG. 41, includes information specific to the user B 4118. In particular, the user scorecard section 4206 identifies the user B in a line 4208, and identifies a current reputation of the user B 4118 as being "good" in a line 4210. Further, the user scorecard section 4206 includes a line 4212 indicating a number of users who have elected to become "fans" of the user B 4118, using the technique described above with respect to section 4204. Finally with respect to the user scorecard section 4206, that section includes a line 4214 that illustrates a total number of postings of the user B 4118.

In the user scorecard section 4206, the reputation of a particular user as shown in the line 4210 may be determined in a variety of ways. For example, in the case where ranking information of the user in question is entered by accepting positive and/or negative information about the user from other users, a total ranking for the user in question may be calculated by calculating a ratio of good to bad votes associated with the particular user. In this case, different weights may be assigned to a positive or negative rating, depending on a strength (for example, a number of stars selected) of a preference indicated by users giving rankings.

As a result of whatever ranking scheme is used, a reputation assigned to a particular user may have various impacts on that user. For example, a user who obtains a negative rating beyond a certain magnitude may be identified as a publisher of "spam," that is, useless or distracting information. As a result, such a spamming user may be prohibited from posting to one or more discussion forums associated with the information system 3702.

Additionally, preference indications entered by users about other users may be utilized to provide personalized discussion forums. For example, a user may personalize his or her viewing of a discussion forum based on other's rankings of forum members (i.e., based on the public reputations of the individual members). That is, posts within the discussion forum may be listed in order, accordingly to positive or negative rankings of the posts' authors as determined based on preference information entered by various ones of the discussion forum users. As discussed above, such reputation information is displayed within line 4210 of the user scorecard 4206.

In another implementation, a user may personalize a discussion forum according to his or her individual preferences expressed about the forum members. For example, if a user becomes a fan of the user B 4118 by promoting the user B 4118, then this fan may elect to see posts from the user B 4118 listed first within any discussion forum that the fan may decide to view or otherwise participate in. The fan may thus have a personalized viewing of the discussion forum, that is based on personal preferences of that user.

Whether a user personalizes discussion forum preferences based on his or her opinion of other users, or on public opinion of other users, the personalization may apply to one or more of the discussion forums in which the user participates. For example, a user may personalize one discussion forum based on members' rankings, and another based on individual preferences regarding users, or any combination of these two criteria. As another example, the user may indicate that posts by a particular user should always be prioritized, regardless of which forum is currently being viewed.

A final section 4216 of FIG. 42 is an information section allowing a viewer of the screenshot 4200 to gain additional information about the user B 4118, such as by performing network wide search using the name of the user B 4118 as a search parameter. Thus, the information section 4216 is analogous to the information section 4110 of FIG. 41.

Figure 43:
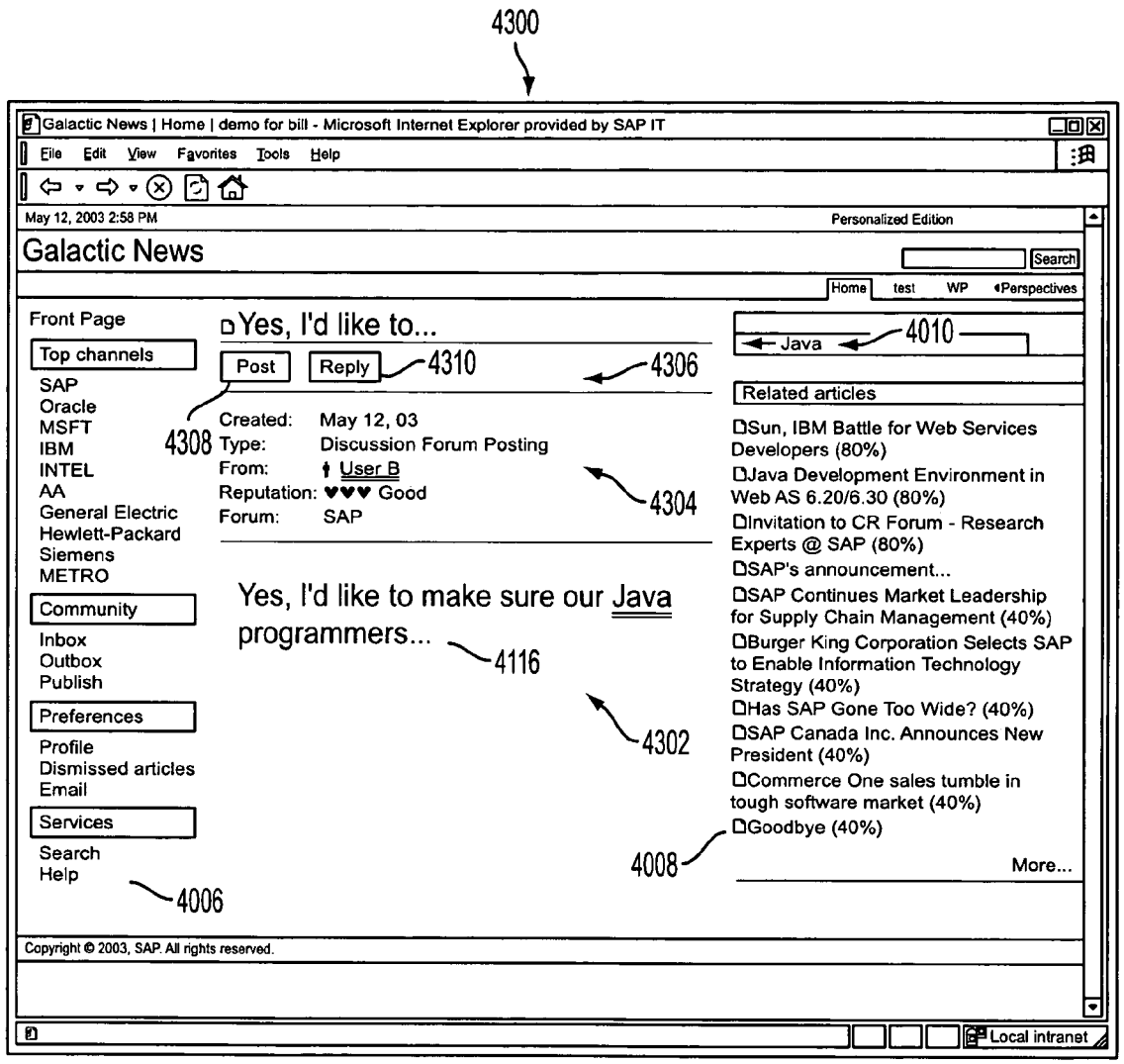
FIG. 43 is a screenshot illustrating a result of selecting a posting from the discussion forum of FIG. 41 for viewing.

FIG. 43 is a screenshot 4300 illustrating a result of selecting the posting 4116 for viewing. It should be understood that the posting 4116 may be selected for viewing from, for example, either the screenshot 4100 or the screenshot 4200. In FIG. 43, the posting 4116 is shown within a section 4302. The section 4302 also includes a section 4304 for displaying attributes of the posting 4116.

In the section 4304, for example, a date of creation and type of the posting may be displayed. Additionally, the author of the post (here, user B 4118), as well as the author's reputation, also may be included. Finally, in section 4304, a forum or forums in which the posting 4116 appears (here, the "SAP discussion forum" 4102) also may be displayed.

A response section 4306 of the section 4302 allows a reader of the posting 4116 to respond to content of the posting 4116. For example, a post button 4308 allows a user to post or publish a reply to the posting 4116 on the relevant discussion forum, so that such a response will be available to all the members and/or viewers of the discussion forum. As another option, a reply button 4310 allows a reader of the posting 4116 to respond directly and exclusively to the author of the posting 4116 (here, user B 4118). That is, such a response may be, for example, sent directly to the personal inbox of the user B 4118.

Figure 44:
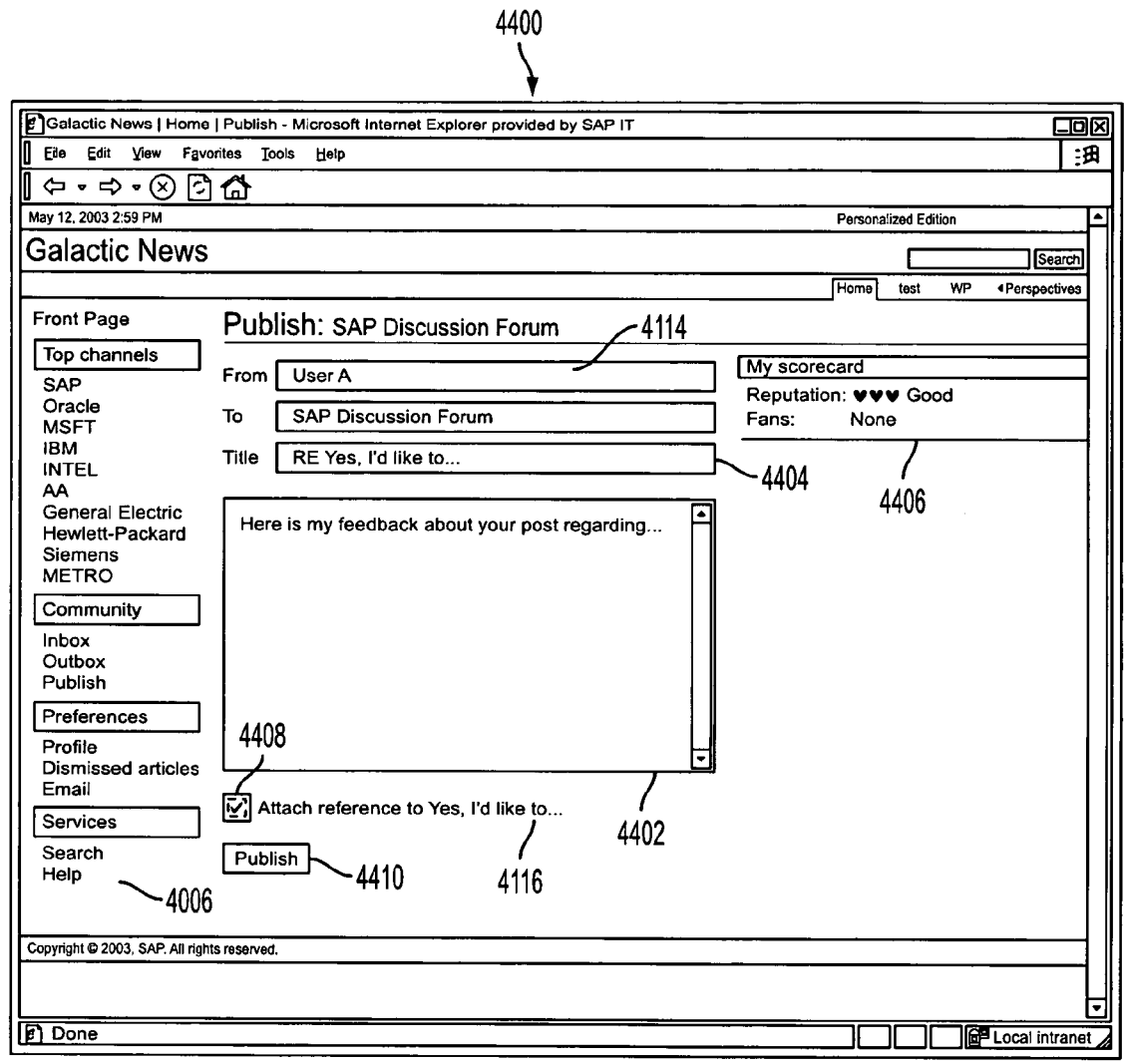
FIG. 44 is a screenshot illustrating a user interface for responding to a discussion forum posting.

FIG. 44 is a screenshot 4400 illustrating a user interface for responding to a discussion forum posting (here, the posting 4116). The screenshot 4400 includes a window 4402 for entering text or other information for responding to the posting 4116. A response attribute section 4404 includes information about attributes of the response included in the window 4402. Such attributes include, for example, an author of the response (here, the user A 4114), a title of the response, and an identification of the discussion forum to which the response will be published (here, the "SAP discussion forum").

A scorecard section 4406, similarly to the scorecard sections discussed above, provides the user with information about his or her current reputation within the relevant discussion forum, as well as a number of fans, if any, that the user may have. A box 4408 allows the responding user (here, the user A 4114) to attach a reference (for example, a link) to the posting to which the user is responding (here, the posting 4116). Finally with respect to FIG. 44, a publish button 4410 allows the responding user to publish the response within the window 4402 to the relevant discussion forum.

Figure 45:
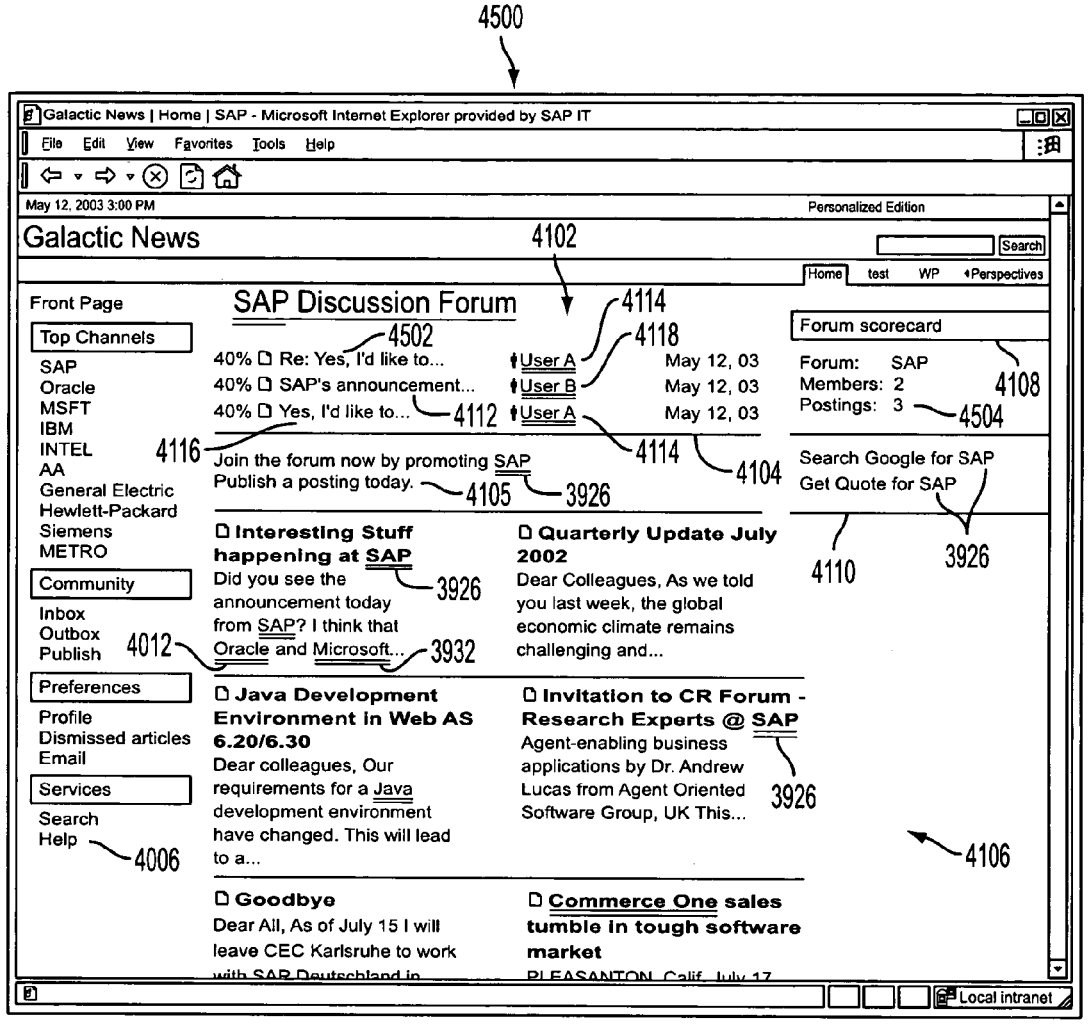
FIG. 45 is a screenshot illustrating an updated version of the discussion forum of FIG. 41.

FIG. 45 is a screenshot 4500 illustrating an updated version of the discussion forum 4102. Specifically, the screenshot 4500 includes a posting 4502 representing the response entered into the window 4402 of FIG. 44. Accordingly, a line 4504 within the forum scorecard 4108 reflects that fact that the discussion forum 4102 now includes a total of three postings.

As already pointed out, described implementations may be utilized in any number of settings, including portals, search engines, and variations or modifications thereof. In particular, in the content presentation system 100 of FIG. 1, it should be understood that many of the requisites for implementing discussion forums already are included in the system 100. For example, users are able to publish information to one or more other users, and any content element can be identified as a discussion object and associated with, for example, a page of articles that are primarily about that discussion object.

By combining these and related concepts and functionalities, the information system 3702 may be implemented directly in the content presentation system 100. For example, information stored in the discussion forums database 3738 may be regarded simply as data/articles within the articles database 125, and functions of the discussion forum engine may effectively be performed by, for example, the personalized article processor 145 and/or the pagination engine 165.

In conclusion, known discussion forums generally require users to find (or originate) a discussion forum associated with a desired topic, and sign up to use the service (or sign others up). Other than using such techniques as Internet searches and word-of-mouth, other users may have no easy, convenient, or reliable way to increase the chances that other interested users will find a particular discussion forum. As a result, some users may never start or find a particular forum, or, alternatively, multiple, fragmented forums may develop, so that there is not a full exchange of ideas.

With the implementations described herein, users of a particular system, perhaps within an enterprise, may be enabled to meet and collaborate with one another in an easy and useful way. The users do not generally have to search for or otherwise locate a particular discussion forum, other than indicating a preference for the associated discussion object. Moreover, even if the user does not think or remember to express a preference for a particular discussion object, that user may receive content containing that discussion object if the discussion object appears in a particular media asset. Thus, odds of users who are interested in a particular topic meeting with one another may be substantially increased. By encouraging and enabling user collaboration and full, free flow of information, appropriate decisions may be made, and various problems may be jointly solved.

A number of implementations have been described. Nevertheless, it will be understood that various modifications may be made. Accordingly, other implementations are within the scope of the following claims.

What is claimed is:

1. A method comprising:
   generating discrete media assets from received information, each media asset including content, the content including a plurality of discussion objects;
   generating content metadata for each media asset at an article reader based upon the content;
   automatically linking at least one of the plurality of discussion objects with a discussion forum associated with the at least one of the plurality of discussion objects;
   comparing the content metadata to a filtering database at a content-based router;
   filtering media assets at the content-based router based upon comparing the content metadata to the filtering database;
   comparing the filtered media assets to a user preference database storing media asset preference information for a user, at a personalized article processor;
   individually prioritizing the filtered media assets for the user into prioritized media assets at the personalized article processor based upon comparing the content metadata of the filtered media assets to the user preference database;
   outputting at least one individually prioritized media asset to the user; and
   registering the user with the discussion forum linked to at least one of the plurality of discussion objects included in the at least one individually prioritized media asset.

2. The method of claim 1 further comprising:
   distinguishing the discussion object within a first user display associated with the first user;
   receiving a first selection of the discussion object from the user; and
   outputting a page associated with the discussion forum based upon receiving the first selection.

3. The method of claim 1, wherein registering the user further comprises providing a discussion forum membership option to the user.

4. The method of claim 1, further comprising:
   distinguishing a second discussion object within a second user display associated with a second user; and
   receiving a second selection of the second discussion object from the second user.

5. The method of claim 4, further comprising outputting at least a second individually prioritized media asset to the second user.

6. The method of claim 2 further comprising:
   receiving posting information from the user; and
   publishing the posting information on the discussion forum.

7. The method of claim 6 further comprising establishing a user page uniquely associated with the user, the posting information being included within the user page.

8. The method of claim 7 wherein the posting information includes postings published by the user on the discussion forum.

9. The method of claim 7, further comprising rendering the posting information with an ordering determined based on preference information about content of the posting information.

10. The method of claim 4, further comprising:
    receiving posting information from the second user;
    publishing the posting information from the second user in the discussion forum;
    displaying the posting from the second user on the user page based on user-specific preference information that a plurality of users registered with the discussion forum have entered with respect to the second user.

11. The method of claim 1
    wherein the content metadata includes preference indication information, and
    wherein the user is registered with the discussion forum based on the preference indication information.

12. The method of claim 1 wherein
    wherein the content metadata includes membership indication information, and
    wherein the first user is registered with the discussion forum based on the membership indication information.

13. The method of claim 1, wherein registering the user with the discussion forum is based on a user interaction with the content metadata.

14. The method of claim 1, further comprising receiving a preference indication from the user related to the discussion object.

15. The method of claim 14 wherein the user is registered with the discussion forum based on the received preference indication from the user.

16. The method of claim 14 wherein the user enters the preference indication through a pop-up window displayed when the user selects the discussion object.

17. The method of claim 6, further comprising:
receiving opinions related to the published posting information; and
displaying the published posting information to additional users registered with the discussion forum based on the received opinions.

18. A computer program product tangibly embodied in a machine-readable storage medium, wherein the computer program comprises instructions that, when read by a machine, operate to cause a data processing apparatus to:
generate discrete media assets from received information, each media asset including content, the content including a plurality of discussion objects;
generate content metadata for each media asset at an article reader based upon the content;
automatically link at least one of the plurality of discussion objects with a discussion forum associated with the at least one of the plurality of discussion objects;
compare the content metadata to a filtering database at a content-based router;
filter media assets at the content-based router based upon comparing the content metadata to the filtering database;
compare the filtered media assets to a user preference database storing media asset preference information for users, at a personalized article processor;
prioritize, individually, the filtered media assets for the users into prioritized media assets at the personalized article processor based upon comparing the content metadata of the filtered media assets to the user preference database;
output at least one individually prioritized media asset to a user; and
register the user with a discussion forum linked to a discussion object included in the at least one individually prioritized media asset.

19. A device comprising:
a content generator configured to;
generate discrete media assets from received information, each media asset including content, the content including a plurality of discussion objects, and
generate content metadata for each media asset at an article reader based upon the content;
an information module configured to;
automatically link at least one of the plurality of discussion objects with a discussion forum associated with the at least one of the plurality of discussion objects, and
outputting at least one individually prioritized media asset to a user;
a content-based router configured to;
compare the content metadata to a filtering database at a content-based router, and
filter media assets at the content-based router based upon comparing the content metadata to the filtering database;
a personalized article processor configured to;
compare the filtered media assets to a user preference database storing media asset preference information for users, at a personalized article processor, and
individually prioritize the filtered media assets for the users into prioritized media assets at the personalized article processor based upon comparing the content metadata of the filtered media assets to the user preference database;
a discussion forum engine configured to register the user with a discussion forum linked to a discussion object included in the at least one individually prioritized media asset.

* * * * *